(12) United States Patent
Lafontaine et al.

(10) Patent No.: US 8,207,642 B2
(45) Date of Patent: Jun. 26, 2012

(54) COMPACT HIGH POWER ALTERNATOR

(75) Inventors: Charles Y. Lafontaine, Berthoud, CO (US); Harold C. Scott, Lafayette, CO (US)

(73) Assignee: Magnetic Applications Inc., Lafayette, CO (US)

( * ) Notice: Subject to any disclaimer, the term of this patent is extended or adjusted under 35 U.S.C. 154(b) by 0 days.

(21) Appl. No.: 12/848,972

(22) Filed: Aug. 2, 2010

(65) Prior Publication Data
US 2011/0025152 A1 Feb. 3, 2011

Related U.S. Application Data

(60) Continuation of application No. 11/295,888, filed on Dec. 6, 2005, now Pat. No. 7,768,166, which is a division of application No. 10/889,980, filed on Jul. 12, 2004, now Pat. No. 7,122,923.

(60) Provisional application No. 60/486,831, filed on Jul. 10, 2003.

(51) Int. Cl.
*H02K 21/22* (2006.01)

(52) U.S. Cl. ....................................................... 310/90

(58) Field of Classification Search ..................... 310/90, 310/67 R
See application file for complete search history.

(56) References Cited

U.S. PATENT DOCUMENTS

| | | | |
|---|---|---|---|
| 765,078 A * | 7/1904 | Jigouzo | 310/112 |
| 2,305,125 A * | 12/1942 | Wolferz | 310/156.14 |
| 2,493,102 A * | 1/1950 | Brainard | 310/156.78 |
| 2,874,317 A | 2/1959 | Couse | |
| 3,391,291 A * | 7/1968 | O'Neil et al. | 310/90 |
| 3,564,388 A | 2/1971 | Nolf | |
| 3,757,230 A | 9/1973 | Keeney | |
| 4,146,806 A * | 3/1979 | Katsumata | 310/153 |
| 4,164,785 A | 8/1979 | Young et al. | |
| 4,306,167 A | 12/1981 | Tomite et al. | |
| 4,403,402 A | 9/1983 | Tomite et al. | |
| 4,455,598 A | 6/1984 | Andre | |
| 4,467,229 A | 8/1984 | Ogita | |
| 4,625,160 A | 11/1986 | Hucker | |
| 4,695,776 A | 9/1987 | Dishner et al. | |

(Continued)

FOREIGN PATENT DOCUMENTS

CN 1286821 A 3/2001

(Continued)

OTHER PUBLICATIONS

JPO Office Action Dated Sep. 3, 2010 2006-518985.

(Continued)

*Primary Examiner* — Dang Le
(74) *Attorney, Agent, or Firm* — Snell & Wilmer LLP

(57) ABSTRACT

An apparatus for converting between mechanical and electrical energy, particularly suited for use as a compact high power alternator for automotive use and "remove and replace" retrofitting of existing vehicles. The apparatus comprises a rotor with permanent magnets, a stator with a winding, and a cooling system. Mechanisms to prevent the rotor magnets from clashing with the stator by minimizing rotor displacement, and absorbing unacceptable rotor displacement are disclosed. The cooling system directs coolant flow into thermal contact with at least one of the winding and magnets, and includes at least one passageway through the stator core. Various open and closed cooling systems are described. Cooling is facilitated by, for example, loosely wrapping the winding end turns, use of an asynchronous airflow source, and/or directing coolant through conduits extending through the stator into thermal contact with the windings.

18 Claims, 43 Drawing Sheets

U.S. PATENT DOCUMENTS

| | | | |
|---|---|---|---|
| 4,754,179 A | 6/1988 | Capuano et al. | |
| 4,827,393 A | 5/1989 | Clark | |
| 4,885,493 A | 12/1989 | Gokhale | |
| 4,900,965 A | 2/1990 | Fisher | |
| 4,931,683 A | 6/1990 | Gleixner et al. | |
| 5,039,932 A | 8/1991 | Belanger et al. | |
| 5,061,889 A | 10/1991 | Iwatani et al. | |
| 5,233,286 A | 8/1993 | Rozman et al. | |
| 5,258,676 A | 11/1993 | Reinhardt et al. | |
| 5,594,322 A | 1/1997 | Rozman et al. | |
| 5,606,244 A | 2/1997 | Migdal | |
| 5,625,276 A | 4/1997 | Scott et al. | |
| 5,705,917 A | 1/1998 | Scott et al. | |
| 5,828,147 A | 10/1998 | Best et al. | |
| 5,838,085 A | 11/1998 | Roesel et al. | |
| 5,886,504 A | 3/1999 | Scott et al. | |
| 5,900,722 A | 5/1999 | Scott et al. | |
| 5,917,248 A | 6/1999 | Seguchi et al. | |
| 5,920,162 A | 7/1999 | Hanson et al. | |
| 5,929,611 A | 7/1999 | Scott et al. | |
| 5,944,497 A * | 8/1999 | Kershaw et al. | 417/423.8 |
| 5,955,810 A | 9/1999 | Umeda et al. | |
| 5,990,590 A | 11/1999 | Roesel et al. | |
| 6,018,200 A | 1/2000 | Anderson et al. | |
| 6,034,511 A | 3/2000 | Scott et al. | |
| 6,111,390 A | 8/2000 | Inaba et al. | |
| 6,160,384 A | 12/2000 | Inaba et al. | |
| 6,188,588 B1 | 2/2001 | Hemena et al. | |
| 6,333,579 B1 | 12/2001 | Hirano et al. | |
| 6,369,473 B1 | 4/2002 | Baumeister et al. | |
| 6,376,947 B1 | 4/2002 | Tateishi | |
| 6,384,494 B1 | 5/2002 | Avidano et al. | |
| 6,433,519 B2 | 8/2002 | Taniguchi et al. | |
| 6,441,522 B1 | 8/2002 | Scott et al. | |
| 6,674,195 B2 | 1/2004 | Yagyu et al. | |
| 6,737,762 B2 | 5/2004 | Koenig | |
| 6,744,157 B2 | 6/2004 | Choi et al. | |
| 6,750,582 B1 * | 6/2004 | Neet | 310/208 |
| 6,768,237 B1 | 7/2004 | Schiroedl | |
| 6,768,656 B2 | 7/2004 | Figueroa | |
| 6,784,575 B2 | 8/2004 | Okuda | |
| 6,787,961 B2 | 9/2004 | Neet | |
| 6,853,105 B2 | 2/2005 | Nakano et al. | |
| 6,856,038 B2 | 2/2005 | Rebsdorf et al. | |
| 6,989,655 B2 | 1/2006 | Eguchi et al. | |
| 7,061,149 B2 | 6/2006 | Crane | |
| 7,122,923 B2 | 10/2006 | Lafontaine et al. | |
| 7,176,658 B2 | 2/2007 | Quazi et al. | |
| 7,219,417 B2 | 5/2007 | Kobayashi et al. | |
| 7,230,363 B2 | 6/2007 | Stoute et al. | |
| 7,327,123 B2 | 2/2008 | Faberman et al. | |
| 7,397,157 B2 | 7/2008 | Maekawa et al. | |
| 7,560,839 B2 | 7/2009 | Sumiya et al. | |
| 7,615,903 B2 | 11/2009 | Holmes et al. | |
| 7,768,165 B2 | 8/2010 | Scott et al. | |
| 7,768,166 B2 * | 8/2010 | Lafontaine et al. | 310/90 |
| 2002/0044463 A1 | 4/2002 | Bontempo et al. | |
| 2002/0053838 A1 | 5/2002 | Okuda | |
| 2002/0176266 A1 | 11/2002 | Perreault et al. | |
| 2005/0035673 A1 | 2/2005 | Lafontaine | |
| 2007/0273221 A1 | 11/2007 | Kinoshita et al. | |

FOREIGN PATENT DOCUMENTS

| | | |
|---|---|---|
| CN | 1571249 | 1/2005 |
| DE | 2119525 | 2/1972 |
| DE | 3329720 | 2/1984 |
| DE | 19513134 | 10/1996 |
| DE | 10048491 | 4/2002 |
| EP | 1176696 | 1/2002 |
| EP | 1184960 | 6/2002 |
| EP | 1667318 | 6/2006 |
| FR | 1567344 | 5/1969 |
| FR | 2533375 | 3/1984 |
| FR | 2536222 | 5/1984 |
| JP | 58072358 | 4/1983 |
| JP | 60118036 | 6/1985 |
| JP | 61203888 | 9/1986 |
| JP | 62-140867 | 9/1987 |
| JP | 3-86762 | 9/1991 |
| JP | 3-270659 | 12/1991 |
| JP | 04-140873 | 4/1992 |
| JP | 06233483 | 8/1994 |
| JP | 08322199 | 12/1996 |
| JP | 10004650 | 1/1998 |
| JP | 10-503918 | 4/1998 |
| JP | 2000-183040 | 6/2000 |
| JP | P2002-10574 A | 1/2002 |
| JP | 2005253146 | 9/2005 |
| WO | 0120770 | 3/2001 |

OTHER PUBLICATIONS

EPO; Examination Letter Dated Jul. 4, 2010 Application # 04 778 233.
CNPO First Office Action dated Jul. 25, 2008 Application No. 200480020404.1.
CNPO First Office Action dated Aug. 1, 2008 Application No. 200480022823.9.
CNPO Second Office Action Dated Feb. 2, 2009 200480020404.1.
CNPO Third Office Action Dated Apr. 13, 2010 200680008421.2.
CNPO First Office Action Dated Dec. 5, 2008 200680008421.2.
CNPO Second Office Action Dated Jul. 31, 2009 200680008421.2.
CNPO Formal Response to 3rd Office Action Jun. 13, 2010 200680008421. 2.
JPO Reasons for Rejection Feb. 3, 2010 2006-518985.
USPTO; Office Action dated Dec. 17, 2010 in U.S. Appl. No. 12/848,980.
USPTO; Notice of Allowance dated Aug. 30, 2010 in U.S. Appl. No. 12/753,764.
USPTO; Notice of Allowance dated Sep. 11, 2006 in U.S. Appl. No. 10/860,393.
USPTO; Office Action dated Feb. 6, 2006 in U.S. Appl. No. 10/860,393.
USPTO; Office Action dated Jul. 12, 2005 in U.S. Appl. No. 10/889,980.
USPTO; Final Office Action dated Feb. 10, 2006 in U.S. Appl. No. 10/889,980.
USPTO; Notice of Allowance dated Jun. 6, 2006 in U.S. Appl. No. 10/889,980.
USPTO; Notice of Allowance dated Jun. 12, 2008 in U.S. Appl. No. 11/295,888.
USPTO; Notice of Allowance dated Mar. 23, 2010 in U.S. Appl. No. 11/295,888.
USPTO; Office Action dated Aug. 11, 2006 in U.S. Appl. No. 11/295,888.
USPTO; Office Action dated Sep. 22, 2009 in U.S. Appl. No. 11/295,888.
USPTO; Notice of Allowance dated Sep. 10, 2007 in U.S. Appl. No. 11/347,777.
USPTO; Final Office Action dated Nov. 19, 2008 in U.S. Appl. No. 11/710,239.
USPTO; Notice of Allowance dated Nov. 17, 2009 in U.S. Appl. No. 11/710,239.
USPTO; Office Action dated Apr. 24, 2008 in U.S. Appl. No. 11/710,239.
USPTO; Office Action dated May 4, 2009 in U.S. Appl. No. 11/710,239.
USPTO; Office Action dated Jun. 24, 2009 in U.S. Appl. No. 12/025,645.
USPTO; Notice of Allowance dated Mar. 19, 2010 in U.S. Appl. No. 12/025,645.
PCT; International Preliminary Report Dated Jul. 4, 2010 in Application # PCT/US2004017571.
EPO; Examination Letter Dated Mar. 12, 2009 Application # 04 778 233.
PCT; International Search Report Dated Feb. 25, 2005 in Application # PCT/US2004022628.
PCT; International Preliminary Report Dated Aug. 7, 2007 in Application # PCT/US2006003965.
PCT; International Search Report Dated May 29, 2006 in Application # PCT/US2006003965.

EPO; Examination Letter Dated May 20, 2010 Application #06720281.
EPO; Examination Letter Dated Apr. 2, 2009 Application #06720281.
PCT; International Search Report Dated Jul. 23, 2007 in Application # PCT/US2007004651.
PCT; International Preliminary Report Dated Aug. 26, 2008 in Application # PCT/US2007004651.
PCT; International Preliminary Report Dated Aug. 10, 2010 in Application # PCT/US2009033585.
PCT; International Search Report Dated May 14, 2009 in Application # PCT/US2009033585.
USPTO; Notice of Allowance dated May 3, 2011 in U.S. Appl. No. 12/368,212.
USPTO; Office Action dated Oct. 13, 2010 in U.S. Appl. No. 12/368,212.
USPTO; Final Office Action dated Jul. 7, 2011 in U.S. Appl. No. 12/848,980.
USPTO; Notice of Allowance dated Oct. 14, 2011 in U.S. Appl. No. 12/848,980.
USPTO; Ex Parte Quayle dated Dec. 20, 2011 in U.S. Appl. No. 13/215,167.
EPO; Office Action dated Feb. 4, 2011 in Application No. 09707682.
EPO; Office Action dated Sep. 14, 2011 in Application No. 09707682.
JPO; Office Action dated Dec. 27, 2011 in Application No. 2008-5564265.
CNPO First Office Action Dated Jul. 7, 2011 in Application No. 201010274844.
MXPO Second Office Action Dated Mar. 16, 2011 in Application No. MX/a/2008/010802.
KIPO Non Final Office Action Mar. 31, 2011 in Application No. 10-2005-7023235.
KIPO; Office Action dated Oct. 10, 2011 in Application No. 2011-7021307.
IEEE, vol. 89, No. 6, Jun. 2001, "Topologies and Design Considerations for Distributed Power System Applications," pp. 939-949.

* cited by examiner

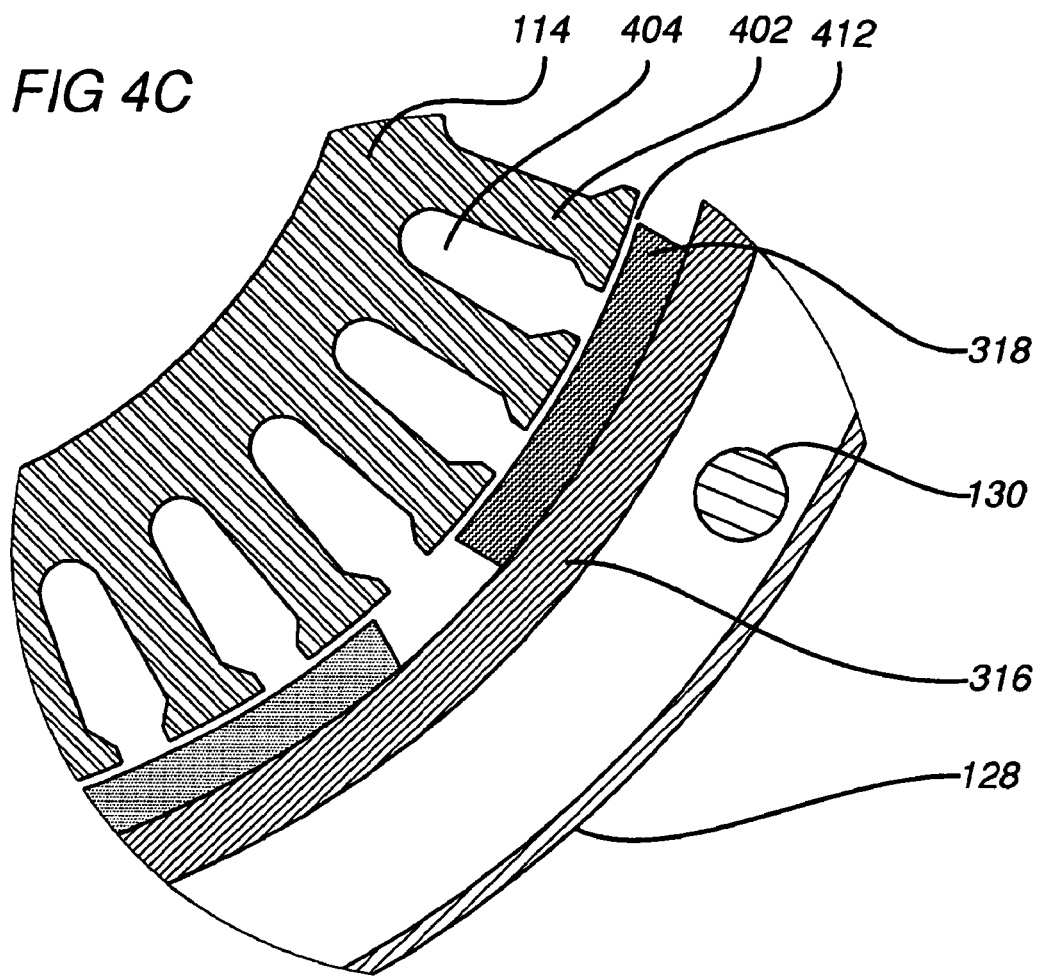

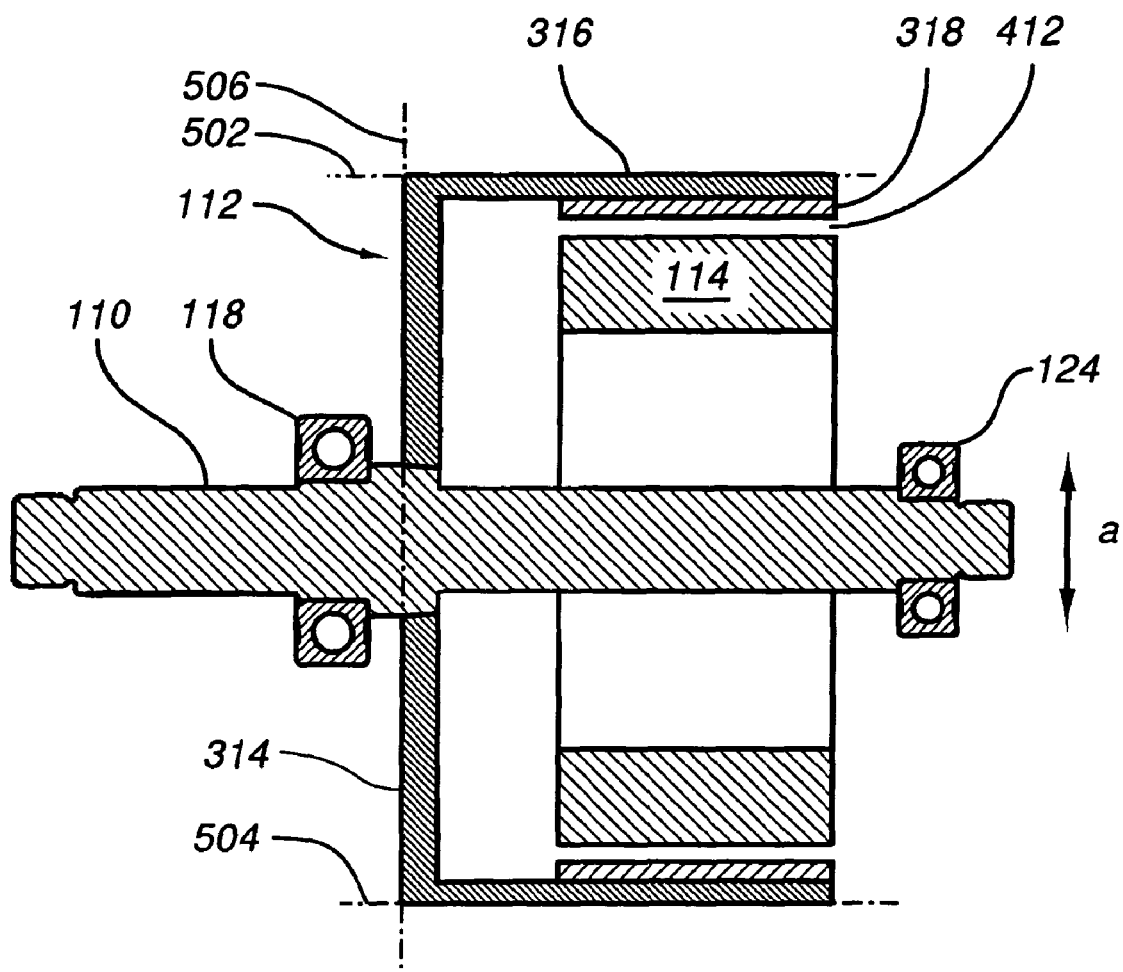

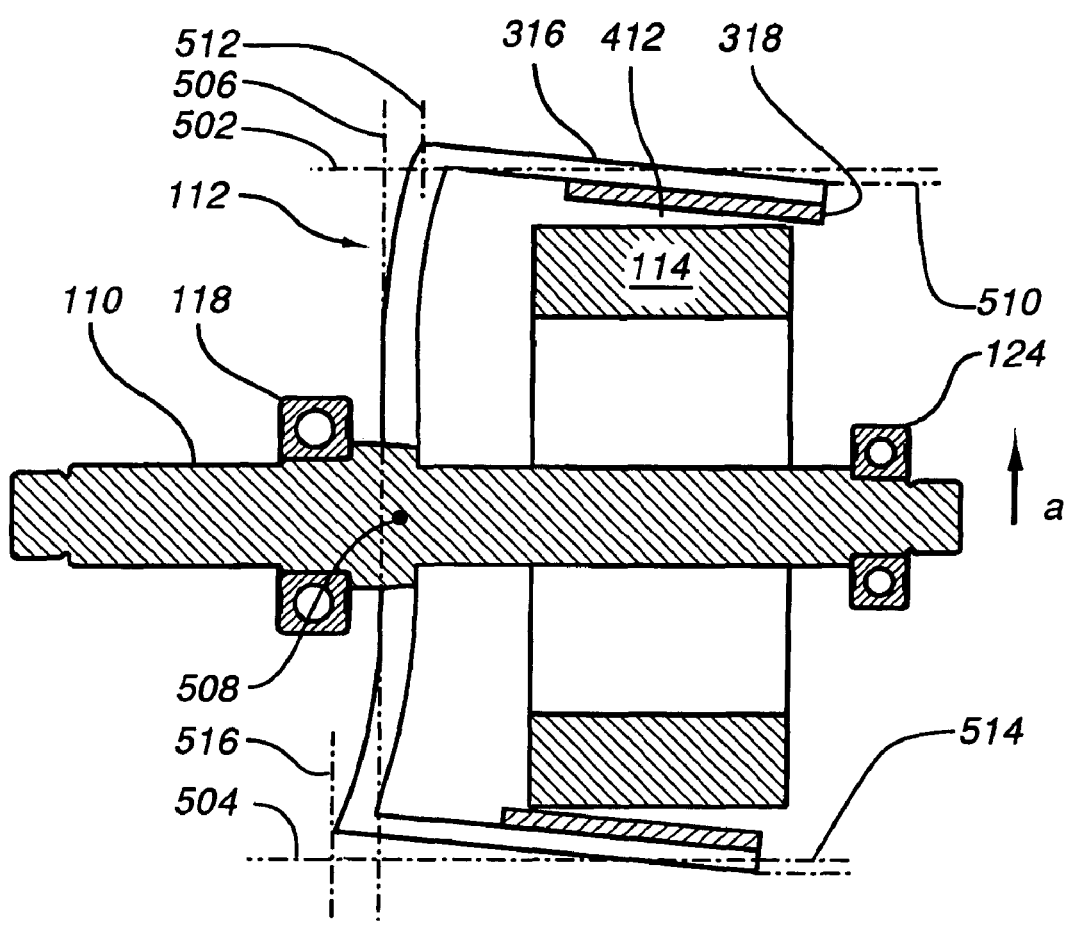

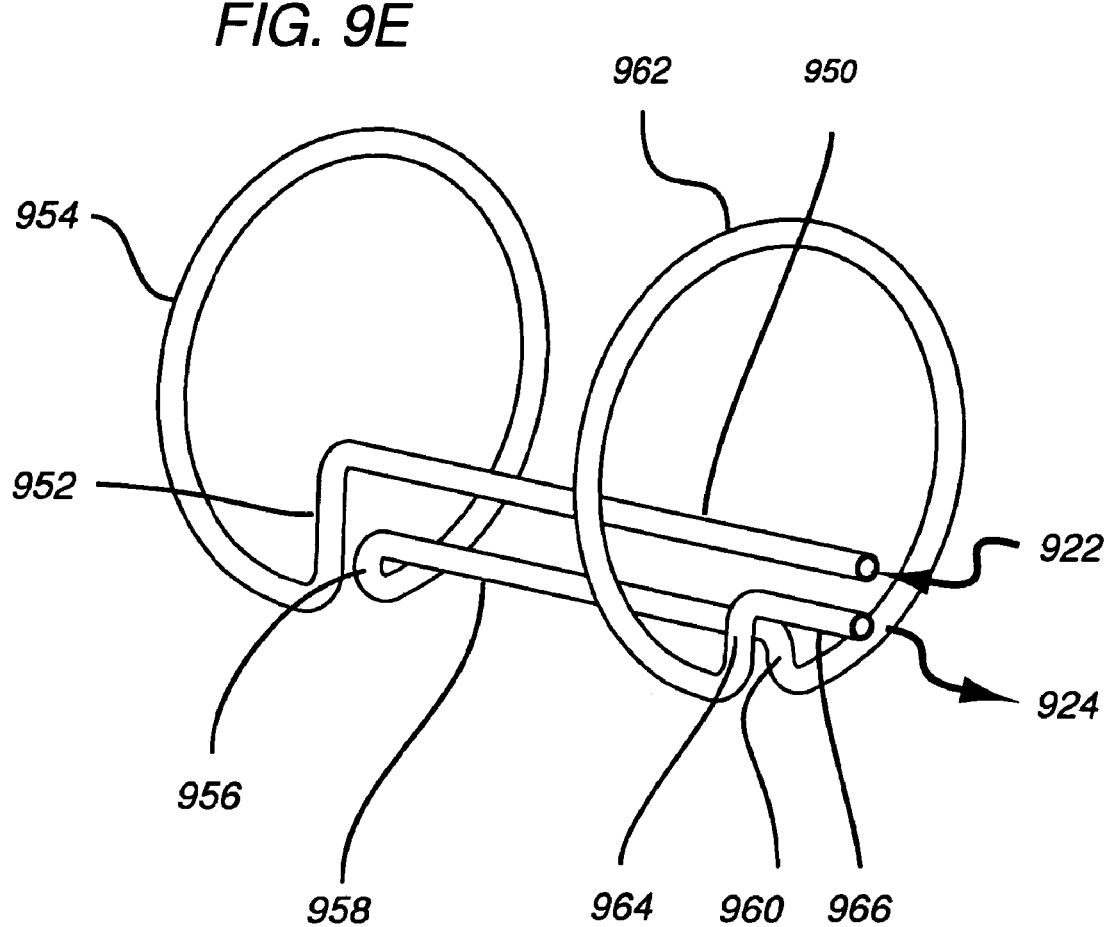

COMPACT HIGH POWER ALTERNATOR

RELATED APPLICATIONS

This application is a continuation of and claims priority to U.S. patent application Ser. No. 11/295,888, filed Dec. 6, 2005 now U.S. Pat. No. 7,768,166, which is a divisional application of and claims priority to U.S. patent application Ser. No. 10/889,980, filed on Jul. 12, 2004 now U.S. Pat. No. 7,122,923 and also claims priority to U.S. Provisional Application Ser. No. 60/486,831, filed Jul. 10, 2003, by inventors Charles Y. Lafontaine and Harold C. Scott.

BACKGROUND OF THE INVENTION

The present invention relates to machines for converting between mechanical and electrical energy, and in particular to a compact high power alternator using permanent magnets suitable for automotive use.

An alternator typically comprises a rotor mounted on a rotating shaft and disposed concentrically relative to a stationary stator. Alternatively, a stationary rotor may be positioned concentrically within a rotating stator. An external energy source, such as a motor or turbine, commonly drives the rotating element, directly or through an intermediate system such as a pulley belt. Both the stator and the rotor have a series of poles. Either the rotor or the stator generates a magnetic field, which interacts with windings on the poles of the other structure. As the magnetic field intercepts the windings, an electrical current is generated, which is provided to a suitable load. The induced current is typically applied to a bridge rectifier, sometimes regulated, and provided as an output. In some instances, the regulated output signal is applied to an inverter to provide an AC output.

Conversely, the device can act as a motor if an appropriate electrical signal is applied to the windings.

Conventionally, alternators employed in automotive applications typically comprise: a housing, mounted on the exterior of an engine; a stator having 3-phase windings housed in the housing, a belt-driven claw-pole type (e.g., Lundell) rotor rotatably supported in the housing within the stator. However, the power output of such conventional claw-pole type alternators is directly proportional to the size of the alternator; to increase power output the size of the conventional alternator must be significantly increased. Accordingly, space constraints in vehicles tend to make such alternators difficult to use in high output, e.g., 5 kW, applications, such as for powering air conditioning, refrigeration, or communications apparatus. In addition, claw-type generators are also disadvantageous in that voltage regulation is by modulating the rotating field. Such modulation affects all of the windings. Accordingly, voltage regulation and control of individual windings is impractical.

In addition, the claw-pole type rotors, carrying windings, are relatively heavy (often comprising as much as half of the total weight of the alternator) and create substantial inertia. Such inertia, in effect, presents a load on the engine each time the engine is accelerated. This tends to decrease the efficiency of the engine, causing additional fuel consumption. Reductions in the mass and diameter of rotating components of an alternator will tend to reduce the overall inertia an engine has to overcome, thereby improving fuel economy. A permanent magnet alternator is ideally suited for reducing overall inertia. The mass and diameter of rotating components are reduced as compared to that of conventional Lundell alternators, while supplying an equivalent amount of power.

A reduction of inertia in a motor vehicle alternator also translates to a reduction in horsepower required by the engine to accelerate the alternator. The savings in horsepower could then conceivably be applied to a vehicle drive train resulting in more power to propel the vehicle. This would be of great interest for example, to race car engineers who must deal with regulations limiting horsepower generated by race engines. Even a slight improvement in available horse power to the drive wheels can yield a tremendous competitive advantage.

In addition, such inertia can be problematical in applications such as electrical or hybrid vehicles. Hybrid vehicles utilize a gasoline engine to propel the vehicle at speeds above a predetermined threshold, e.g. 30 kph (typically corresponding to a range of RPM where the gasoline engine is most efficient). Similarly, in a so-called "mild hybrid," a starter-generator is employed to provide an initial burst of propulsion when the driver depresses the accelerator pedal, facilitating shutting off the vehicle engine when the vehicle is stopped in traffic to save fuel and cut down on emissions. Such mild hybrid systems typically contemplate use of a high-voltage (e.g. 42 volts) electrical system. The alternator in such systems must be capable of recharging the battery to sufficient levels to drive the starter-generator to provide the initial burst of propulsion between successive stops, particularly in stop and go traffic. Thus, a relatively high power, low inertia alternator is needed.

In general, there is in need for additional electrical power for powering control and drive systems, air conditioning and appliances in vehicles. This is particularly true of vehicles for recreational, industrial transport applications such as refrigeration, construction applications, and military applications.

For example, there is a trend in the automotive industry to employ intelligent electrical, rather than mechanical or hydraulic control and drive systems to decrease the power load on the vehicle engine and increased fuel economy. Such systems may be employed, for example, in connection with steering servos (which typically are active only a steering correction is required), shock absorbers (using feedback to adjust the stiffness of the shock absorbers to road and speed conditions), air conditioning (operating the compressor at the minimum speed required to maintain constant temperature). The use of such electrical control and drive systems tends to increase the demand on the electrical power system of the vehicle.

Similarly, it is desirable that mobile refrigeration systems be electrically driven. For example, efficiency can be increased by driving the refrigeration system at variable speeds (independently of the vehicle engine rpm). In addition, with electrically driven systems the hoses connecting the various components, e.g. the compressor (on the engine), condenser (disposed to be exposed to air), and evaporation unit (located in the cold compartment), can be replaced by an electrically driven hermetically sealed system analogous to a home refrigerator or air-conditioner. Accordingly, it is desirable that a vehicle electrical power system in such application be capable of providing the requisite power levels for an electrically driven unit.

There is also a particular need for a "remove and replace" high power alternator to retrofit existing vehicles. Typically only a limited amount of space is provided within the engine compartment of the vehicle to accommodate the alternator. Unless a replacement alternator fits within that available space, installation is, if possible, significantly complicated, typically requiring removal of major components such as radiators, bumpers, etc. and installation of extra brackets, belts and hardware. Accordingly, it is desirable that a replacement alternator fit within the original space provided, and interface with the original hardware.

In general, permanent magnet alternators are well-known. Such alternators use permanent magnets to generate the requisite magnetic field. Permanent magnet generators tend to be much lighter and smaller than traditional wound field generators. Examples of permanent magnet alternators are described in U.S. Pat. Nos. 5,625,276 issued to Scott et al on Apr. 29, 1997; 5,705,917 issued to Scott et al on Jan. 6, 1998; 5,886,504 issued to Scott et al on Mar. 23, 1999; 5,929,611 issued to Scott et al on Jul. 27, 1999; 6,034,511 issued to Scott et al on Mar. 7, 2000; and 6,441,522 issued to Scott on Aug. 27, 2002.

Particularly light and compact permanent magnet alternators can be implemented by employing an "external" permanent magnet rotor and an "internal" stator. The rotor comprises a hollow cylindrical casing with high-energy permanent magnets disposed on the interior surface of the cylinder. The stator is disposed concentrically within the rotor casing. Rotation of the rotor about the stator causes magnetic flux from the rotor magnets to interact with and induce current in the stator windings. An example of such an alternator is described in, for example, the aforementioned U.S. Pat. Nos. 5,705,917 issued to Scott et al on Jan. 6, 1998 and 5,929,611 issued to Scott et al on Jul. 27, 1999.

The stator in such permanent magnet alternators is suitably comprised of individual thin steel laminations of an appropriate shape and chemical composition which are then welded or epoxied together in a cylindrical body with teeth and slots to accept windings. The respective laminations of the stack are positioned in both axial and rotational alignment so that the resultant state or teeth and slots are aligned (disposed) axially. The power output wave produced by axially aligned teeth and slots is by its nature a square wave.

However, it would be advantageous in applications employing control systems dependant on synchronization with the output, to have a power output wave with sloping sides to enhance control timing.

The power supplied by a permanent magnet generator varies significantly according to the speed of the rotor. In many applications, changes in the rotor speed are common due to, for example, engine speed variations in an automobile, or changes in load characteristics. Accordingly, an electronic control system is typically employed. An example of a permanent magnet alternator and control systems therefor is described in the aforementioned U.S. Pat. No. 5,625,276 issued to Scott et al on Apr. 29, 1997. Examples of other control systems are described in U.S. Pat. No. 6,018,200 issued to Anderson, et al. on Jan. 25, 2000.

However, in such permanent magnet alternators, the efficiency is inversely proportional to the "air gap" separating the magnets from the stator. Such air gaps are often in the range of 20 to 40 thousands of an inch. With such close spacing/tolerances, the permanent magnet alternators are particularly susceptible to destructive interference (clashing) between magnets and stator as a result of displacement of the rotor caused by external forces acting on the alternator. In vehicular applications relatively severe external forces are commonplace, due to, for example, engine vibration (particularly diesel engines at startup), cornering, traversing bumpy roads or terrain, and other types of impact. Accordingly, an alternator in which rotor displacement is minimized, and which includes a mechanism to absorb unacceptable rotor displacement and prevent the rotor magnets from clashing with the stator is needed.

The use of a taper at the end of a motor shaft to center an attachment, e.g. attaching lawn mower blades to a motor shaft, is known. Conventionally, such a taper is provided only at the end of a shaft. An axial tapped hole is provided in the shaft end surface. The attachment includes a hub with a corresponding tapered aperture. However, the tapered aperture typically extends only partway (as opposed to through) the attachment hub; it is, in effect, a countersink to a smaller diameter through bore. The attachment is secured to the shaft by a bolt passing through the attachment hub bore and threaded into the hole in the shaft end surface. The tapered connection tends to center the attachment on the shaft, however, the attachment on the end of the shaft, is, in effect, cantilevered and susceptible to vibrational oscillations.

In addition, the heat generated by compact high power alternators can also be problematical. This is particularly true in applications where significant levels of power are generated at relatively low engine rpm; in general; the amount of air moved by a fan is proportional to the square of the fan rpm. As alternators become more compact and more efficient, significant levels of heat are generated. Permanent magnets are particularly susceptible to damage due to overheating; under high load, high temperature conditions, such magnets can become demagnetized. Similarly, the electronic components employed in the controller are susceptible to heat damage. Accordingly, a strategy must be developed to dissipate heat buildup.

Use of airflow to cool heat generating elements (e.g., rectifiers) in a gen-set are known. An example of such cooling is described in the aforementioned U.S. Pat. No. 5,929,611 issued to Scott et al on Jul. 27, 1999. Conventionally, airflow is provided by a fan driven by the same shaft on which the rotor is mounted. However, in various automotive applications, significant heat is generated at low rpm.

In general, an appreciable reduction in diameters would be employed to achieve a useful reduction in inertia. This tends to create an acute need for cooling in reduced inertia alternators. The reduction in both mass and overall diameters of these alternators tends to make the use of conventional cooling methods impractical.

Cooling techniques that permit a permanent alternator to be fully sealed are desirable in situations where exposure to the elements would be detrimental to the operation of the alternator. This is of particular interest to the military or any application subjected to harsh, dusty environments which would be detrimental to the magnets due to their affinity to ferrous particles found in most sand.

There also is a need for an alternator that can accommodate not only the power levels, but also the space and ruggedness constraints imposed by use in vehicles. For example, operation of a vehicle tends to generate forces perpendicular to the axis of the rotor that are sometimes sufficient to cause the rotor and stator to clash. The rotor and stator are separated only by a small air gap, and the external forces tend to cause transverse movement of the rotor in excess of the air gap then there will be striking interference.

SUMMARY OF THE INVENTION

The present invention provides particularly advantageous machine for converting between mechanical and electrical energy.

Various aspects of the invention provide a compact power conversion apparatus using permanent magnets that can accommodate not only the power levels, but also the space and ruggedness constraints imposed by use in vehicles. Another aspect of the invention provides a "remove and replace" high power alternator to retrofit existing vehicles.

Other aspects of the invention provide a compact high power conversion apparatus using permanent magnets in which rotor displacement is minimized, and which includes a mechanism to absorb unacceptable rotor displacement and prevent the rotor magnets from clashing with the stator.

In accordance with another aspect of the invention a power conversion apparatus comprises a rotor, a stator, and a cooling system.

The rotor comprises a cylindrical casing, and a predetermined number of permanent magnets disposed in the interior of the casing, and is adapted for rotation about the axis of the casing.

The stator comprises a core and at least one conductive winding. The core includes a generally cylindrical outer peripheral surface with a predetermined number of slots formed therein. The winding is wound around the core through the slots.

The stator is concentrically disposed within the interior of the rotor casing, with the stator core peripheral surface disposed proximate to the rotor magnets, separated from the magnets by a predetermined gap distance, such that relative motion of the rotor and stator causes magnetic flux from the magnets to interact with and induce current in the stator winding.

The cooling system directs coolant flow into thermal contact with at least one of the winding and magnets, and includes at least one passageway through the stator core.

In accordance with other aspects of the present invention, cooling is facilitated by one or more of: loosely wrapping winding end turns to, in effect, increase the surface area of the windings; establishing a directed airflow over at least a portion the stator windings, (preferably through loosely wrapped end turns of the windings); directing a portion of the airflow over elements in thermal contact with the magnets; providing airflow from a source that is asynchronous with respect to the shaft on which the rotor is mounted, e.g. an electric fan; and directing a flow of coolant fluid into thermal contact with the winding end turns.

BRIEF DESCRIPTION OF THE DRAWING

The present invention will hereinafter be described in conjunction with the figures of the appended drawing, wherein like designations denote like elements, and:

FIG. 4C is a detail blowup of a portion of FIG. 4A.

(FIGS. 4A-4F are collectively referred to as FIG. 4.)

FIGS. 5A, 5B, and 5C (collectively referred to as FIG. 5) are schematic illustrations of the movement of the rotor in response to exterior forces.

FIG. 9E is a detail of suitable routing of the cooling tubes in a fluid cooled alternator.

DETAILED DESCRIPTION OF A PREFERRED EXEMPLARY EMBODIMENT

Figure 1:
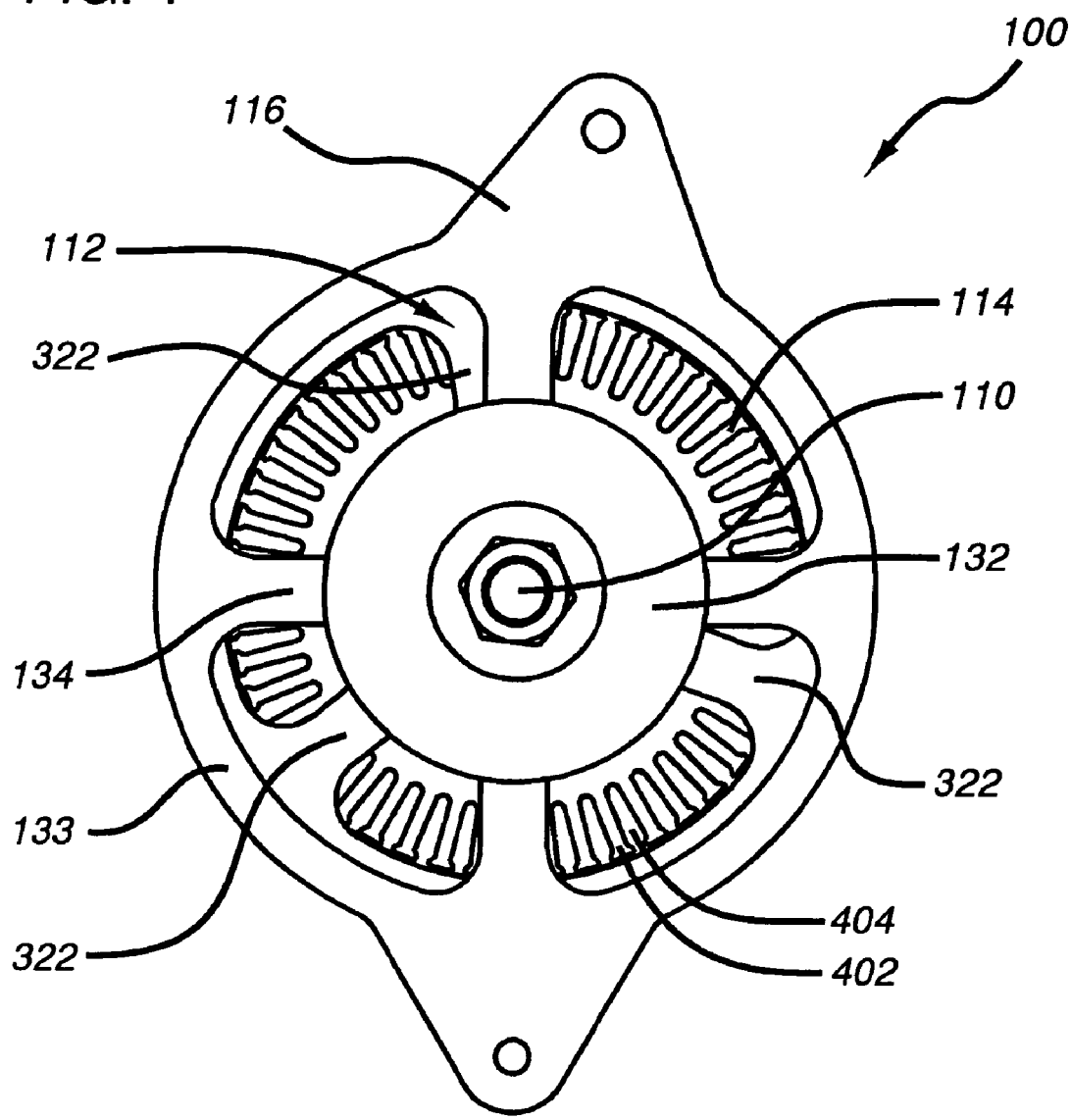
FIG. 1 is a front view of a first embodiment of an alternator in accordance with the present invention (with windings removed for clarity).
Figure 2:
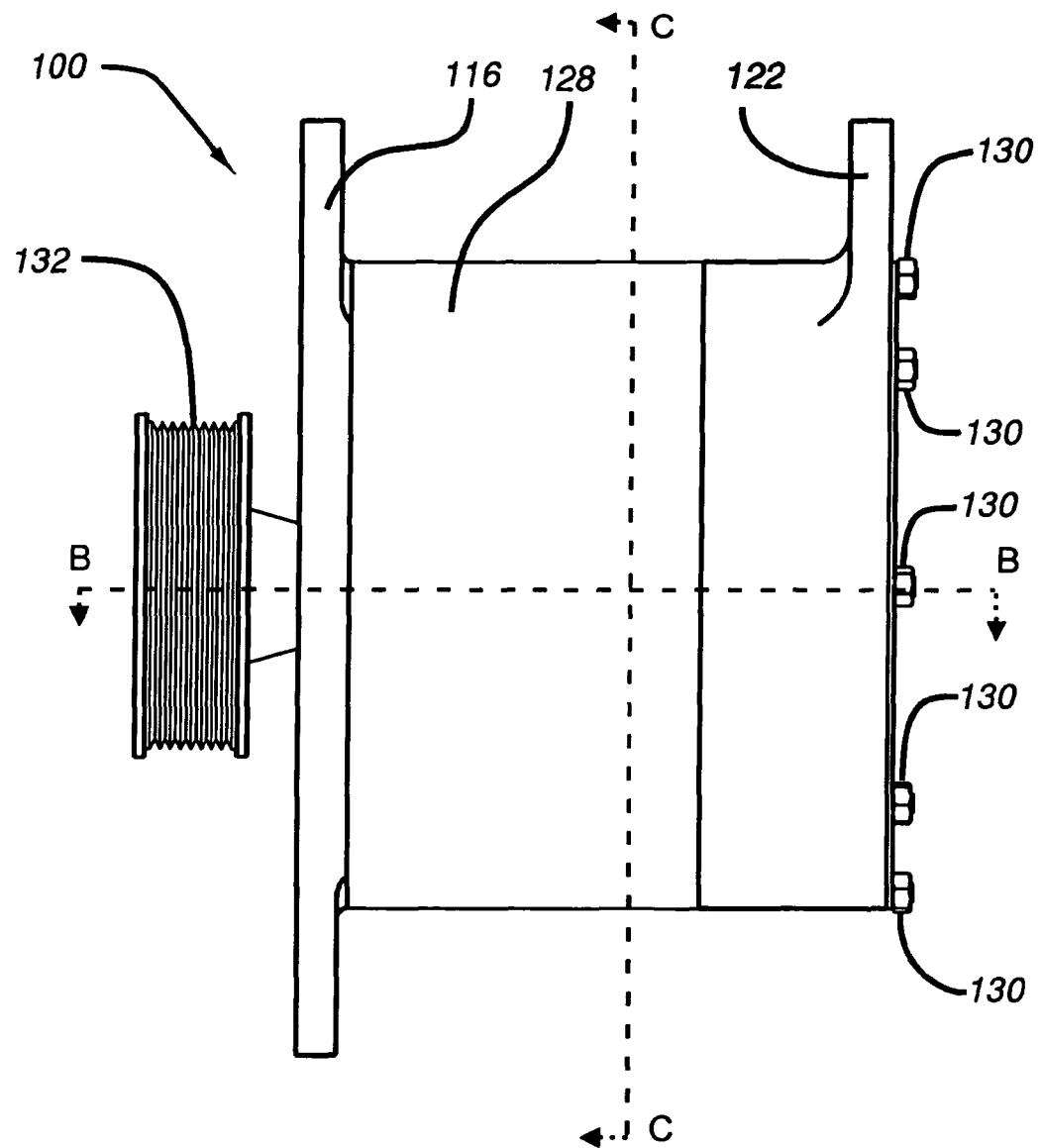
FIG. 2 is a side view of the alternator of FIG. 1.

Referring now to FIGS. 1, 2, 3, and 4 an apparatus for converting between mechanical and electrical energy, e.g., an alternator 100 in accordance with various aspects of the present invention comprises: a shaft 110, preferably including a tapered projecting portion 310 and a threaded portion 312; a rotor 112; a stator 114; a front endplate 116; a front bearing 118; a jam nut 120; a rear endplate 122; a rear shaft retaining ring 123; a rear bearing 124; a rear jam nut 125; a rear endplate retaining ring 127; an electric fan 126; an outer casing 128 and respective tie rods 130. Rotor 112 is mounted on shaft 110 for rotation with the shaft. Stator 114 is closely received within rotor 112, separated from rotor 112 by a small air gap 412. Front endplate 116, front bearing 118, rear bearing 124, rear endplate 122, outer casing 128 and tie rods 130 cooperate as a support assembly to maintain alignment of shaft 110, rotor 112, and stator 114. Shaft 110 is maintained by bearings 118 and 124, which are mounted on front endplate 116 and rear endplate 122, respectively, and rotatably maintain and align shaft 110 concentric and perpendicular with the endplates. Rotor 112 is mounted for rotation on shaft 110, positively positioned by cooperation with tapered shaft portion 310. Rear endplate 122 mounts and locates stator 114 so that it is disposed within rotor 112 properly aligned with shaft 110 and rotor 112. Outer casing 128 has end faces perpendicular to its axis (is preferably cylindrical) and is disposed between front endplate 116 and rear endplate 122. Tie rods 130; compress endplates 116 and 122 against outer casing 128, keeping the components squared and in alignment.

In a typical automotive alternator application, a pulley 132 is mounted on the end of shaft 110. Power from an engine (not shown) is transmitted through an appropriate belt drive (not shown) to pulley 132, and hence shaft 110. Shaft 110 in turn causes rotor 112 to rotate about stator 114. Rotor 112 generates a magnetic field, which interacts with windings on stator 114. As the magnetic field intercepts the windings, an electrical current is generated, which is provided to a suitable load. The induced current is typically applied to a bridge rectifier, sometimes regulated, and provided as an output. In some instances, the regulated output signal is applied to an inverter to provide an AC output.

Shaft 110 is, in general, cylindrical, of a predetermined diameter (e.g. ¾ in) with larger diameter portions for accommodating pulley 132, (e.g., ⅞ in), and front bearing 118 (e.g. 1¼ in), rotor 112 (tapered portion 310) and jam nut 120 (threaded portion 312, e.g. 1 in). Tapered projecting portion 310 is disposed at a predetermined position on shaft 110, and has a predetermined taper, i.e., its diameter increases from a minimum diameter (substantially equal to that of threaded portion 312) by a predetermined amount per unit of length, suitably in the range of 1 in. diameter per 7 inches of length to 1 in. diameter per 16 inches of length, and preferably 1 in. per foot. Tapered portion 310 is preferably held to relatively close tolerance, e.g. plus or minus 0.004°. The taper is chosen to ensure sufficient surface area contact between shaft 110 and rotor 112, while still providing sufficient change in diameter to prevent unwanted axial movement of the rotor once secured.

Rotor 112 preferably comprises an endcap 314, a cylindrical casing 316 and a predetermined number (e.g. 12 pairs) of alternatively poled permanent magnets 318 disposed in the interior side wall of casing 316. FIGS. 7D and 7E will detail alternative configurations of endcap 314 and cylindrical casing 316

Rotor endcap 314 is suitably substantially open, including a peripheral portion 321, respective cross-arms 322 and a central hub 324 to provide for connection to shaft 110. Respective air passageways 323 are provided through endcap 314, bounded by peripheral portion 321, adjacent cross arms 322, and central hub 324. If desired, cross arms 322 can be configured as fan blades to facilitate cooling internal chamber 320. As will be more fully explained, rotor hub 324 includes a through-bore 326 having a predetermined taper (e.g. 1 in. per foot) corresponding to that of shaft portion 310. In assembly, shaft 110 is journaled through bore 326, such that shaft tapered portion 310 is received in bore 326 just forward of threaded shaft portion 312. Threaded shaft portion 312 cooperates with jam nut 120 to positively locate rotor 112 on shaft 110. In general, the thickness of crossarms 322 is suitably chosen to be as thin as possible (to minimize weight and material cost) while still capable of withstanding expected loads, suitably in the range of ⅜ in. to ⅝ inch at its thinnest point. Since rotor casing 316 is, in effect, cantilevered from endcap 314, the necessary thickness is proportional to the length of casing 316. Rotor hub 324, in the vicinity of bore 326, is suitably thick enough to provide adequate surface contact with tapered shaft portion 310, suitably on the order of 1½ inch.

Cylindrical rotor casing 316 is formed of "soft magnetic" (relatively transparent to magnetic flux) material (e.g. lead free steel) of a predetermined outer diameter and thickness. In general, to maximize power output, it is desirable that the diameter $D_{AG}$ (FIG. 4) of the circle defined by the inner surface of magnets 318 (sometimes referred to herein as the air gap diameter) be as large as possible given the applicable overall size constraints for alternator 100. For example, in many automotive applications, alternator 100 must be no more than 5 in. long and 5 in. in diameter in order to fit within the available space. The thickness of casing 316 is suitably chosen to be as thin as possible (to minimize weight and material cost) while still capable of withstanding expected loads and without the flux density from magnets 318 saturating the casing. The thickness of casing 316 is suitably in the range of 1/8 to 1/2 inch, typically in the range of 3/16 to 1/4 inch, and, in the embodiments of FIGS. 1-4, 3/16 inch.

Magnets 318 preferably comprise high energy product magnets having a flux density of at least on the order of five kilogauss, preferably ranging from eight to 11 kilogauss, suitably formed of a rare earth alloy such as neodymium iron boron, or samarium cobalt. Such rare earth materials tend to be extremely expensive, and, accordingly, it is desirable to minimize the amount of material used. However, at the same time, it is desirable to generate relatively high flux densities. In the preferred embodiment, magnets 802 are relatively thin, e.g. on the order of 0.1 to 0.15 an inch thick, but present a relatively large area, 0.75 inch wide by from approximately one inch to 2.5 in. long, to minimize the amount of high energy product magnet used.

Magnets 318 may be secured to casing 316 in any suitable manner. For example, magnets 318 may be glued to casing 316. The disposition of magnets 318 on the interior of casing 316 is advantageous in that, inter alia, magnetic force tends to secure magnets 318 to casing 316; even in the event that the adhesive fails, the magnets will tend to stay in place. If desired, in some applications where less power density is acceptable, soft magnetic consequence poles 318A may be employed in place of one set of permanent magnet poles.

Figure 3:
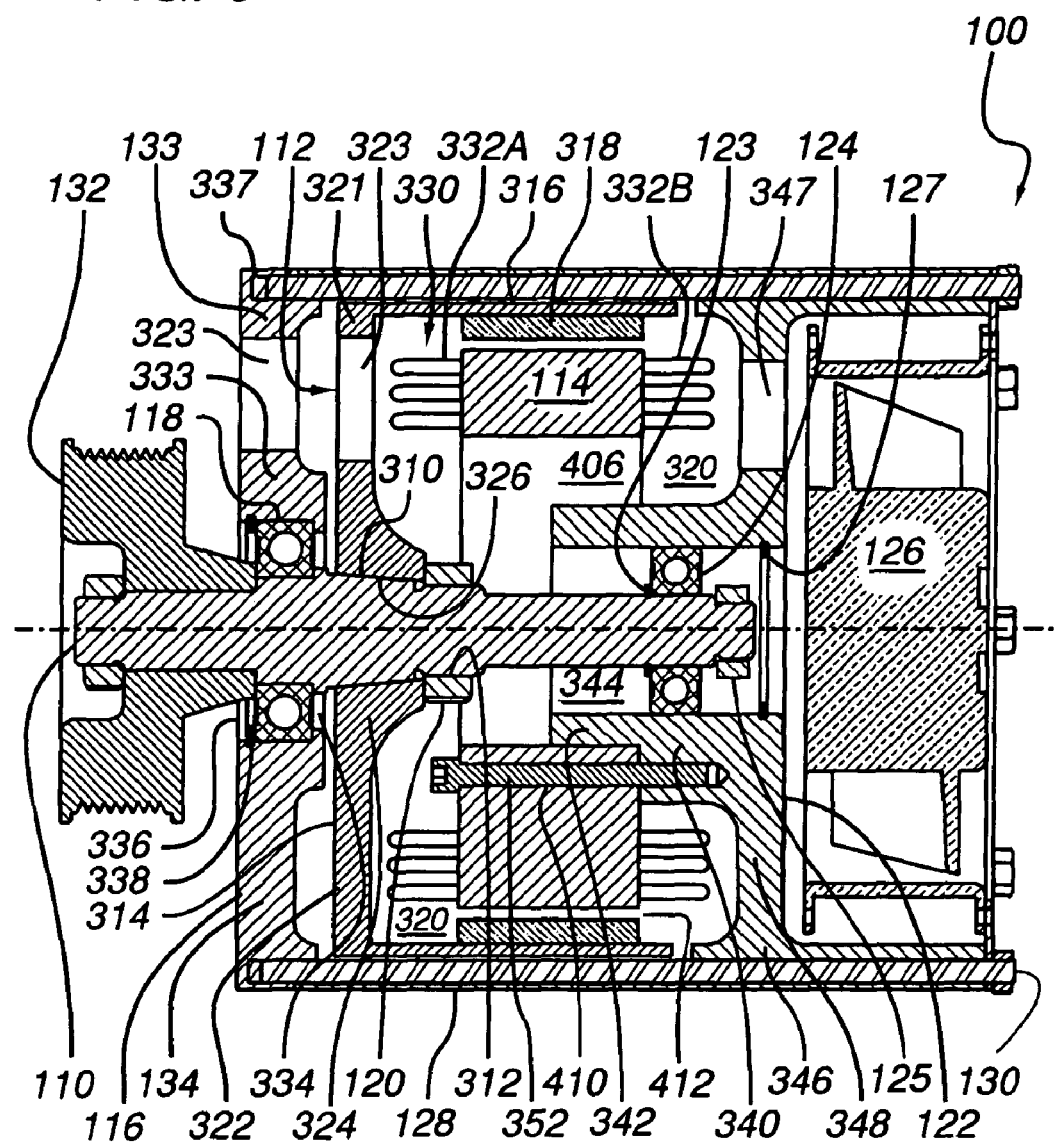
FIG. 3 is a schematic sectional view (taken along line BB in FIG. 2) of the alternator of FIGS. 1 and 2 (with windings shown schematically).

Stator 114 suitably comprises a core 328 and conductive windings 330 (FIG. 3, shown only schematically). As best seen in FIG. 4, core 328 is generally cylindrical, with an axially crenellated outer peripheral surface, i.e., includes a predetermined number of teeth 402 and slots 404. Core 328 is preferably substantially open (except in an all fluid cooled alternator as will be discussed), with a central aperture 406 defined by the cylindrical interior surface 407 of core 328.

One embodiment of core 328 suitably includes crossarms 408 extending radially inward from surface 407. Crossarms 408 suitably include axial through-bores 410 to facilitate mounting core 328 to rear endplate 122. As best seen in FIG. 3, stator core 328 may be secured to rear endplate 122 by respective bolts 352 journaled through bores 410 and secured in tapped holes 350.

Figure 4A:
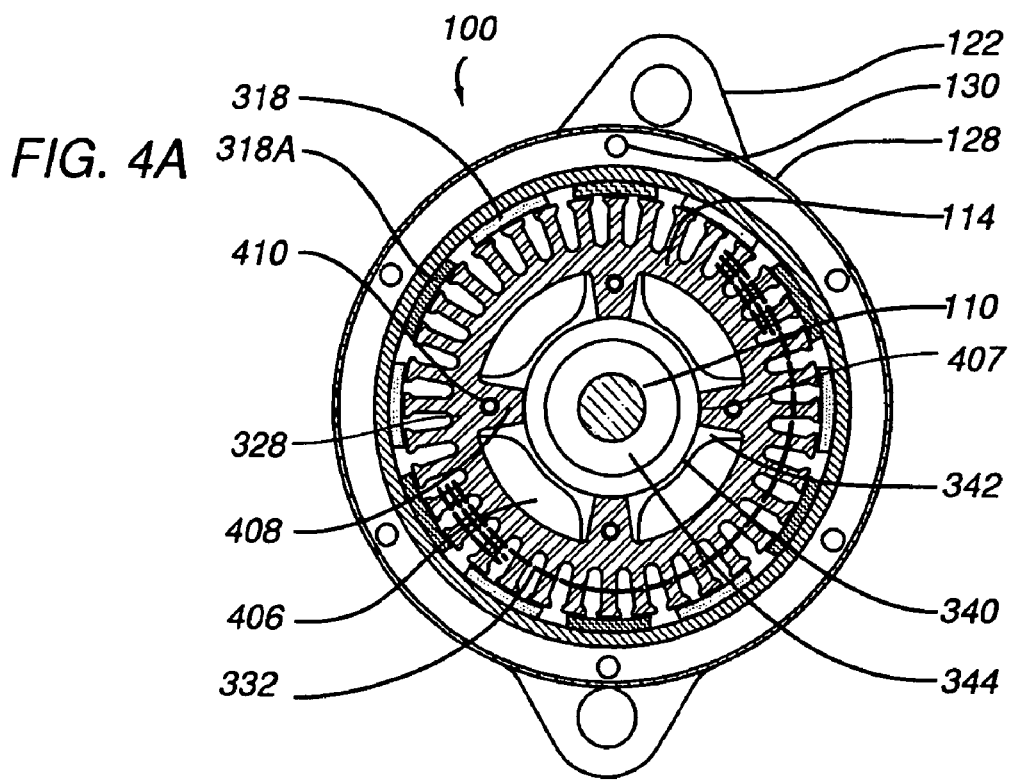
FIG. 4A is a schematic sectional view (taken along line CC in FIG. 2) of the alternator of FIGS. 1, 2 and 3 (with windings shown only schematically for clarity).
Figure 4B:
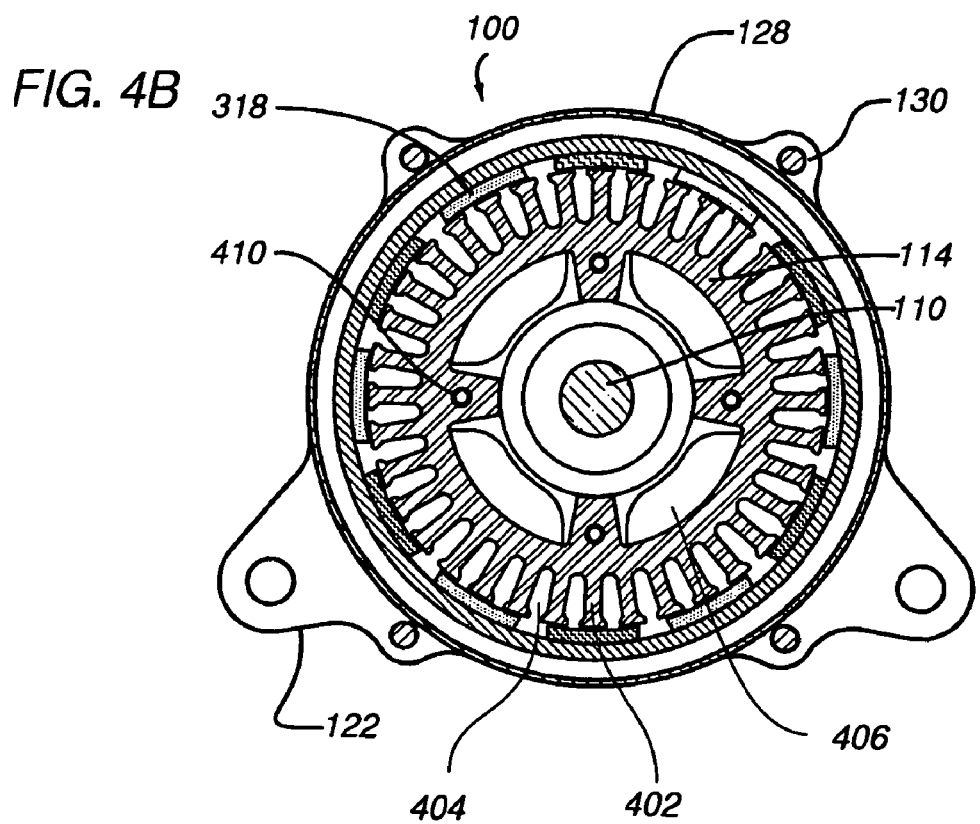
FIG. 4B is a schematic sectional view (taken along line CC in FIG. 2) of the alternator of FIGS. 1, 2 and 3 (with windings shown only schematically for clarity), modified such that the tie rods are exterior of the case.
Figure 4D:
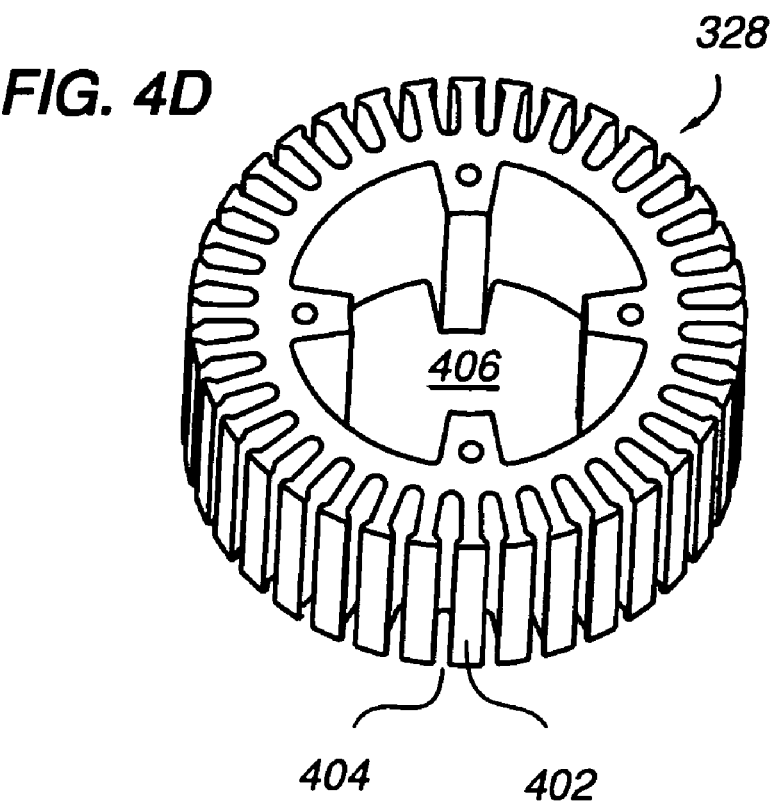
FIG. 4D is an isometric view of an axially and rotationally aligned stator core.

Core 328 suitably comprises a laminated stack of thin sheets of soft magnetic material, e.g. non-oriented, low loss (lead free) steel, that are cut or punched to the desired shape, aligned and joined (e.g., welded or epoxied together in a precision jig to maintain the separate laminations in predetermined alignment). In general, the respective laminations are axially and rotationally aligned so that the resultant stator teeth and slots are straight, aligned (disposed) parallel to the core axis, as illustrated in FIG. 4D.

Figure 4E:
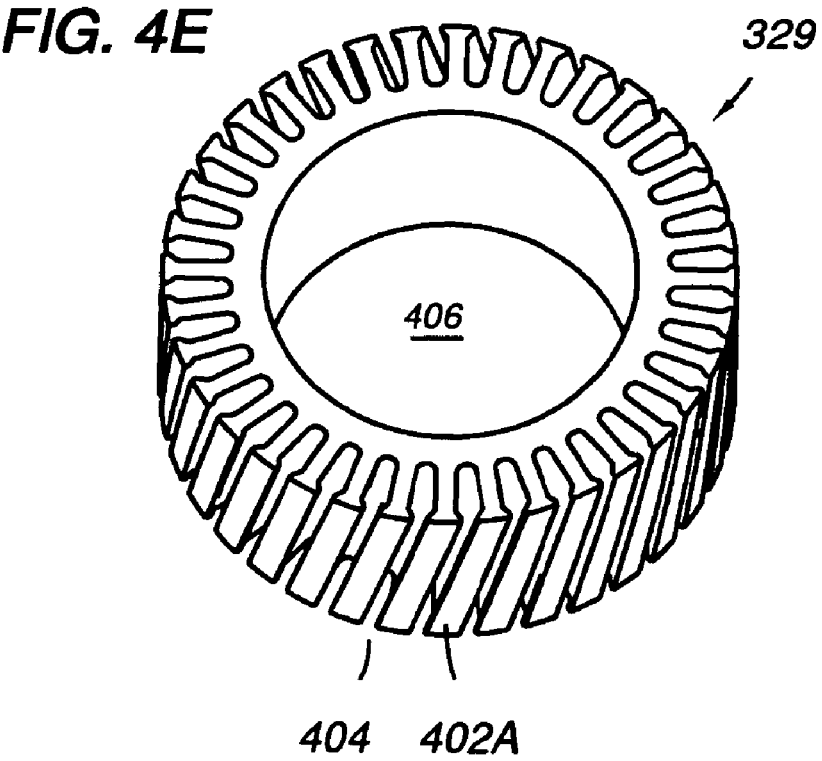
FIG. 4E is an isometric view of a skewed stator core.

However, it is advantageous, in applications employing control systems dependant on synchronization with the output, to have a power output wave with a particular waveform, e.g., sloping sides, to enhance control timing. This can be accomplished by establishing progressive (gradual) interaction between the rotor magnets and core teeth. Such progressive interaction can be provided by, for example, by utilizing teeth and slots with an edge skewed with respect to magnets 318, e.g., manifesting a generally helical shape. In a laminar core such teeth and slots can be formed using a slight and progressive radial skewing of each successive lamination so that the net effect after welding or epoxying is a lamination stack with a predetermined offset in the radial position of a given tooth from the front face of the lamination stack to the rear face. In the preferred embodiment, the offset is the equivalent of one tooth (e.g., the "$n^{th}$" tooth on the front face is aligned with tooth "n+1" on the rear face). The predetermined amount of offset is suitably any offset up to the equivalent of approximately 1 tooth, and preferably ranges from the equivalent of approximately 0.01 to approximately 1 tooth. An example of such a "skewed core" embodiment of core 328, designated 329, is shown in FIG. 4E. (Except when specifically otherwise, references hereinafter to core 328 are intended to refer to both the axially aligned embodiment of core 328 and the skewed embodiment 329.)

Figure 4F:
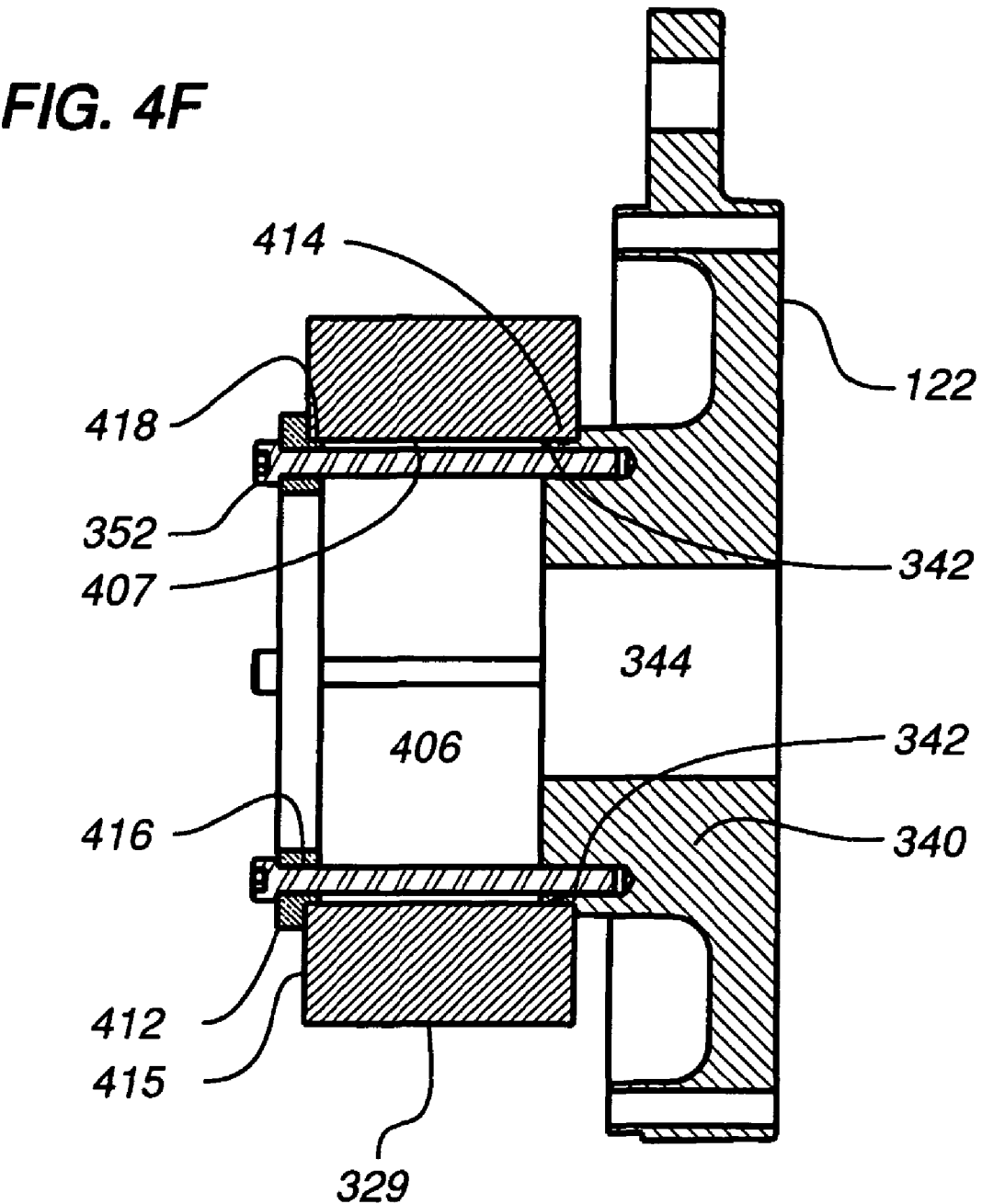
FIG. 4F is a sectional view detailing the mounting of the skewed stator core of FIG. 4E.

As shown in FIG. 4F, if crossarms 408 are omitted, e.g. as in skewed core 329, core 328 may be secured to rear endplate 122 using a suitable mounting ring 412, including a locating shoulder and throughbores 416 (corresponding to crossarm bores 410) cooperating with bolts 352 (in lieu of crossarms 408). In most cases, sufficient torque applied to mounting bolts 352 will be adequate to prevent rotation of core 328 relative to mounting ring 412 and rear endplate 122. However, if desired a suitable fastening method, such as, for example, epoxy, a pin, or key, can be incorporated to help prevent rotation of the lamination stack when in use.

Figure 4G:
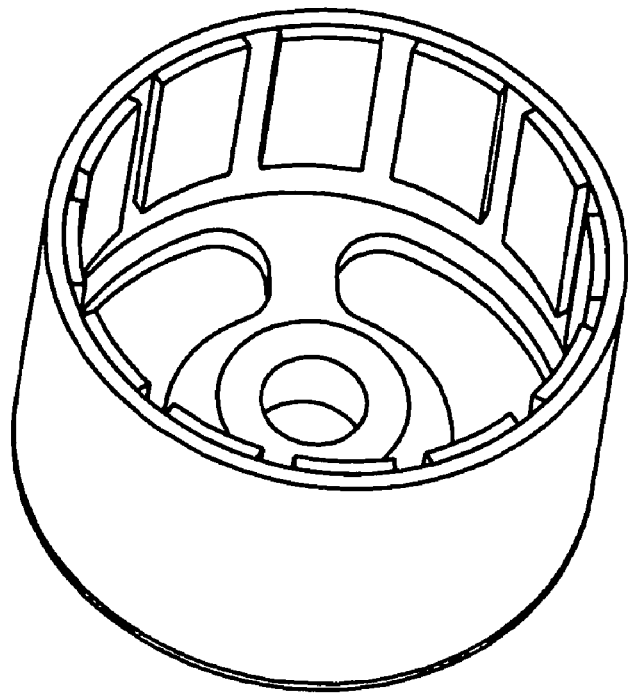
FIG. 4G is an isometric view of a rotor utilizing magnets with an axially aligned edge.
Figure 4H:
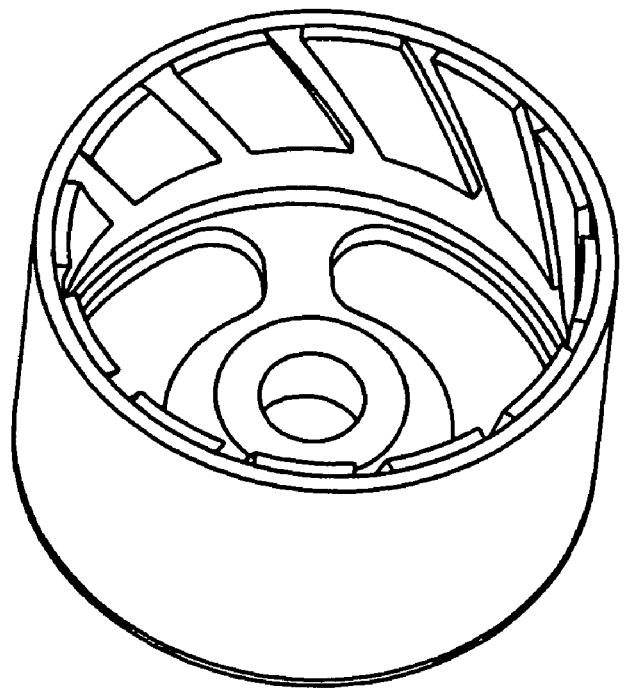
FIG. 4H is an isometric view of a rotor utilizing magnets with a skewed edge.

Progressive (gradual) interaction between the rotor magnets and core teeth can also be provided by skewing the edge of magnets 318 by a predetermined amount relative to the stator teeth. For example, a rotor utilizing magnets with a skewed edge is shown in FIG. 4H. For contrast, a rotor utilizing magnets with an axially aligned edge is shown in FIG. 4G. As in the case of the skewed core, the predetermined amount of offset is suitably any offset up to the equivalent of approximately 1 tooth, and preferably ranges from the equivalent of approximately 0.01 to approximately 1 tooth.

Windings 330, formed of a suitably insulated electrical conductor, preferably varnished copper motor wire, are provided on core 328, wound through a respective slot 404, outwardly along the side face of core 328 around a predetermined number of teeth 402, then back through another slot 404. The portion of windings 330 extending outside of slots 404 along the side faces of core 328 are referred to herein as front-side and rear-side end turns 332A and 332B, respectively (collectively referred to as end turns 332). Conventionally, end turns 332 of windings 330 are drawn tightly against the side face of core 328 to minimize the amount of wire (and hence impedance) in the windings. However as will be further discussed, in accordance with one aspect of the present invention, cooling may be facilitated by loosely winding end turns 332, such that end turns 332 extend outwardly from core 328 providing air spaces between the various wires and core 328.

If desired, windings 330 may be separated into a predetermined number of phases and/or into independent groups as described in the aforementioned Scott et al. U.S. Pat. No. 5,625,276.

In assembly, stator 114 is disposed coaxially with rotor 112, and is closely received within interior cavity 320 of rotor 112. As will be explained, rear endplate 122 mounts and locates stator 114 so that it is properly aligned within internal chamber 320 of rotor 112. The peripheral surface of stator core 328 is separated from the interior surface of magnets 318 by a small predetermined air gap 412 (best seen in FIG. 4B). Air gap 412 is suitably in the range of 20 to 40 thousands of an inch, and in the embodiments of FIGS. 1-4 on the order of 30 thousands of an inch, e.g., 31 thousands of an inch. Accordingly, the inner diameter of casing 316, magnets 318, and outer diameter of stator core 328 are preferably held to close tolerances to maintain alignment. It is important that rotor 112 and stator 114 be carefully aligned, and displacement of the elements from their normal positions due to external forces on the alternator held below a threshold value.

As noted above, alignment of shaft 110, rotor 112, and stator 114 achieved by a bearing structure comprising front endplate 116, front bearing 118, rear bearing 124, rear endplate 122, outer casing 128 and tie rods 130. Bearings 118 and 124, in effect, provide respective points of rotatable connection between shaft 110 and the bearing structure. Bearings 118 and 124, and hence shaft 110, are disposed concentric and perpendicular with endplates 116 and 122, respectively. Rotor 112 is preferably positively positioned with respect to shaft 110 through cooperation of tapered rotor hub through bore 326 and tapered shaft portion 310. Stator 114 is located relative to and aligned with shaft 110, and hence rotor 112, by rear endplate 122. The alignment of endplates 116 and 122 is maintained by outer casing 128 and tie rods 130.

Front endplate 116 is suitably generally cylindrical, including: a centrally disposed hub, including a coaxial aperture 334 with a counterbore 336; a peripheral portion 133 including respective (e.g. eight) tapped holes 337 disposed at predetermined radial distances from the center of aperture 334, distributed at equal angular distances, to receive tie rods 130; and respective (e.g., 4) crossarms 134 connecting peripheral portion 133 to hub 333, and defining respective air passages 136. Front endplate 116 is dimensioned and machined to high tolerance (e.g. plus or minus 0.0008 TYP for counterbore 336, 0.005 TYP for other features, such as tie rod hole 337 patterns, outer case shoulder, mounting hole patterns), suitably formed of metal e.g. cast aluminum, and should be sufficiently strong to withstand the rotational loads created by the turning of shaft 110 and rotor 112, as well as side loading that occurs as a result of the belt pulling on pulley 132. Front bearing 118 is closely received in counterbore 336 and suitably secured, e.g. by a suitable retaining ring 338. Front endplate 116 thus locates front bearing 118 to center shaft 110.

Rear endplate 122 carries and locates rear bearing 124, mounts and locates stator core 328, and suitably provides a mounting surface for fan 126. Rear endplate 122 suitably includes a stepped central hub 340 having a forward reduced diameter portion 342 and central aperture 344 there through, and a generally cylindrical rearward going outer portion 346, preferably having the same outer diameter as front endplate 116, connected to hub 340 by respective crossarms 348. As will be further described, rear endplate 122 also suitably includes respective air passageways 347, bounded by adjacent crossarms 348, outer portion 346, and hub 340. Respective through bores 350 are provided cylindrical outer portion 346, at the same radial distance from center and angular dispositions as tapped holes 337 in front endplate 116. A predetermined number of tapped holes (e.g. 4) corresponding to stator crossarm bores 410 (or mounting collar bores 416) are provided in the stepped surface of projection 340. The outer diameter of reduced diameter portion 342 is substantially equal to (but slightly less than) the diameter of stator aperture 406, so that rear endplate portion 342 may be closely received within stator aperture 406. Rear endplate 122 is dimensioned and machined to high tolerance (e.g. plus or minus 0.0008 TYP for central aperture 344, 0.005 TYP for other features, such as tie rod hole 350 patterns, outer case shoulder, mounting hole patterns), suitably formed of metal e.g. cast aluminum. Rear bearing 124 is closely received within aperture 344 of rear endplate hub 340 and thus centers shaft 110.

Stator core 328 is mounted on hub 340, with reduced diameter hub portion 342 received within stator aperture 406 and the stator rear sidewall abutted against the hub step. If core 328 includes crossarms 408, the crossarms suitably abut hub 340. If core 328 does not include crossarms 408, e.g., skewed core 329, the core interior surface 407 suitably abuts reduced diameter hub portion 342. Respective bolts 352 journaled through bores 410 (or 416) and secured in tapped holes 350, secure stator core 328 to rear endplate 122. Stator 114 is thus positively located and aligned relative to shaft 110.

In accordance with one aspect of the present invention, rotor 112 is positively located on and aligned with shaft 110. More specifically, as previously noted, includes a portion 310 with a predetermined taper (e.g. suitably in the range of 1 in. diameter per 7 inches of length to 1 in. diameter per 16 inches of length, and preferably 1 in. per foot.), just forward of threaded portion 134, between front bearing 118 and rear bearing 124. The minimum diameter of shaft tapered portion 310 is suitably slightly greater then the diameter of threaded portion 134. Rotor hub 324 includes a through-bore 326 having a predetermined taper corresponding to that of shaft portion 310. The maximum diameter of tapered through bore 326 corresponds to (e.g. is substantially equal to or slightly less than) the maximum diameter of shaft of tapered portion 310, and the minimum diameter of tapered through bore 326 corresponds to (e.g. is substantially equal to or slightly smaller than) the minimum diameter of shaft of tapered portion 310. The axial dimension of hub 324 is such that when fully seated, it extends slightly beyond the end of shaft section 310 axial dimension of hub 324 is such that when fully seated, it extends slightly beyond the end of shaft section 310. In assembly, shaft 110 is journaled through bore 326, such that shaft tapered portion 310 is received in bore 326. Threaded shaft portion 312 cooperates with jam nut 120 to force rotor hub tapered surface 326 axially into wiping contact with the tapered surface of shaft portion 132 until the surfaces mate. Rotor 112 is thus accurately positioned, centered and aligned on shaft 110 with a strong mechanical bond.

Since endplates 116 and 122 are held in alignment with each other by outer casing 128 and tie rods 130, shaft 110 (and tapered portion 310) is held in alignment with endplates 116 and 122 by bearings 118 and 124, and stator 114 is positively positioned and aligned with shaft 110 by endplate 122, the positive positioning and a centering of rotor 112 on shaft 110 also provides relative positioning and alignment between rotor 112 and stator 114.

In vehicular applications alternator 110 may be subjected to relatively severe accelerations that tend to cause distortion and/or displacement of rotor 112 due to the moment of inertia inherent in the rotational case. Such accelerations are, due to, for example, engine vibration (particularly diesel engines at startup), cornering, traversing bumpy roads or terrain, and other types of impact. The efficiency of permanent magnet alternator 100 is inversely proportional to the width of "air gap" 412 separating the magnets from the stator. As previously noted, air gap 412 is suitably in the range of 20 to 40 thousands of an inch, and in the embodiments of FIGS. 1-4 on the order of 30 thousands of an inch, e.g., 31 thousands of an inch. Displacement of rotor 112 need only exceed the width of air gap 412 to clause clashing and possibly destructive interference. Further, for a variety of reasons, e.g. to minimize inertia in operation of alternator 100, it is desirable that rotor 112 be as light as possible. Accordingly, rotor 112 tends to be susceptible to distortion due to such forces.

Referring to FIG. 5A, in the absence of external forces, rotor 112 is concentric and perpendicular with shaft 110; rotor casing 316 is in a nominal normal position (designated by lines 502 and 504) coaxial with shaft 110 and the forward (closest to forward endplate 116) edge of rotor endcap 314 is in a nominal normal position (designated by line 506) perpendicular to the axis of shaft 110. Components of external forces typically encountered parallel to the axis of shaft 110 tend to have little effect on the disposition of rotor 112; rotor endcap 314 and cooperation of rotor hub 324, tapered shaft portion 310, and jam nut 120 are sufficiently strong to resist axial movement or distortion of rotor 112, and, in any event, there is greater tolerance to axial distortions. However, external forces tend to be encountered with components perpendicular to the axis of shaft 110 of sufficient strength to distort rotor 112. In addition to deflection of rotor 112 due to external forces, as a practical matter, due to limitations (tolerances) in the manufacturing process, rotor 112 tends to be very slightly out of round (cylinder casing 316 will not be absolutely parallel to shaft 110), causing a conical wobble during rotation further reducing the air gap eccentrically.

More specifically, when subjected to accelerations perpendicular to the axis of shaft 110, rotor casing 316 tends to maintain its cylindrical shape. However, a distortion is manifested in rotor endcap 314. In effect, rotor 112 is cantilevered at the conjunction of rotor endcap 314 and shaft 110 (indicated a schematically as anchor (cantilever) point 508). In response to perpendicular acceleration, rotor 112, in effect, pivots about anchor point 508 in the direction of the force. Maximum deflection from the nominal normal position is experienced at the portions of rotor 112 farthest from anchor point 508, i.e. the distal (rear) end of casing 316, and the outer periphery of endcap 314 (where endcap 314 joins casing 316). If the deflection in the vicinity of magnets 318 exceeds air gap 412, e.g. 31 thousands of an inch, magnets 318 will clash with stator 114, causing possibly destructive interference. Similar issues arise if out of round wobble causes a deviation from the norm that exceeds air gap 412.

For example, as shown in FIG. 5B, in response to an upward acceleration, rotor 112 will in effect pivot downwardly (as shown, in a clockwise direction). The upward side of rotor casing 316 will effectively pivot inwardly towards shaft 110, with the distal end deflected inwardly from the nominal normal position 502 by an amount generally indicated as 510. The upward periphery of endcap 314 similarly moves to the rear of its nominal normal position 506 by an amount generally indicated as 512. Conversely, the distal end of downward side of rotor casing 316 will be deflected outwardly from the nominal normal position 502 by an amount generally indicated as 514 and the downward periphery of endcap 314 similarly moves forward of its nominal normal position 506 by an amount generally indicated as 516. Since cylindrical rotor casing 316 maintains its shape, the amount of deflection of the corresponding upper and lower portions are substantially proportional i.e. deflections 510 and 512 are substantially proportional (and in many geometries equal) to deflections 514 and 516, respectively.

Figure 5C:
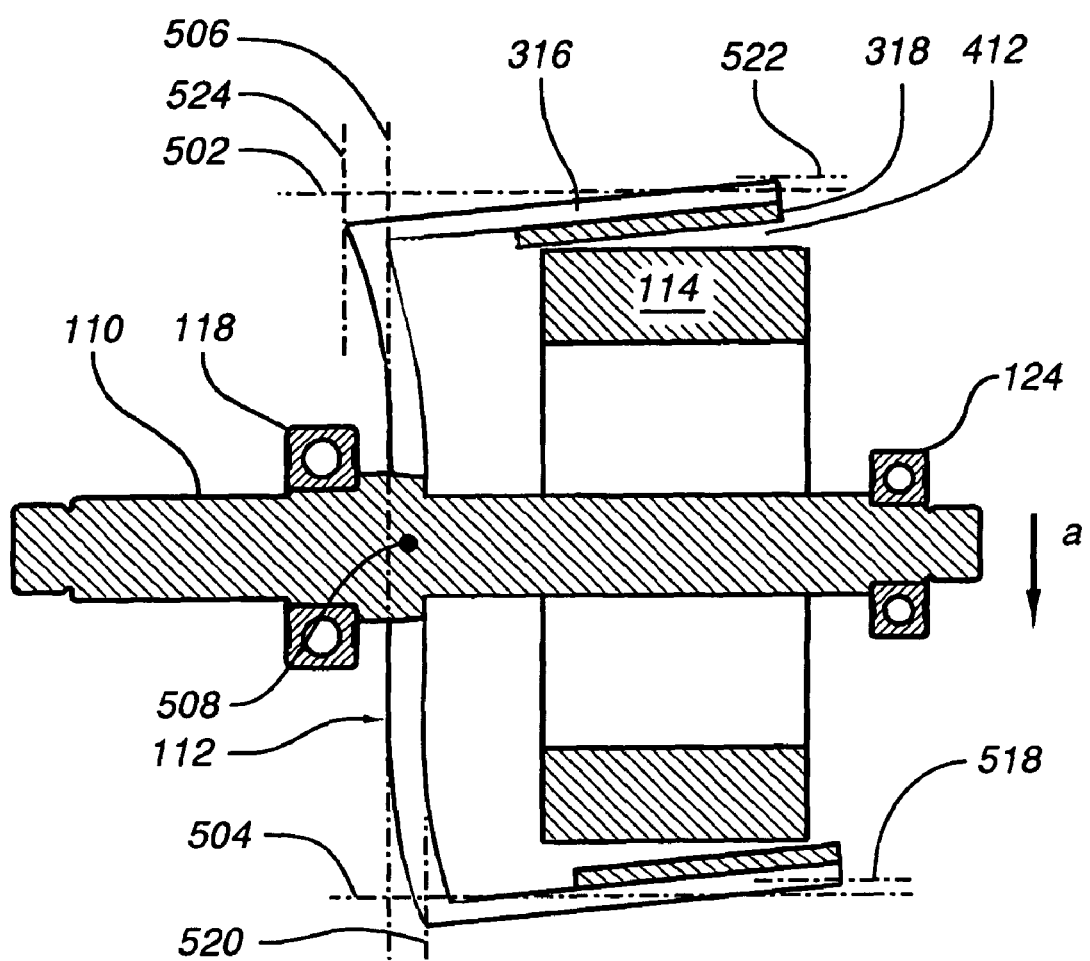

Forces from opposite directions will cause mirror image deflections. For example, as shown in FIG. 5C, in response to a downward acceleration, rotor 112 will in effect pivot upwardly (as shown, in a counterclockwise direction). The downward side of rotor casing 316 will effectively pivot inwardly towards shaft 110, with the distal end deflected inwardly from the nominal normal position 504 by an amount generally indicated as 518. The downward periphery of endcap 314 similarly moves to the rear of its nominal normal position 506 by an amount generally indicated as 520. Conversely, the distal end of upward side of rotor casing 316 will be deflected outwardly from the nominal normal position 502 by an amount generally indicated as 522 and the upward periphery of endcap 314 similarly moves forward of its nominal normal position 506 by an amount generally indicated as 524. Again, since cylindrical rotor casing 316 maintains its shape, the amount of deflection of the corresponding upper and lower portions are substantially proportional (and in many geometries equal) i.e. deflections 518 and 520 are substantially proportional essays to deflections 522 and 524, respectively.

In accordance with a further aspect of the present invention, clashing is prevented by disposing one or more bumpers to arrest rotor deflection from the nominal normal position before the deflection of magnets 318 exceeds air gap 412. The bumpers can be disposed on either or both of the interior or exterior of rotor 112, interacting with one or both of casing 316 or end cap 314; since rotor casing 316 maintains its shape preventing either inward or outward deflection of casing 316 or end 314 from exceeding predetermined limits corresponding to the width of the air gap will prevent clashing. Bumpers are formed of a relatively smooth and resilient material with a predetermined durometer such that it deforms no more than a predetermined amount before arresting deflection of rotor 112 in response to maximum loads (e.g. 20 g's gravities). Examples of such a material are Teflon, glass impregnated Teflon and oil impregnated sintered bronze. The bumpers can be disposed on, for example, a feature of rear endplate 122, front endplate 116 or other support structure (e.g. tie rods 130), and use a portion of rotor 112 as a bearing surface. Alternatively, the bumper can be disposed on rotor 112 and utilize a feature of the support structure as a bearing surface, or in some instances be interposed in air gap 412 between magnets 318 and stator 114. The bumpers are disposed separated from the cooperating bearing surface by a predetermined amount, sometimes referred to herein as a "support gap", e.g. 0.01 in. The support gap is chosen such that the support gap plus the maximum amount of deformation of the bumper is less than magnetic air gap 412. In addition the bearing surfaces interacting with the bumper may be treated, e.g. to minimize friction and/or hardened. For example, chrome or some other type metallic zinc type finish may be employed.

Figure 6A:
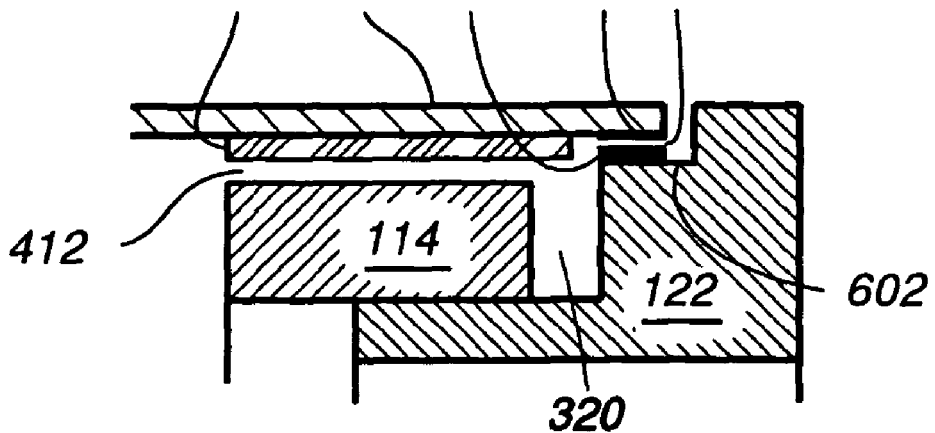
FIGS. 6A, 6B, 6C, 6D, 6E, 6F, and 6G (collectively referred to as FIG. 6) are schematic sectional diagrams of respective embodiments of mechanisms for preventing destructive interference between the rotor and stator of an alternator in accordance with the present invention.
Figure 8:
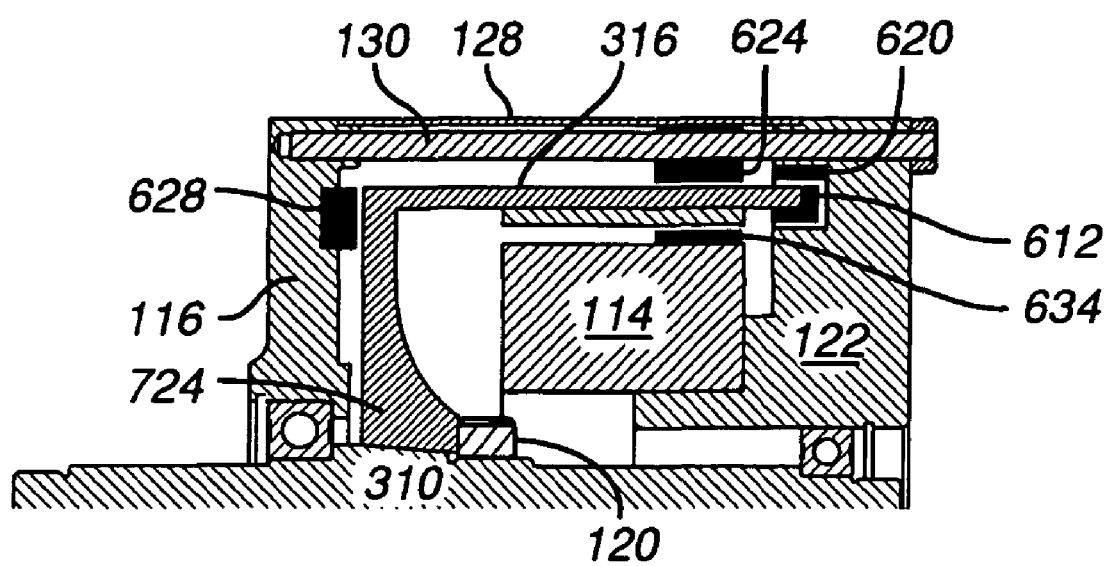
FIG. 8 is a schematic sectional diagram (partial) of an alternator employing the rotor of FIG. 7A and a combination of the mechanisms for preventing destructive interference of FIG. 6. Gap spaces in the various figures of the drawing are exaggerated for clarity.

As previously noted, clashing of magnets 318 and stator 114 can be avoided by preventing inward deflection of rotor casing 316. Referring to FIGS. 6A and 8, a generally cylindrical shoulder 602 may be formed on rear endcap 122, extending forward to underlie the end of rotor casing 316, i.e. received within rotor internal chamber 320. The outer diameter of shoulder 602 is less than the inner diameter of rotor casing 316 by a predetermined amount. A cylindrical bumper 604 is disposed about shoulder 602. The outer surface of bumper 604 is thus coaxial with rotor casing 316, and separated from the inner surface of rotor casing 316 by a support gap 606. Bumper 604 is formed of a material with a predetermined durometer such that it deforms no more than a predetermined amount before arresting deflection of rotor casing 316. Support gap 606 is chosen to be sufficiently less than magnetic air gap 412, that the inner surface of rotor casing 316 overlying bumper 604 comes into contact with bumper 604 and maximum deformation of bumper 604 occurs before magnets 318 come into contact with stator core 314, i.e. the support gap plus the maximum amount of deformation of bumper 604 is less than magnetic air gap 412. If desired, a surface treatment, e.g. a chrome, metallic zinc or hard anodize layer 608 can be provided on the bearing surface of rotor casing 316.

Figure 6B:
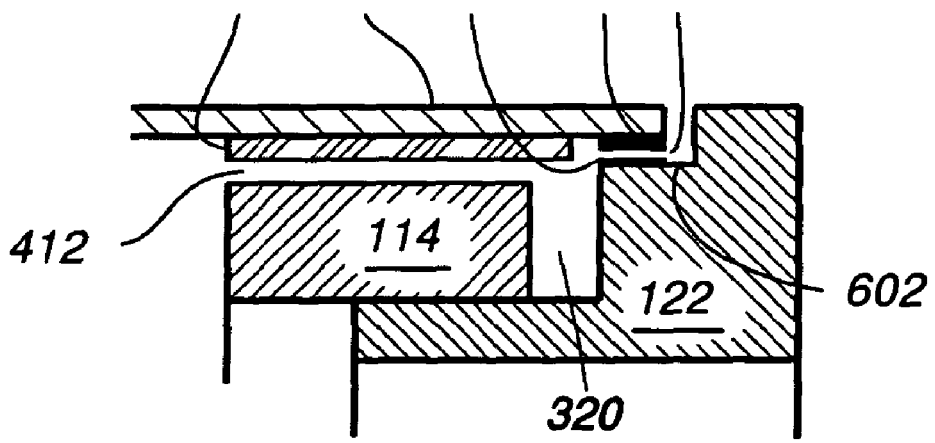

Alternatively, as shown in FIG. 6B, a cylindrical bumper 610, having outer diameter substantially equal to the inner diameter of rotor casing 316, can be affixed (e.g. glued) to the inner surface of rotor casing 316. The inner surface of bumper 604A would be separated from the outer surface of rear end shoulder 602 (which acts as the bearing surface) by support gap 606. If desired, a surface treatment 608A can be provided on the bearing surface of shoulder 602.

Figure 6C:
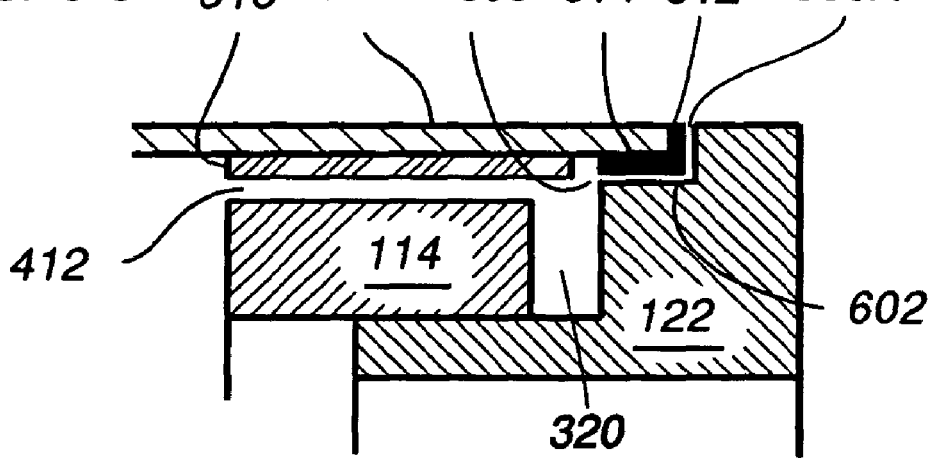

In some applications it may be desirable to employ a bumper (or surface treatment) in the form of a collar or sleeve received about the mouth of rotor casing 316. An example of such a structure is shown in FIG. 6C. A collar bumper 612 having a cylindrical body 614 of predetermined length and thickness and a lip 616 is affixed (e.g. glued by, for example, epoxy) to the mouth of rotor casing 316. Collar bumper 612 cooperates with rear endplate 122 to prevent clashing of magnets 318 and stator 114. Collar body 614 is separated from the sidewall of shoulder 602 (which acts as a bearing surface with respect to collar body 614) by a support gap 606. If desired, the end surface of collar lip 616 may cooperate with the sidewall of rear endplate 122 separated from rear endplate 122 by an appropriate support gap 606A to provide additional protection against deflection of rotor casing 316.

In general, it is desirable to dispose as little as possible on rotor 112 to minimize rotor weight, and thus inertia. In some instances, however, ease of assembly may make the embodiments of FIG. 6B or 6C desirable.

Figure 6D:
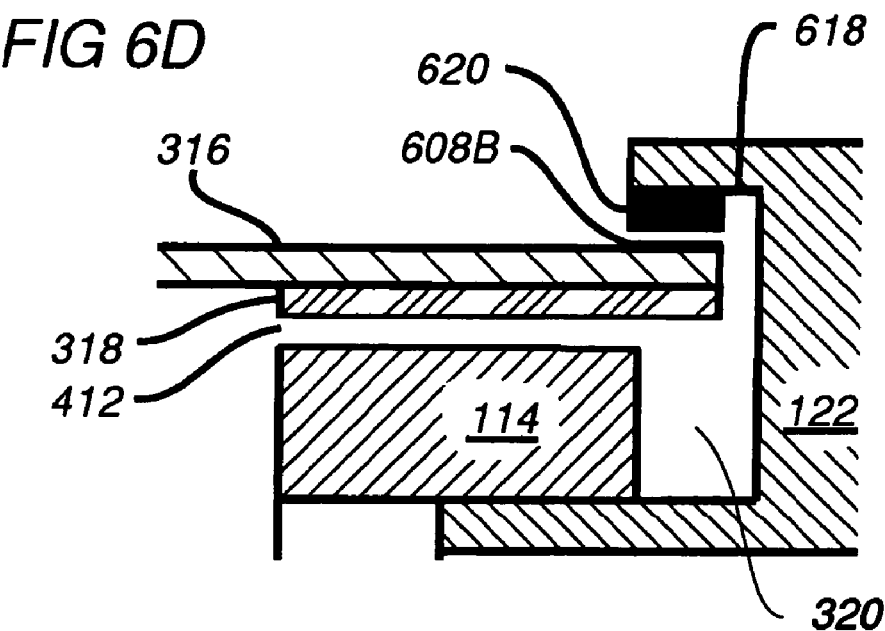

As previously above, clashing of magnets 318 and stator 114 can be avoided by preventing outward deflection of rotor casing 316. Referring to FIGS. 6D and 8, a generally cylindrical shoulder 618, coaxial with rotor casing 316 but having an inner diameter greater than the outer diameter of rotor casing 316 by predetermined amount, is provided on rear endcap 122, extending forward to overlie the end of rotor casing 316. A cylindrical bumper 620, is affixed (e.g. glued) to the interior sidewall of shoulder 618, positioned coaxial with rotor casing 316. The inner diameter of bumper 620 is greater than the outer diameter of rotor casing 316 by an amount equal to a support gap 622. The outer surface of rotor casing 316 acts as a bearing surface. If desired, a surface treatment 608B can be provided on the bearing surface of rotor casing 316.

Figure 6E:
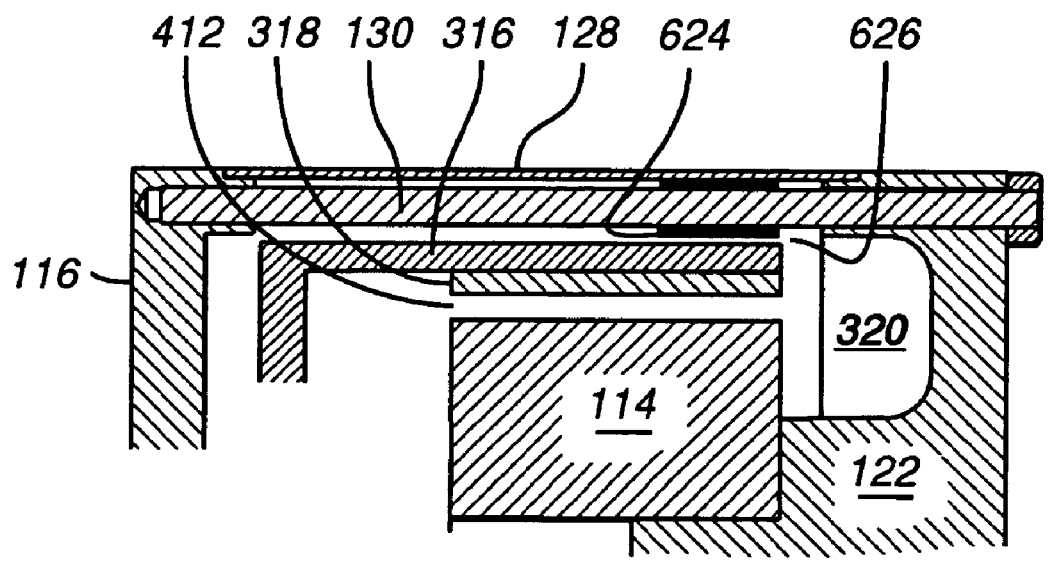

Bumpers can be disposed on other support structure, and use a portion of rotor 112 as a bearing surface. For example, referring to FIGS. 6E and 8, respective cylindrical bumper sleeves 624 are disposed coaxially one or more (preferably each) of tie rods 130. The outer diameters of bumper sleeves 624 are chosen such that the surface of the sleeve nearest rotor casing 316 is separated from casing 316 by an appropriate support gap 626. Bumper sleeves 624 may be affixed to tie rods 130, but are preferably rotatable, i.e. act as rollers with tie rods 130 as axes. Rotation of bumper sleeves 624 will tend to reduce wear, and extend the life of the bumpers. Disposition of bumper sleeves 624 at least two sets of opposing tie rods 130 (at 180° from each other) around rotor casing 316 tends to counteract forces on rotor 112 from any direction transverse to shaft 110.

Figure 6F:
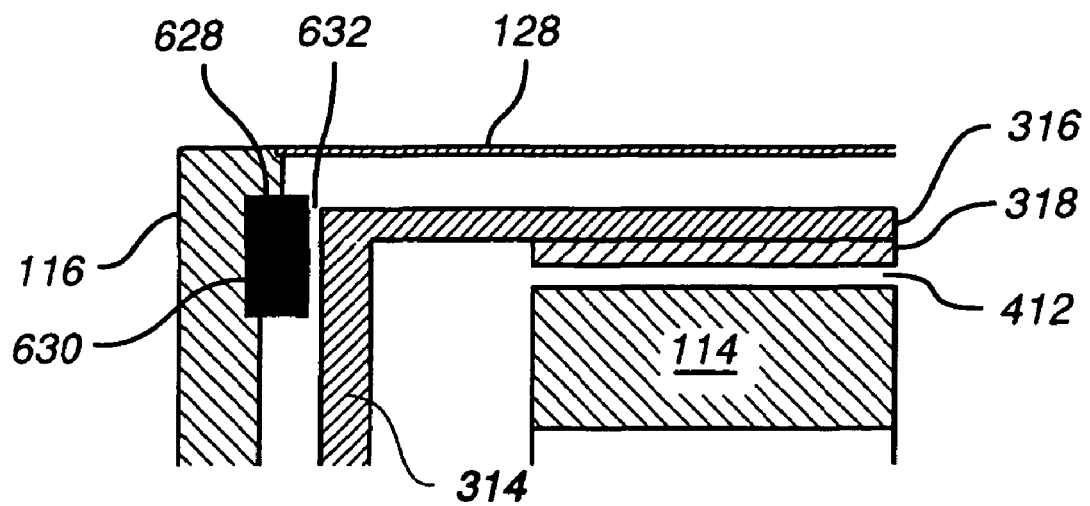

Bumpers may also be disposed on front endplate 116, with the front surface of rotor endcap 314. Referring to FIGS. 6F and 8, a annular bumper 628, is affixed (e.g. glued) to the interior sidewall of front endplate 116, positioned coaxial with rotor casing 316. The inner and outer diameters of bumper 628 are preferably chosen to correspond to (e.g. bracket) the outer periphery of endcap 314. A annular depression 630 for receiving and locating bumper 628 is suitably provided in the interior sidewall of front endplate 116. If desired, other locating features (e.g. projections or a shoulder) may also be provided on the interior sidewall of front endplate 116 to position bumper 628. Such projections, however, are suitably lower in profile than the maximum deflection of bumper 628. The thickness of bumper 628 is chosen such that the face opposing rotor endcap 314 is separated from endcap 314 by an appropriate support gap 632. The forward surface (closest to front endplate 116) of rotor endcap 314 acts as a bearing surface. By limiting the extent that the forward (closest to forward endplate 116) edge of rotor endcap 314 from its nominal normal position, clashing of magnets 318 and stator 114 can be averted. If desired, a surface treatment 608B can be provided on the bearing surface of rotor endcap 314.

In some instances (e.g. in the case of bumper sleeves 622) it may be desirable to initially place bumper 604 in contact with the bearing surface i.e. establish an initial support gap of zero. In such cases the material of the bumpers would-be chosen such that relative motion and interaction between the bearing surface and the bumpers would abrade the bumpers to ultimately establish an appropriate support gap.

Figure 6G:
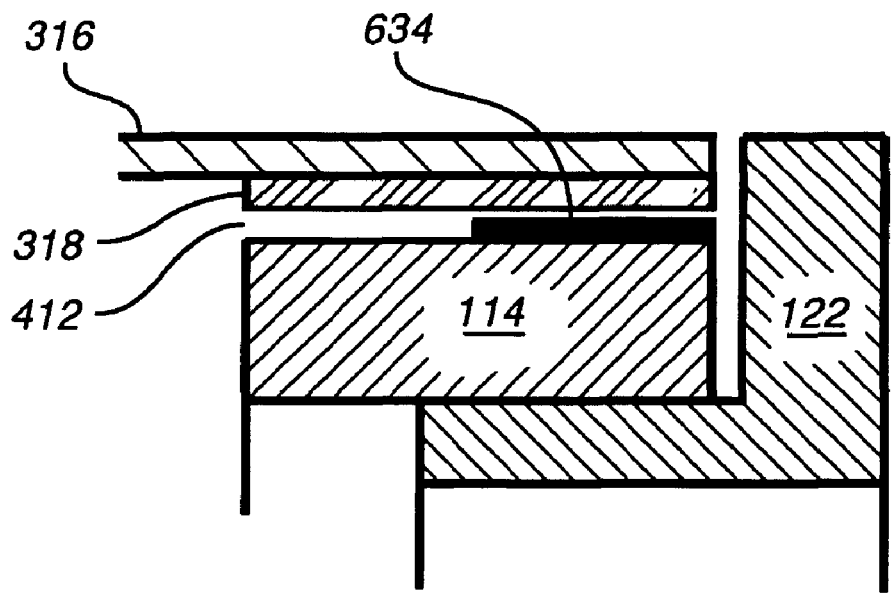

In some instances, it may be desirable to interpose a thin band of bumper material in air gap 412 between magnets 318 and stator 114. For example, referring to FIGS. 6G and 8, a thin band 634 of relatively robust substantially magnetically transparent material (e.g. Teflon tape) is disposed within air gap 412 on the outer surface (crenellated cylindrical sidewall) of stator 114 along the rear edge (edge of nearest rear endplate 122). Band 634 is made of a material having a durometer sufficient, given the thickness of band 634, to avoid total compression under maximum load and prevent magnets 318 from impact with stator 114. In addition, it is desirable that band 634 exhibits a relatively low coefficient of friction. If desired, a chromium surface treatment can be applied to magnets 318 to further reduce friction.

In addition to preventing potential clashes by using bumpers to limit the extent that rotor 112 can be deflected from its nominal normal position. It is also desirable to minimize the effect of external forces and out of round conditions due to manufacturing tolerances.

In accordance with another aspect of the present invention, deflection of rotor casing 316 (magnets 318) from the nominal normal position in response to force components perpendicular to shaft 110, and wobble due to out of round components can be reduced by reducing the axial distance between magnets 318 and the anchor point. This is achieved while still providing sufficient space in internal cavity 320 for stator windings 330, by contouring endcap 314 to couple the forward most end of rotor casing 316 (nearest front endplate 116) to an anchor point closer to magnets 318 within the interior of casing 316. At least a portion of rotor endcap 314 (e.g. crossarms 322) would effectively be at an angle other than 90° relative to rotor casing 316 (and hence shaft 110). The angled portion could be straight (e.g. such that a portion of endcap 314 was generally conical) or curved (e.g. such that a portion of endcap 314 was generally bell-shaped).

As previously noted, rotor 112 is, in effect, cantilevered at the conjunction of rotor endcap 314 and shaft 110 (anchor point 508 in FIG. 5). Maximum deflection from the nominal normal position due to external forces occurs at the portions of rotor 112 farthest from the anchor point, i.e. the distal (rear) end of casing 316, and the outer periphery of endcap 314 (where endcap 314 joins casing 316). Similarly, the greatest deviation from the normal path due to out of round wobble occurs at the portions of rotor 112 farthest from the anchor point, i.e. the distal (rear) end of casing 316. Out of round conditions due to tolerances result in a conical displacement from the nominal position of casing 316 i.e. as rotor 112 rotates around a given point on stator 114, rotor casing 316 will approach, and retreat from that point on stator 114. The greater the axial distance of the point on stator from the pivot point the greater the relative motion of the casing 316. For example, as shown in FIGS. 7A and 7B, at an axial distance X1 from the pivot point (e.g. the axial distance from pivot point 508 of a "flat" hub to the rear end of rotor casing 316), out of round conditions due to tolerances will tend to cause a wobble toward and away from the stator in the amount W1.

However, at a lesser distance X2 (e.g. the axial distance from pivot point 708 of a conical hub to the rear end of rotor casing 316), a lesser amount W2 is experienced. Accordingly, by moving the anchor point closer to the rear end of rotor casing 316 (and magnets 318), wobble in the vicinity of magnets 318 and stator 114 is reduced.

Figure 7A:
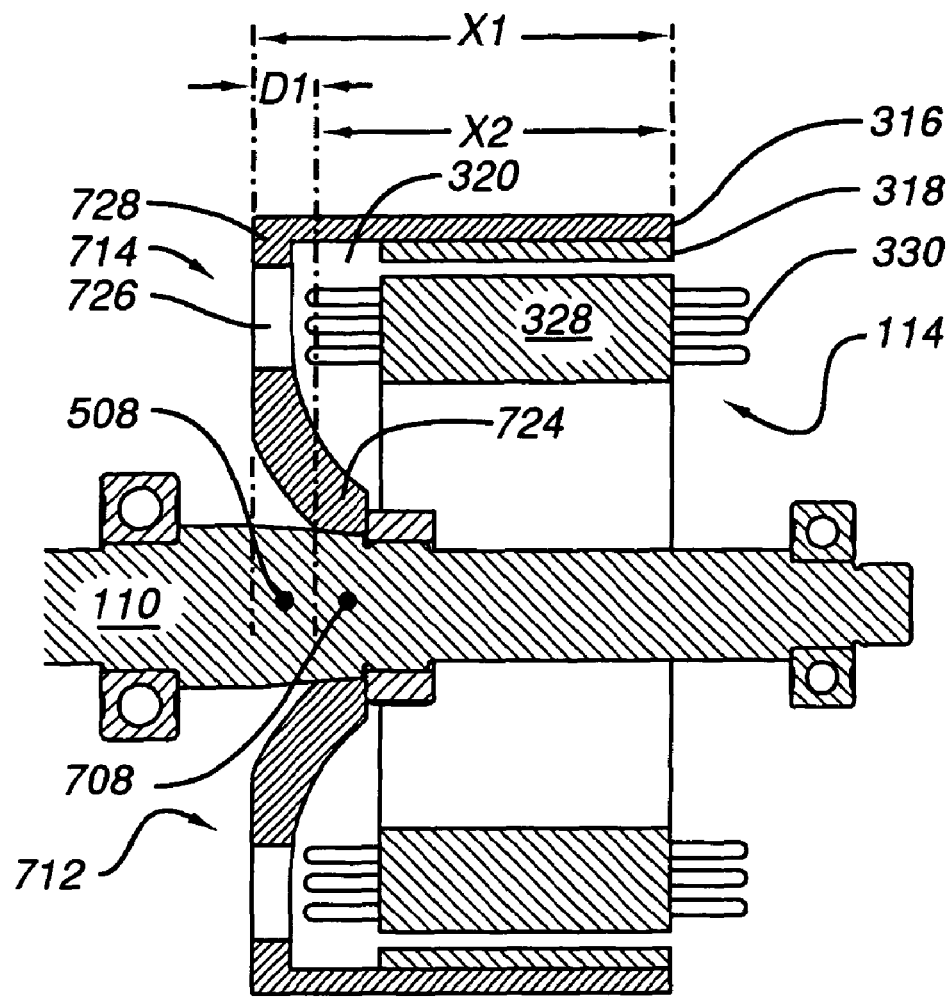
FIG. 7A is a schematic sectional diagram of an alternator employing a rotor with a conical endcap to reduce displacement of the rotor in response to external forces.
Figure 7B:
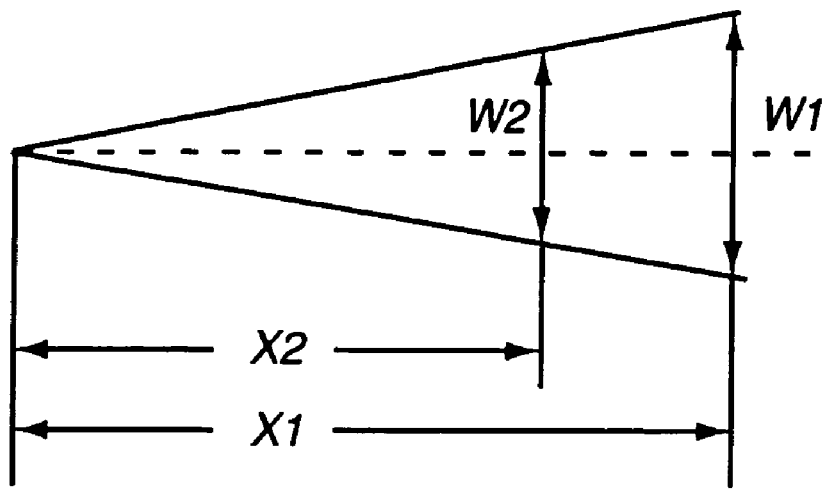
FIG. 7B is a diagram illustrating the wobble motion of the rotor.

Referring to FIG. 7A, reduced wobble rotor 712 includes an endcap 714 having a hub 724 that establishes an anchor (cantilever) point 708 disposed within the interior of rotor casing 316. Anchor point 708 is rearwardly displaced along the axis of shaft 110 from the forward edge of casing 316 (nearest front endplate 116), by a predetermined distance D1. In typical automotive applications, the diameter of casing 316 is suitably in the range of 2½ to 5 in., and preferably 4½ inches; and the length of casing 316 is suitably in the range of 3 to 6 in., and preferably 5 in. Distance D1 is suitably in the range of ½ to 1 inch and preferably ¾ inch. In certain military and commercial vehicles (e.g. Hummers), the diameter of casing 316 is suitably in the range of 5 to 8 in., and preferably 6½ inches; and the length of casing 316 is suitably in the range of five ½ to 10 in., and preferably 7 in. Distance D1 is suitably in the range of ¾ to 2 inch and preferably 1½ inch.

Rotor endcap 714 is contoured to connect the forward end of casing 316 to hub 724, while at the same time providing sufficient space in interior cavity 320 to accommodate stator windings 330. For example, in the embodiment of FIG. 7A, endcap 714 comprises a conical portion 726 (which may include a plurality of apertures (e.g. 3) to, in effect, provide prospective angled cross arms), and a generally annular peripheral portion 728 connecting cross arms 722 to the forward end of casing 316. Peripheral portion 728 extends perpendicularly from casing 316 towards shaft 110 a predetermined distance, suitably in the range of ½ inch to 2 inches, and preferably ¾ inches. Internal chamber 320 thus extends farther forward in the vicinity of the crenellated outer edge of stator core 328, and windings 330.

Figure 7C:
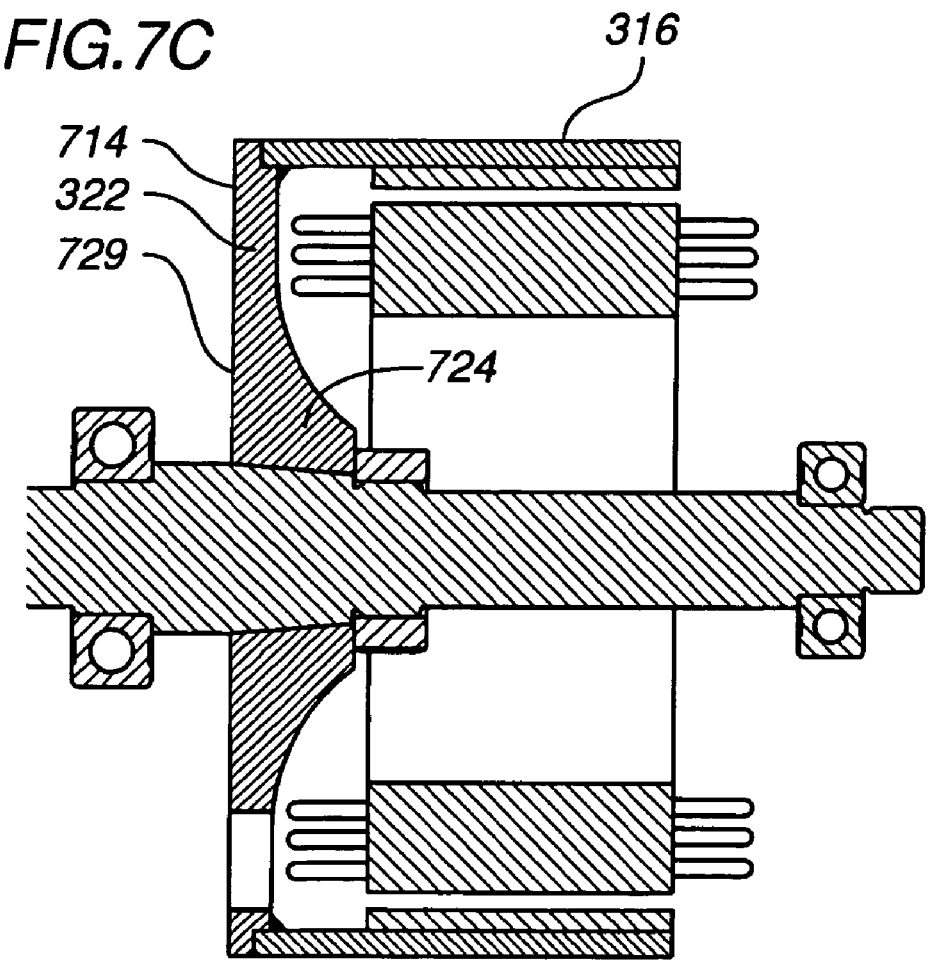
FIG. 7C is a schematic sectional diagram of an alternator employing a rotor with a greatly increased cross-sectional area to the endcap to reduce displacement of the rotor in response to external forces.
Figure 7D:
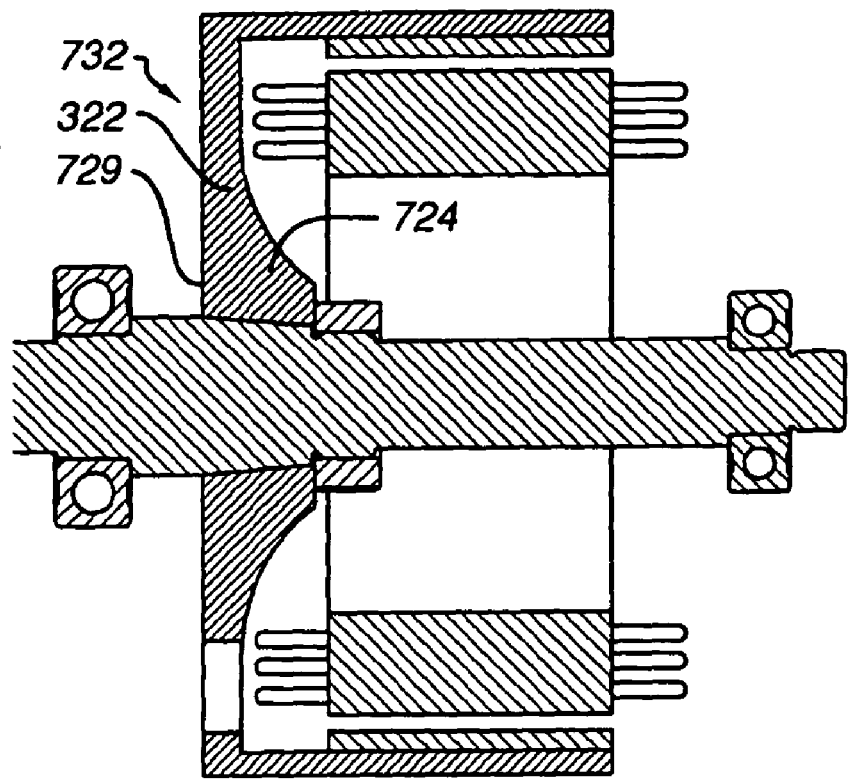
FIG. 7D is a schematic sectional diagram of an alternator using a rotor with a welded rotor case.
Figure 7E:
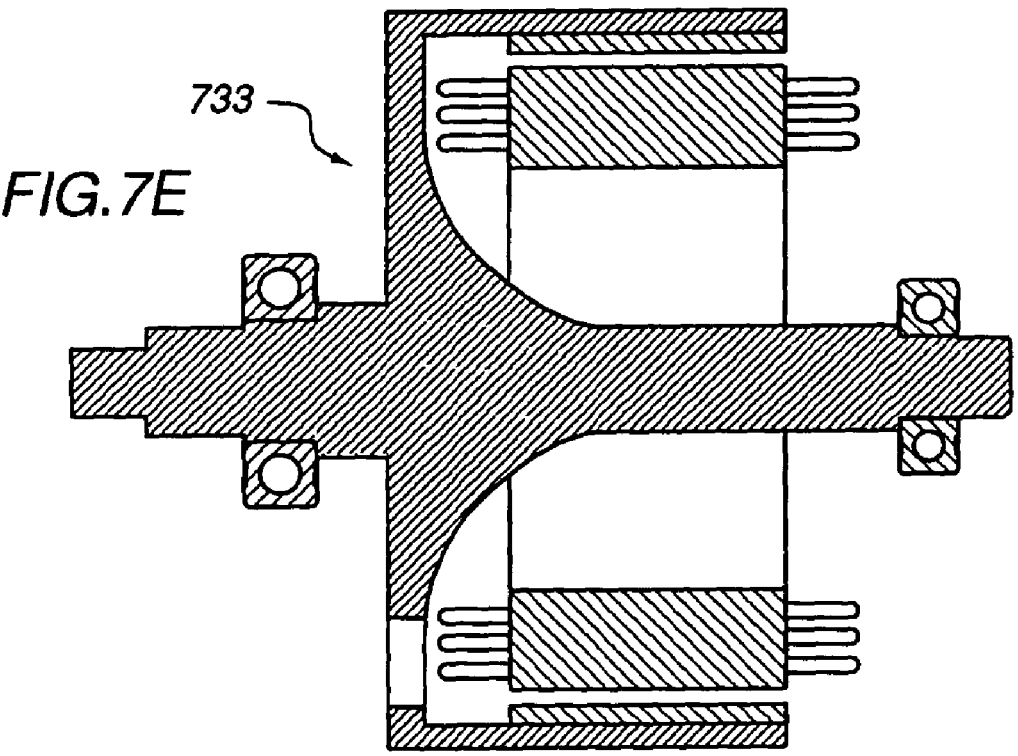
FIG. 7E is a schematic sectional diagram of an alternator employing a rotor and shaft cast as a single unit.

FIG. 7C shows a hub similar to that shown in FIG. 7A except that external surface 729 meets shaft 110 perpendicularly greatly increasing the cross sectional area. This increases the strength of endcap 714 helping it to better resist deflection as outlined in FIG. 5. In FIG. 7C casing 316 is welded 731 to endcap 714.

FIG. 7D shows both endcap 714 and casing 316 formed as a single integral unit 732. Unit 732 is suitably cast then machined, further increasing its strength. Unit 732 can also be machined entirely from a single billet of e.g., steel.

FIG. 7E shows all three, endcap 714, casing 316 and shaft 110 casts then machined as a single unit 733. This configuration allows for maximized strength and alignment since both the shaft portion and inner casing will be machined together minimizing wobble. This configuration also has the benefit of reducing parts and assembly time. Unit 733 can also be machined entirely from a single billet of steel eliminating the need for a casting.

As shown schematically in FIG. 8, a variety of bumpers can be used in combination, together with a contoured rotor endcap.

As previously noted, the heat generated by compact high power alternators can also be problematical. The stator windings are formed of a suitably insulated electrical conductor, e.g. varnished copper motor wire, and are wound through respective slots and about a predetermined number of teeth in the periphery of the stator core. As the rotor rotates relative to the stator, the magnetic field generated by the rotor magnets interacts with the windings, causing an electrical current to be generated. The windings, however, have a characteristic, and current flow through the windings generates heat that must be dissipated. Conventionally, the windings are tightly wound about the stator core, to minimize the length of the windings, and hence impedance, and airflow to effect cooling has been provided by fans driven by the motive force to the rotor, e.g. off of the shaft on which the rotor is attached. Accordingly, little airflow is provided at low rpm.

However, in various automotive applications, such as, for example, hybrid vehicles, demand for relatively high levels of power, and thus an elevated need for cooling, can occur at low rpm, e.g. at idle speeds. This is also particularly true in those instances when a starter-generator or other electric motor is employed to provide an initial burst of propulsion when the driver depresses the accelerator pedal, facilitating shutting off the vehicle engine when the vehicle is stopped in traffic to save fuel and cut down on emissions. Further, in compact high power alternators, significant heat levels are generated in a relatively small area. The efficacy of air cooling of alternator components is a function of the quantity of air flowing through the alternator. In compact high power alternators the cross-sectional area available for airflow for a given power output is less than that available in a conventional alternator. Accordingly, air cooling tends to be less efficient. However, permanent magnets are particularly susceptible to damage due to overheating; under high load, high temperature conditions, such magnets can become demagnetized. Similarly, the electronic components employed in the controller are susceptible to heat damage. Thus, conventional cooling techniques tend to be inadequate for such compact high power alternators, particularly in automotive applications.

In accordance with other aspects of the present invention, cooling is facilitated by one or more of: loosely wrapping winding end turns 332 to, in effect, increase the surface area of windings 330; establishing a directed airflow over at least a portion the stator windings, (preferably through loosely wrapped end turns of the windings); directing a portion of the airflow over elements in thermal contact with magnets 318 (e.g. over rotor casing 316) to cool magnets 318; providing airflow from a source that is asynchronous with respect to the shaft on which the rotor is mounted, e.g. an electric fan: and directing a flow of coolant fluid into thermal contact with end turns 332 (preferably through thermally conductive conduits including one or more portions disposed in loops generally concentric with the stator core in thermal contact with front end turns 332A and/or rear end turns 332B).

As previously noted in conjunction with FIGS. 3 and 4, windings 330 are wound through a respective slot 404, outwardly along the side face of core 328 around a predetermined number of teeth 402 forming an end turn 332, then back through another slot 404. More particularly, with reference to FIGS. 9A, 10A and 10B, each of windings 330 comprises at least one associated bundle of individual strands of insulated conductive wire (e.g. varnished copper motor wire) In contradistinction to the conventional practice, end turns 332 are loosely wrapped around the side faces of the stator core, with air spaces between the various bundles and the core side face, (rather than drawing the winding end turns tightly against the side face of the stator core to minimize cost and impedance). The inefficiencies inherent in loosely extending the winding end turn beyond the stator has been determined to be insignificant in comparison to the increased cooling capacity provided by exposed surface areas of the open winding structure. Preferably, as best seen in FIG. 10A, respective end turns 332 extend varying distances from stator side face 328, presenting a lattice-like structure to the airflow. End turns 332 suitably extend distances from stator side face 328, ranging from 0 to 1½ inch, and preferably from ¼ to 1 in. For example, adjacent end turns would extend outwardly by incrementally different distances e.g. increments of one half-inch to progressively fan out from the stator. In the embodiment of FIG. 10, a first end turn 1002 is offset from stator side face 328 by approximately a first predetermined distance, e.g. ½ inch. The next adjacent end turn 1004 is offset from stator side face 328 by approximately an incrementally increased distance, e.g. ¾ inch. Likewise, the next adjacent end turn 1006 is offset from stator side face 328 by approximately a further incrementally increased distance, e.g. 1 inch. The pattern is then suitably repeated. This arrangement is equally valid for a skewed core 329 as shown in FIG. 10B.

If desired, the lattice pattern can be established by offsetting respective end turns 332 associated with each phase a different offset distance from stator side face 328; for a three-phase system, the end turns of phases A, B, and C, suitably have offset distances of approximately ½ in., ¾ in., and 1 in., respectively.

Figure 9A:
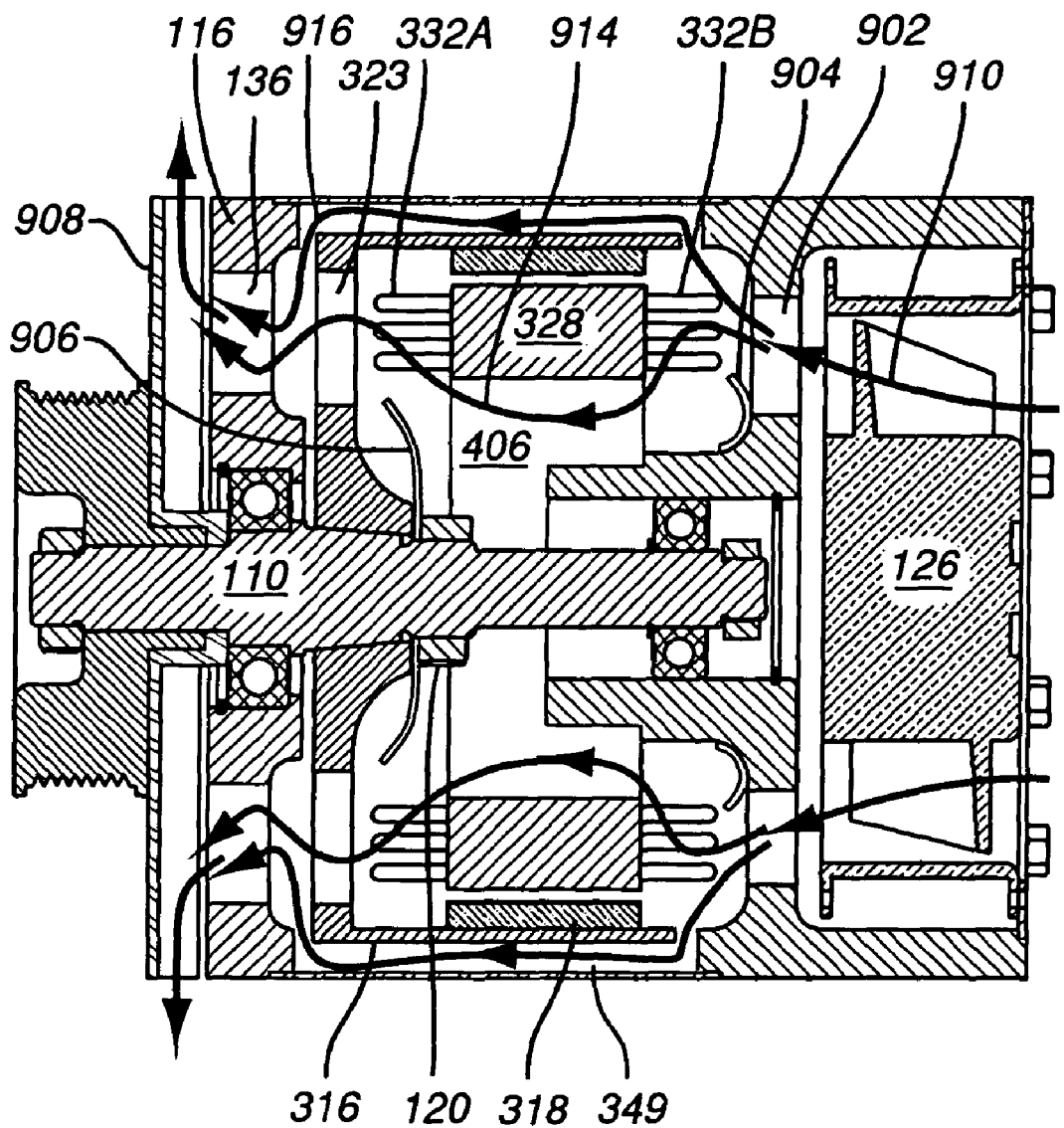
FIG. 9A is a schematic sectional diagram of an alternator employing air cooling in accordance with one aspect of the present invention.
Figure 10A:
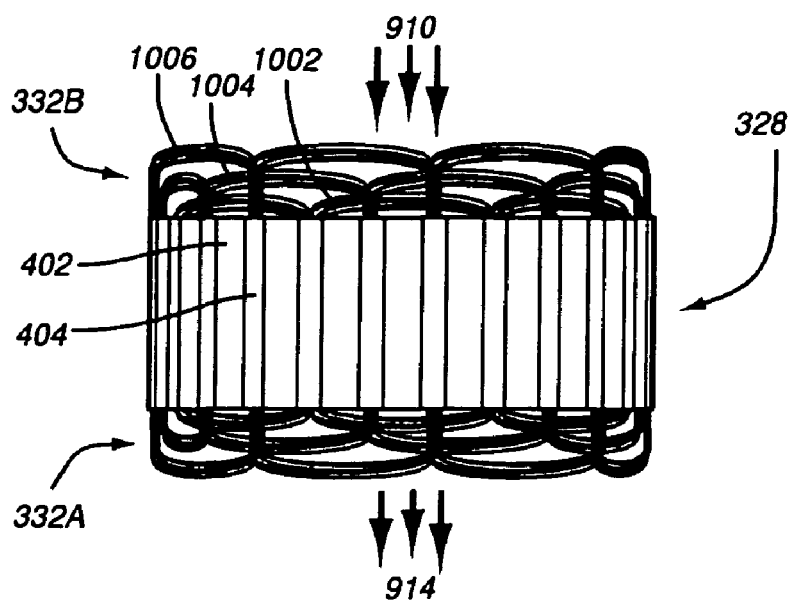
FIG. 10A is a simplified schematic top view of an axially aligned stator and end turns of the stator windings.
Figure 10B:
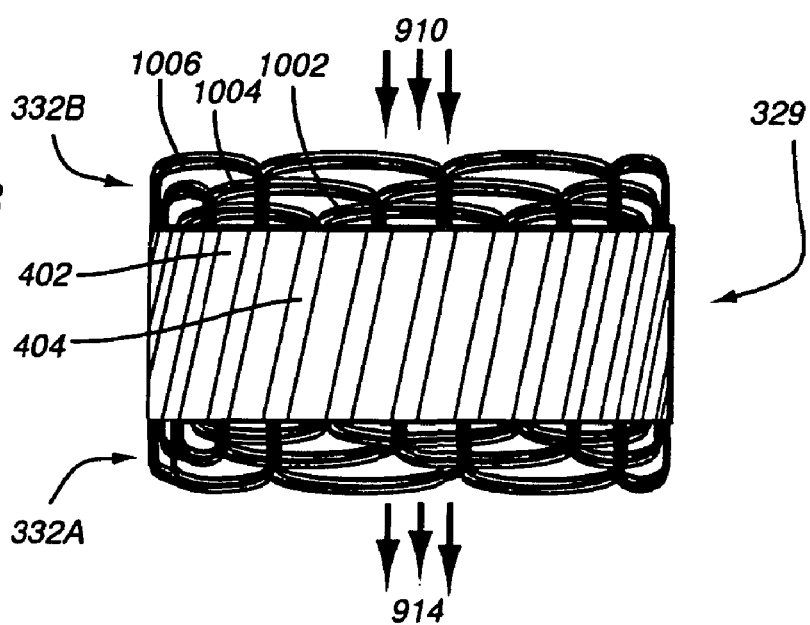
FIG. 10B is a simplified schematic top view of a skewed stator and end turns of the stator windings.

Referring to FIG. 9A, a cooling airflow is directed over stator windings 330 (preferably through loosely wrapped front-side and rear-side end turns 332A and 332B) by employing a cooling system comprising air passageways 902 in rear end plate 122 (bounded by adjacent rear end plate crossarms 348, outer portion 346, and hub 340), stator central aperture 406, rotor air passages 323 and front end plate air passages 136. Air exiting rear end plate air passage way 902 is directed to impinge on windings 330 (rear-side end turns 332B), by virtue of suitable relative disposition or contouring, or, as in the embodiment of FIG. 9A, cooperation with a rear deflector 904. Similarly, air exiting stator central aperture 406 is directed to impinge on windings 330 (front-side end turns 332A), by virtue of suitable relative disposition or contouring, or, as in the embodiment of FIG. 9A, cooperation with a front deflector 906. An asynchronous forced air supply, e.g., electric fan 126, mounted on the back of rear end plate 122 is preferably utilized. In the preferred embodiment, a conventional fan 908 is also mounted for rotation with shaft 110 between pulley 132 and front end plate 116. The cross sections, contours (turns and edges) and relative dispositions of the various air passageways are preferably chosen to minimize decreases in air velocity, and maximize airflow over end turns 332.

More specifically, cooling air, generally indicated by arrows 910 (preferably forced air from asynchronous fan 126) is introduced into alternator 100 through end plate air passageways 902. Airflow 910 impinges upon rear deflector 904, and is redirected in a radially outward direction; air that would otherwise flow through stator central aperture 406 flows outward and about stator core 328. In the preferred embodiment, the outwardly redirected air impinges upon and flows through the spaces between rear-side loosely wrapped rear-side end turns 332B of windings 330. Airflow 910 then splits into respective streams 914 and 916. After exiting the end turns 332B, air stream 914 flows through stator central aperture 406, impinges upon front deflector 906, is directed through the front-side loosely wrapped end turns 332A, rotor passageways 323 and then exits alternator 100 through air passageways 136 in front end plate 116. Air stream 914 comprises the bulk of airflow 910, since stator central aperture 406 represents the largest diameter path, and hence the path of least resistance. Air stream 916, after exiting rear-side end turns 332B, flows around the outside of rotor casing 316, then exits alternator 100 through air passageways 136 in front end plate 116. Air stream 916 provides cooling of magnets 318.

Rear deflector 904 comprises an element presenting a predetermined contour to the impinging air stream 910 to redirect the air stream onto windings 330 (preferably rear-side end turns 332B) to dissipate heat generated in windings 330. The diameter and predetermined contour of the reflector 904 is chosen effectively redirect the air as much as possible through the windings without creating too a large a decrease in air velocity. Rear deflector 904 is suitably a generally conical or dish shaped element with a central aperture, concentrically disposed on rear end plate hub 340, disposed with the apex facing into the airflow. Rear deflector 904 extends radially outward into the path of air stream 910 as it exits rear end plate air passageway 902, preferably at or just under the outer periphery of stator central aperture 406. Rear deflector 904 may be formed of any suitable relatively rigid material, such as, e.g., sheet metal, or plastic, or may be formed integrally with rear end plate 122. The choice between use of a separate deflector component, or a deflector feature integrally formed in end plate 122 is primarily an issue of cost.

Front deflector 906 likewise suitably comprises an element presenting a predetermined contour to the impinging air stream 914 to redirect the air stream onto windings 330 (preferably front-side end turns 332A) to dissipate heat generated in windings 330. The diameter and predetermined contour of deflector 906 is chosen effectively redirect the air as much as possible through the windings without creating too a large a decrease in air velocity. Deflector 906 suitably comprises a generally conical or dish shaped element with a central aperture, disposed with the apex facing into the airflow. Front deflector 906 is concentric with rotor hub 324 (shaft 110), suitably rotates with rotor 112, and extends radially outward into the path of air stream 914 exiting stator central aperture 406. Front deflector 906 may be formed of any suitable relatively rigid material, such as, e.g., sheet metal, or plastic, or may be formed integrally with rotor 112 or jam nut 120. The choice between use of a separate deflector component, or a deflector feature integrally formed in rotor 112 or jam nut 120 is primarily an issue of cost. In the embodiment of FIG. 9A, front deflector 906 suitably has an outer diameter such that the outer periphery extends approximately ¾ of the way into stator central aperture 406.

Figure 11:
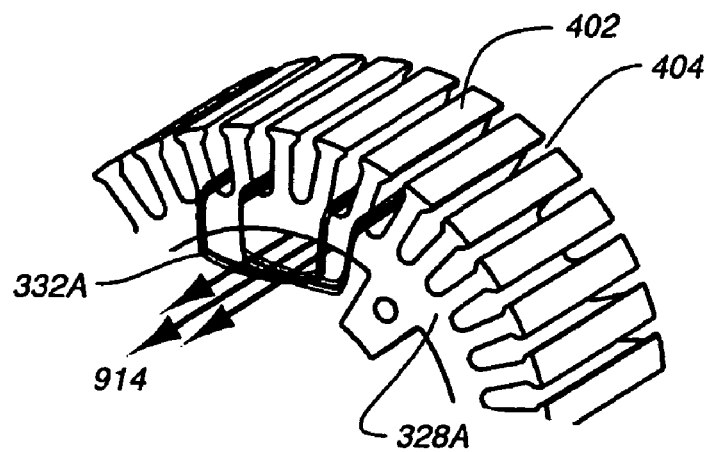
FIG. 11 is a simplified schematic perspective view of a portion of the stator and end turns of the stator windings with the end turns of the stator windings bent into the airflow.

If desired, in addition to (or in some instances in lieu of) deflectors 906 and 904, heat transfer efficiency can be increased by bending end turns 332 into the air stream. More particularly, referring to FIG. 11, end turns 332 are bent inwardly beyond the periphery of stator central aperture 406, and into the path of air flowing through the aperture.

As previously noted, in the embodiment of FIG. 9A, a conventional synchronous fan 908 is mounted for rotation with shaft 110 between pulley 132 and front end plate 116. Fan 908 in effect, creates a vacuum that pulls air through alternator 100. However, alternator 100 is capable of generating high levels of power at idle, or just above idle, speeds. Fan 908, rotating synchronously with shaft 110, is typically unable to provide sufficient airflow for cooling under such conditions. Electric fan 126, which operates a synchronously from shaft 110, suitably provides an auxiliary cooling, providing a positive pressure to push air through alternator 100.

Fan 126 is, as previously noted, mounted on the back of rear endplate 122. In general, it is desirable to maximize airflow through alternator 100. Accordingly, fan 126 is preferably chosen to provide the largest cubic feet per minute (CFM) zero pressure given the size constraints of alternator 100. Commercially available fans can be employed. However, preferably fan 126 is a permanent magnet fan, with a blade diameter approaching that of alternator outer casing 128.

The use of fluids for cooling in addition to, or in lieu of, forced air can be advantageous under operating conditions of low airflow, or extreme heat and, in sandy, wet, or otherwise harsh conditions.

For example, in some cases it is advantageous to supplement air cooling with fluid cooling of coil end turns 332. In general, a coolant fluid is directed into thermal contact with end turns 332 while maintaining electrical isolation. For example, coolant fluid can be routed through thermally conductive conduits including one or more portions disposed in thermal contact with front end turns 332A and/or rear end turns 332B. The conduit portions suitably track the shape of end turns 332, e.g., comprise generally circular or helical loops generally concentric with the stator core disposed proximate to the end turns. The conduits can be formed of any thermally conductive material that is capable of withstanding the elevated temperatures found in the alternator and nonreactive with the chosen coolant. Suitable materials include, for example, copper, and aluminum tubing. The conduit is preferably thermally connected to the adjacent end turns by an electrically insulating heat conductor, such as, for example, engineered epoxy. The coolant fluid can be any fluid, preferably liquid, having suitable thermal and flow characteristics. One example is conventional engine coolant. In vehicular applications, the engine coolant would preferably be directed into the alternator immediately after exiting the radiator.

Figure 9B:
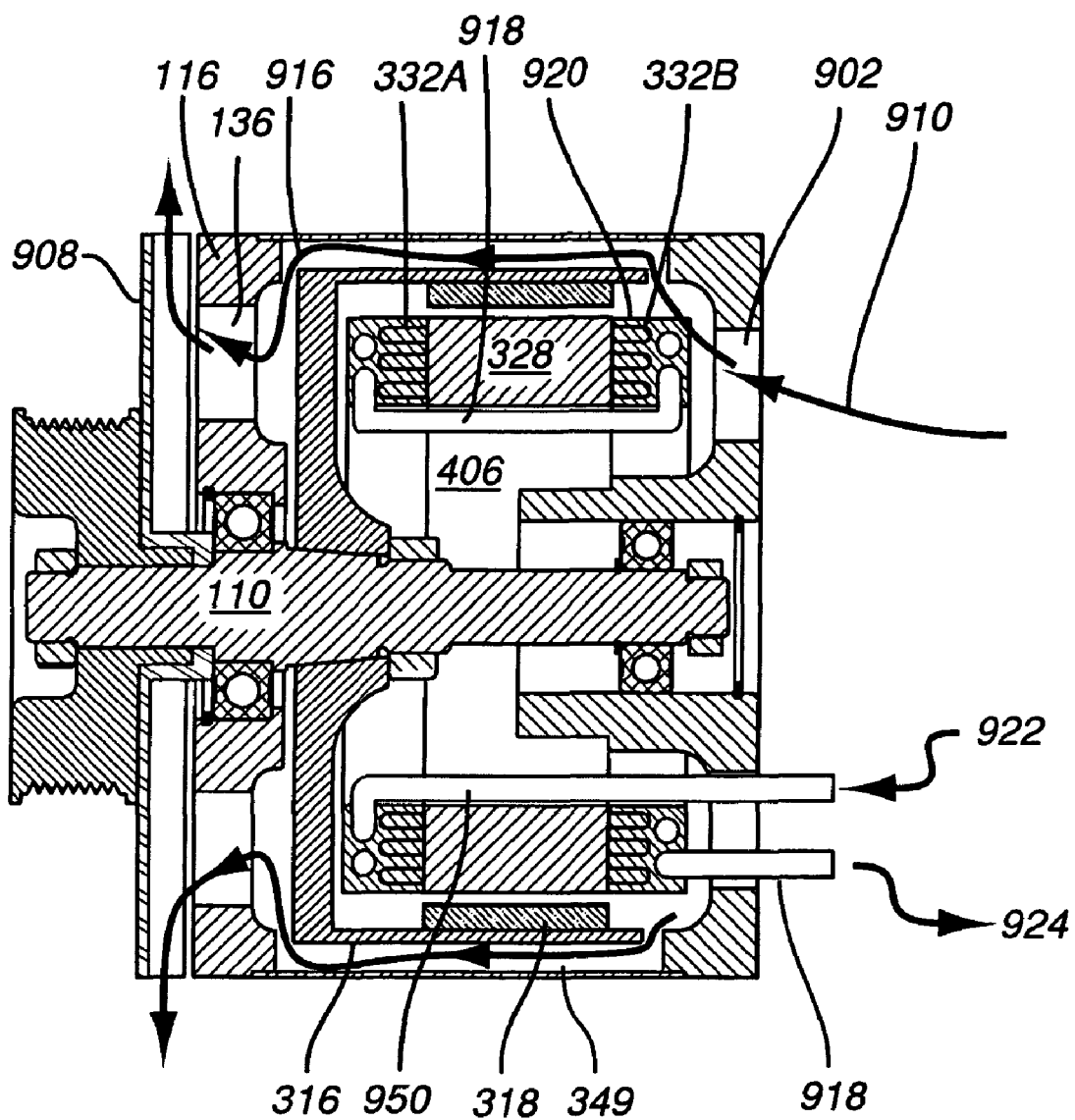
FIG. 9B is a schematic sectional diagram of an alternator employing air cooling for the magnets and fluid cooling for the coil end turns in accordance with another aspect of the present invention.

Referring to FIGS. 9B and 9E, in a preferred embodiment, a coolant fluid is directed into thermal contact with end turns 332 through a conduit (e.g., copper tubing) 918. Conduit 918 suitably includes an inlet 922, axially directed portions 950, 958 and 966, radially directed portions 952, 956, 960, and 964, and looped portions 954 and 962. Looped portions 954 and 962 each suitably comprises one or more circular or helical turns centered about the axis of stator core 328, with diameter(s) corresponding to the annulus formed by end turns 332 (e.g., bounded by the bottom of slots 404 and the outer perimeter of core 328). Conduit portions 952, 954 and 956 are suitably all disposed in a plane perpendicular to the axis of stator core 328, (parallel to the front face) just in front of front end turns 332A. Conduit portions 960, 962 and 964 are likewise suitably all disposed in a plane perpendicular to the axis of stator core 328, (parallel to the back face) just behind rear end turns 332B. Axial portions 950 and 958 suitably extend through stator central aperture 406. Axial portions 950 and 966 suitably extend through rear endplate inner passageway 902. Coolant is introduced at inlet 922, and then flows through portions 950, 952, 954, 956, 958, 960, 962, 964, and 966, in sequence, then exits through an outlet 924.

Conduit 918 is thermally connected to end turns 332 by an electrically insulating, thermally conductive material 920 (e.g. engineered epoxy). Material 920 suitably encapsulates end turns 332, looped portions 954 and 962, and a part of radial portions 952, 956, 960 and 964. Material 920 conducts heat from end turns 332 to the coolant, while at the same time providing electrical isolation.

In the embodiment of FIG. 9B, magnets 318 are cooled using air stream 916. Air stream 916 flows around the outside of rotor casing 316, then exits alternator 100 through air passageways 136 in front end plate 116. The air flow is supplied by fan 908. An asynchronous fan 126 as shown in FIG. 9A can be used to enhance the cooling of magnets 318.

If desired, the coolant flow through conduit 918 can also be used to cool magnets 318 to permit an essentially closed system. An airflow, cooled by the coolant flow through conduit 918, is directed across magnets 318.

Figure 9C:
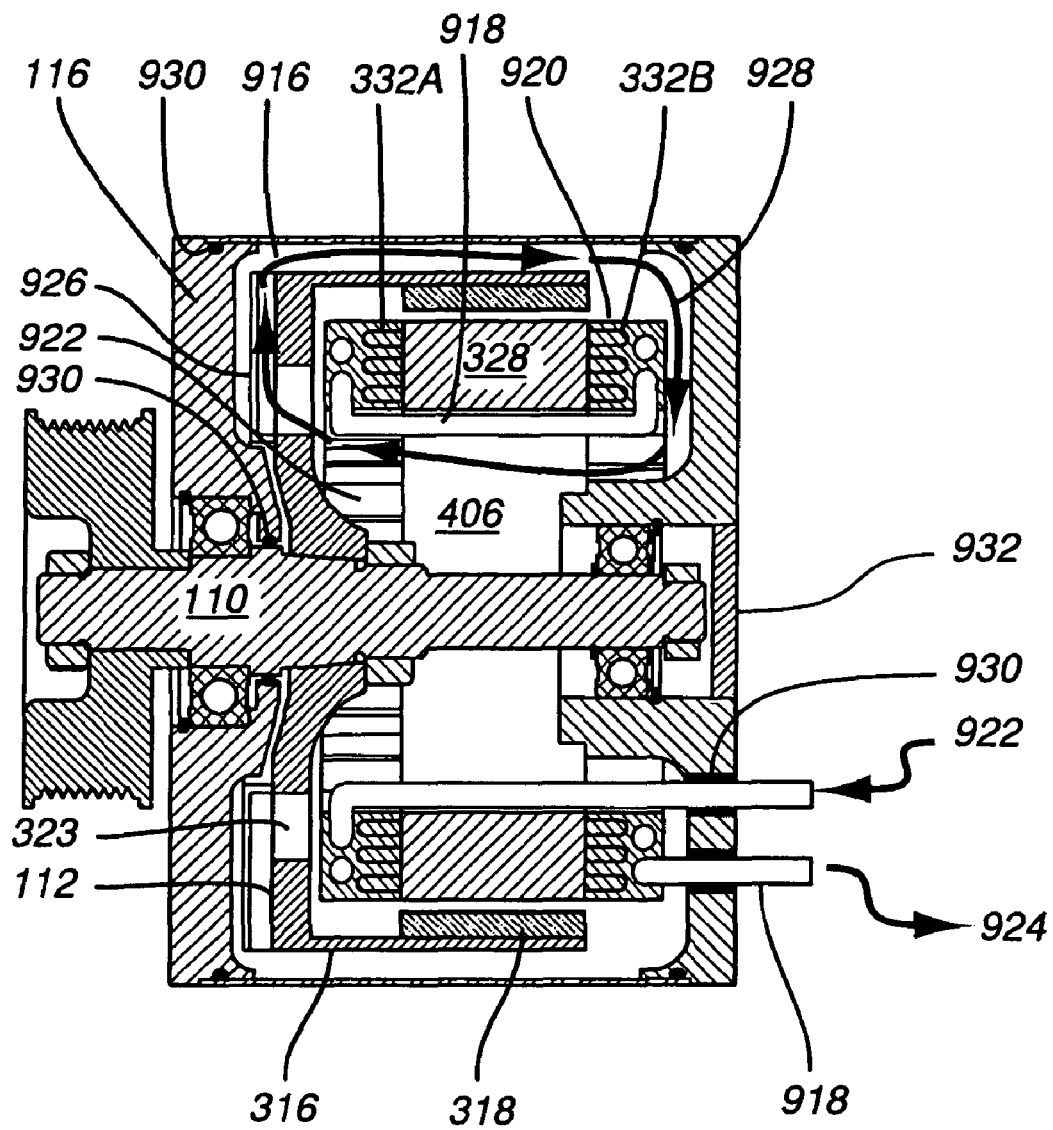
FIG. 9C is a schematic sectional diagram of an alternator employing fluid cooling exclusively in a sealed alternator in accordance with one aspect of the present invention.
Figure 9D:
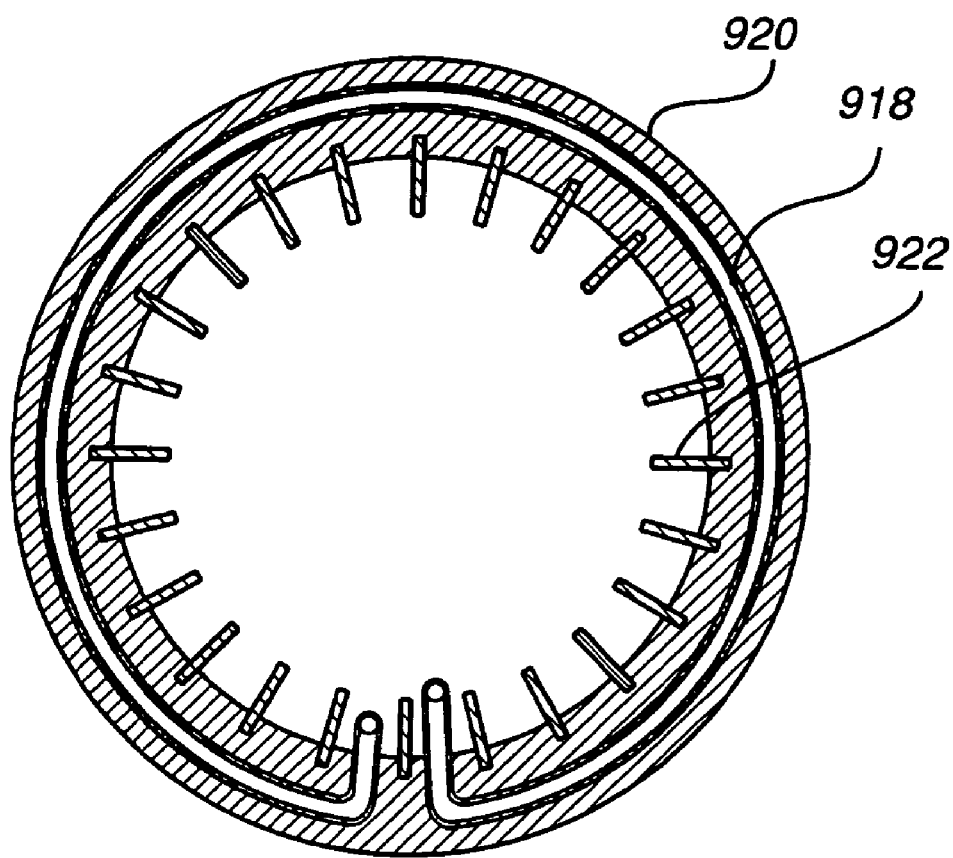
FIG. 9D is a detail sectional diagram of the arrangement of heat conducting encapsulant, cooling tubes and heat transfer fins in a fluid cooled alternator.

Referring to FIGS. 9C and 9D, respective thermally conductive heat exchange fins 922 are provided, thermally connected to the conduit 918. Fins 922 are suitably incorporated into thermally conductive encapsulant 920. Fins 922 suitably extend radially into central aperture 406.

Respective blades are disposed on the forward face of rotor 112 to form a centrifugal fan 926. Fan 926 generates an airflow 916; air is drawn through stator core central aperture 406, over heat exchange fins 922, through apertures 323 in the end plate of rotor 112, and forced to flow around the outside of rotor casing 316. The airflow, after flowing around the outside of rotor casing 316, is directed by passageway 928 back into central aperture 406. The airflow around the outside of rotor casing 316 carries the heat created by magnets 318 across the heat exchanger fins 922 embedded in encapsulant 920. Fluid coolant flowing in cooling tubes 918 thus carries away heat generated by both the windings of stator 328 and magnets 318.

Since the need for air circulation from an outside source is no long required, the alternator is suitably sealed using o-rings 930 and plugs 932. This has the advantage of sealing out most if not all contamination detrimental to the operation of a permanent magnet alternator. If desired, a one-way valve or membrane (not shown) located at the lowest point of the alternator can be provided to assist in draining possible accumulation of water. In the event a greater air flow is required, an asynchronous fan 126 can be installed.

Under some circumstances, e.g., in sandy, wet, or otherwise harsh conditions, an air cooled alternator can be sealed with respect to potential external contaminants. In accordance with another aspect of the present invention, a sealed air cooled alternator is provided by establishing separate internal and external cooling airflows over an external alternator case acting as a heat exchanger. The internal and external airflows are suitably provided by internal and external fans. The internal airflow is directed over the stator coils, rotor and interior of the heat exchanger to transfer heat from the coils and magnets to the heat exchanger. The exterior airflow is directed over the exterior of the exchanger to dissipate the heat. If desired, the source for the external airflow can be remotely located from the alternator, e.g., provided through plenums or snorkels.

Figure 12:
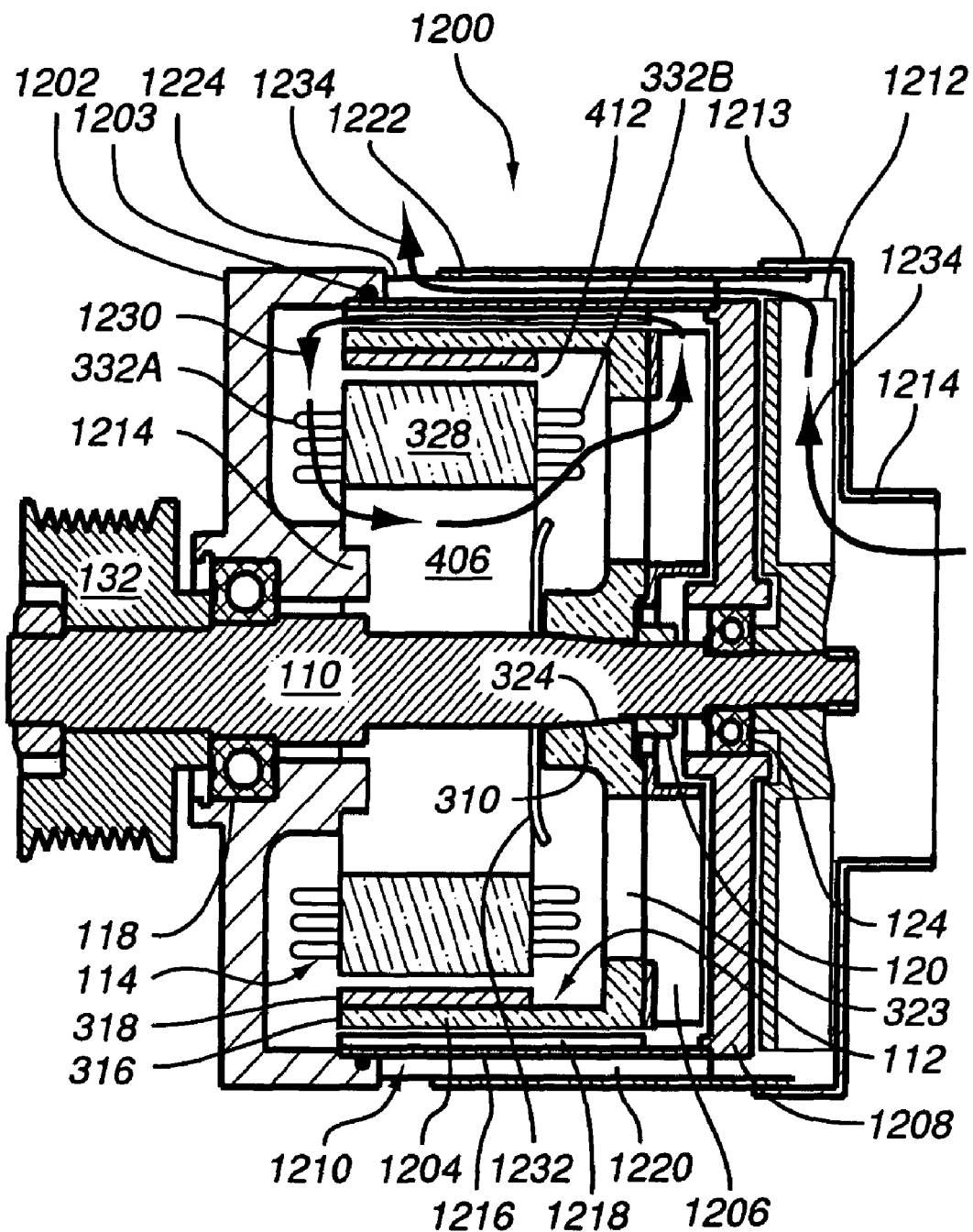
FIG. 12 is a schematic sectional view of a first embodiment of a sealed alternator unit employing heat exchanger and internal and external fans.

Referring to FIG. 12, a first embodiment of a sealed alternator 1200 comprises: shaft 110; a sealed front end plate 1202; front bearings 118; stator 114; a forward facing rotor 1204; jam nut 120; an internal fan 1206; rear bearing 124; a sealed rear endplate 1208; a heat exchanger 1210; an external fan 1212 and a fan housing 1213 with an air intake 1214. (In this embodiment, tie rods 130 (not shown) may be disposed externally, as illustrated in FIG. 4) Front end plate 1202 suitably includes a stepped central hub 1214 (generally analogous to rear endplate hub 340 in the embodiment of FIG. 3) for mounting and locating front bearing 118, and stator core 328. Tapered portion 310 of shaft 110 is disposed at a predetermined axial distance from front end plate 1202 (generally corresponding to the axial length of rotor 1204). Rotor 1204 is essentially the same as rotor 112, but with the tapered portion of hub 324 reversed to accommodate a forward facing disposition of rotor 112. As in the embodiment of FIG. 3, rotor 1204 is mounted for rotation on shaft 110, positively located on and aligned with shaft 110 by cooperation of hub 324 with shaft tapered portion 310, and stator 114 is closely received within rotor 1204, separated from rotor 1204 by a small air gap 412. Heat exchanger 1210 is generally cylindrical and disposed coaxially with shaft 110, exteriorly of rotor casing 316. Front end plate 1202, bearings 118 and 124, heat exchanger 1210 and rear endplate 1208 provide a sealed compartment enclosing stator 114, rotor 1204 and internal fan 1206.

Figure 13A:
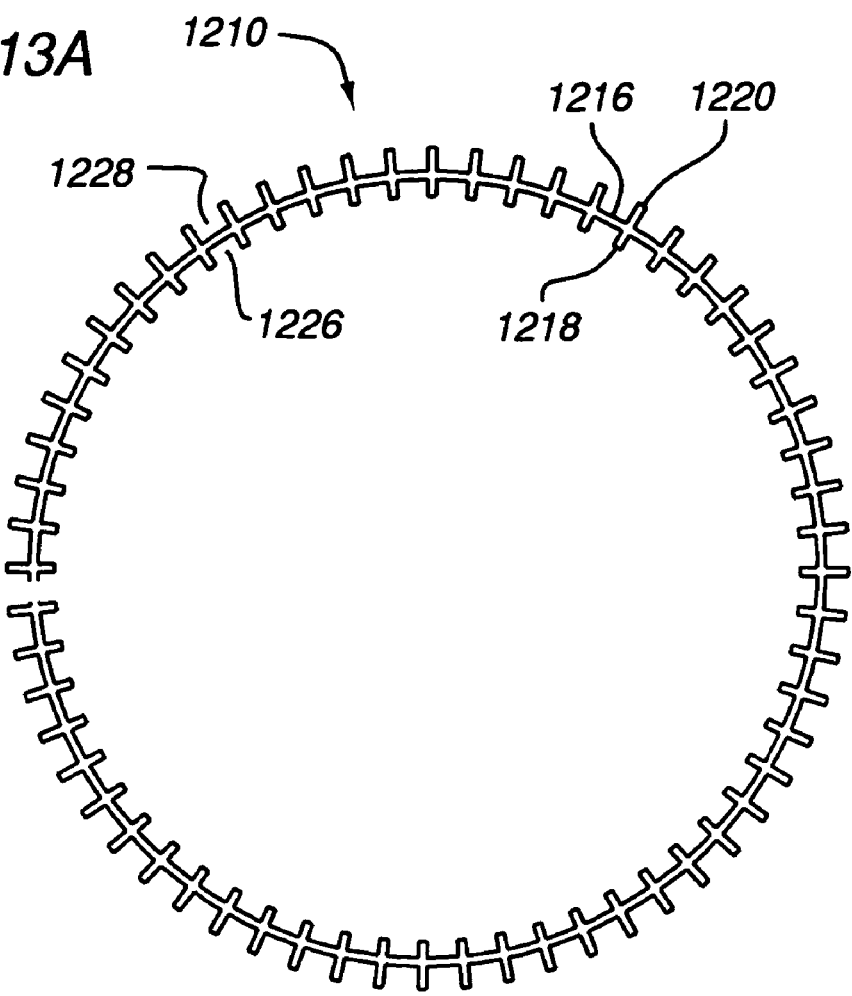
FIGS. 13A and 13B (collectively referred to as FIG. 13) are schematic diagrams of respective embodiments of a heat exchanger.
Figure 13B:
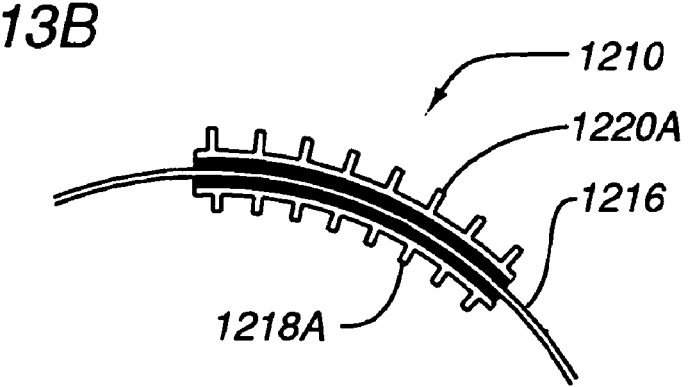

Referring to FIGS. 12 and 13A, heat exchanger 1210 suitably comprises a cylindrical separator (casing) 1216 and bearing radially extending internal and external fins, 1218 and 1220 respectively, all in thermal contact. Heat exchanger 1210 is suitably a unitary extrusion of thermally conductive material, such as aluminum or steel. Alternatively, as shown in FIG. 13B, for ease of construction, heat exchanger 1210 can be formed of a separate cylindrical casing formed of a first material, e.g., steel, with a plurality (e.g. 12, only one shown) of separate (suitably extruded) fin sections 1218A (each extending over a predetermined arc) formed of a second material, e.g. aluminum, covering the interior face of cylinder 1216 and a plurality (e.g. 12, only one shown) of separate (suitably extruded) fin sections 1220A covering the exterior face of cylinder 1216. For example, twelve 30° sections of fins or four 90° sections of fins can be employed. The respective fin sections 1216A and 1220A are fixed on, and in thermal contact with, casing 1216, suitably by an adhesive (that remains sufficiently flexible to accommodate the different rates of thermal expansion of the first and second materials).

Heat exchanger 1210 is disposed coaxially with and radially outward from rotor casing 316. Respective axial channels 1226 are defined between adjacent internal fins 1218, casing 1216 and the outer surface of rotor casing 316. As will be explained, airflow through channels 1226 transfer heat from rotor 112 and windings 330 to internal fins 1218 (and casing 1216). The heat is then conducted from fins 1218 to external fins 1220. Airflow over exterior fins 1220 (and casing 1216) is employed to dissipate the heat.

As best seen in FIG. 12, heat exchanger 1210 preferably includes a cylindrical exterior cover 1222 to facilitate airflow over external fins 1220. Cover 1222 is disposed coaxially with separator (casing) 1216, radially outward of heat exchanger external fins 1220. Cover 1222 suitably nests within with exterior fan housing 1213 and is suitably fastened at its rear end, and provides an outlet 1224 for heat exchanger 1210 at its forward end. Respective axial channels 1228 communicating with the interior of fan housing 1213 are thus defined between adjacent external fins 1220, casing 1216, and heat exchanger cover 1222.

Internal fan 1212, suitably attached to or integral with rotor 112, generates an internal airflow directed over stator coils 330 (preferably through end turns 332), rotor 112 and through interior channels 1226 of heat exchanger 1210. More particularly, internal fan 1212 is configured to propel air outwardly, creating a negative pressure in the interior of rotor 112, and an air stream, generally indicated by arrows 1230, is forced through channels 1226, cooling rotor casing 316 (and thus magnets 318), and transferring heat to internal heat transfer fins 1218 and casing 1216. Air stream 1230 exits channels 1226, flows through front-side end turns 332A, into stator central aperture 406. The airflow exiting the rear side of stator aperture 406 is directed to flow through rear-side end turns 332B. This is suitably implemented using a deflector 1232. After flowing through end turns 332B, the air stream flows through rotor apertures 323, and is recirculated by fan 1206. Heat in stator coils 330 and magnets 318 is thus dissipated and transferred to heat exchanger interior fins 1218. Fins 1218 are in thermal contact with casing 1216 and external fins 1220 such that heat is conducted from fins 1218 to external fins 1220. Airflow over exterior fins 1220 (and casing 1216) is employed to dissipate the heat.

Airflow, generally indicated as 1234, over exterior fins 1220 is suitably generated by external fan 1212. External air provided through intake 1214, is propelled outwardly within the interior of housing 1213 by rotation of fan 1212, and forced through channels 1228, ultimately exiting through outlet 1224. If desired, filters (not shown) can be provided over outlet 1224, and fan housing air intake 1214.

Figure 14:
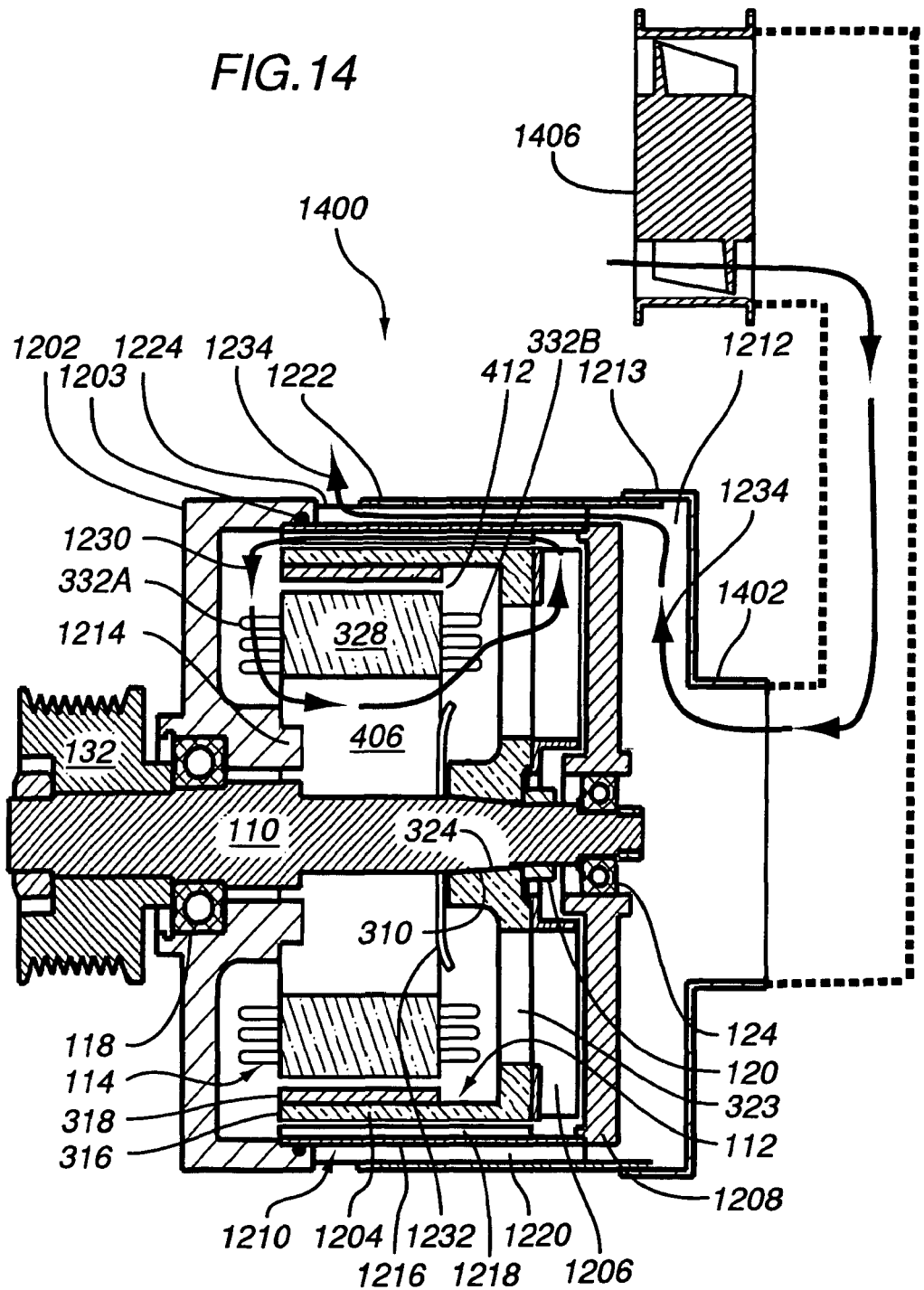
FIG. 14 is a schematic sectional view of a first embodiment of a sealed alternator unit with the external airflow supplied through an air plenum.

In some instances, it may be desirable to employ pressurized external air from a source located remotely from sealed alternator unit. Such an embodiment 1400 is shown in FIG. 14. Sealed alternator 1400 is substantially similar to alternator 1200 except that instead of being driven by a dedicated external fan 1212, alternator 1400 employs a rear housing 1402, the interior of which communicates with heat exchanger exterior channels 1228, cooperating with a plenum 1404 and a suitable remote pressurized air source, such as a remote fan 1406. External air flow 1234 is supplied by remote fan 1406, directed through a plenum 1404, through the interior of housing 1402 and channels 1228, and ultimately exiting through outlet 1224.

Figure 15:
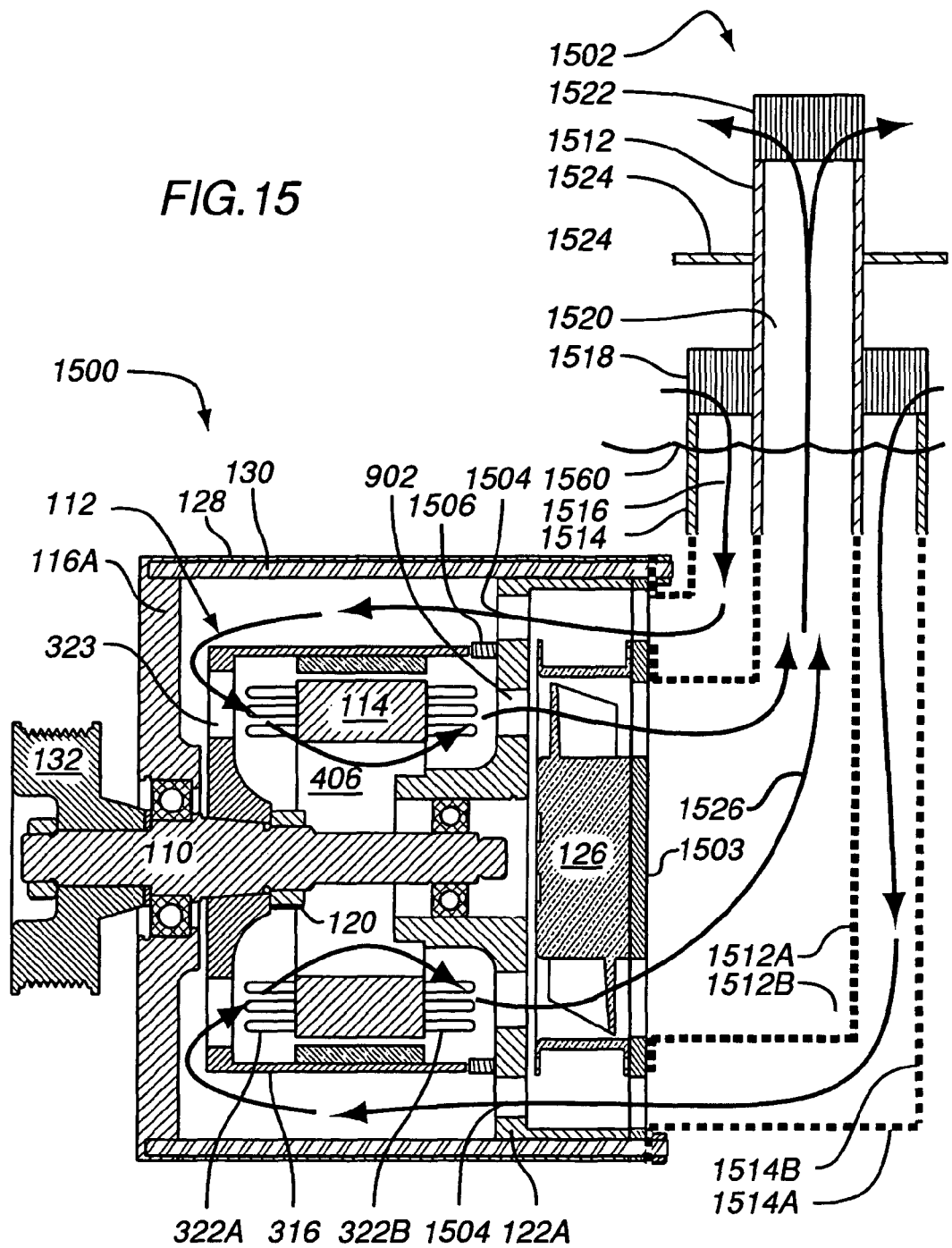
FIG. 15 is a schematic sectional view of a first embodiment of a locally sealed alternator unit with the external airflow supplied through a doubled walled snorkel.

An alternative embodiment of the present invention particularly adapted for use in sandy, wet, or otherwise harsh conditions, employs a locally sealed alternator cooperating with a double walled snorkel to provide a cooling air from remote, less harsh source. Referring to FIG. 15, a locally sealed alternator 1500 cooperates with a snorkel 1502. Alternator 1500 is suitably similar in most respects to alternator 100 described in conjunction with FIGS. 1-4. However, the front endplate 116A (analogous to front endplate 116) and front bearing 118A (analogous to front bearing 118) are sealed, the rear endplate 122A (analogous to rear endplate 122) includes a separate outer set of air passageways 1504, in addition to air passageways 902, and (like the embodiment of FIG. 4) tie rods 130 are disposed exteriorly of outer casing 128. In addition, alternator 1500 includes an air dam 1506, to separate respective airflows, as will be described. Air dam 1506 is suitably formed of felt, or integrally formed with rear endplate 122A.

Snorkel 1502 suitably includes generally vertical, generally cylindrical inner and outer chimney portions (1512A, 1514A, respectively) and transverse inner and outer connecting portions (1512B, 1514B, respectively), formed by interior and exterior walls 1512 and 1514, respectively. The number of vertical and transverse portions is kept to the lowest number possible (i.e.; the least number of bends) for any given installation to maximize air velocity. Inner wall 1512 (and proximate mouth of inner connecting portion 1512B) is disposed between endplate inner and outer passageways 902 and 1504; the outer diameter of inner wall 1512 is suitably less than or equal to the inner diameter of passageway 1504, and the inner diameter of inner wall 1512 is greater than or equal to the outer diameter of passageways 902. An intake airway 1516 communicating with endplate outer passageways 1504 is defined between exterior wall 1512 and interior wall 1514. An output airway 1520 communicating with endplate inner passageways 902 is defined within interior wall 1512. Intake airway 1516 and output airway 1520 are suitably capped by first and second air filters 1518 and 1522, respectively. Input filter 1518, in effect, scrubs air introduced into the alternator. Output filter 1520 prevents dust from entering the alternator through the exhaust when the alternator is not running. Interior chimney portion 1512A suitably extends beyond the external chimney portion 1514A defined by exterior wall 1514. The mouths of intake airway 1516 and output airway 1520 (filters 1518 and 1522) are both disposed above a predetermined height, corresponding to the maximum depth of water to be traversed by the vehicle in which alternator 1500 is mounted. A suitable deflector 1524 is suitably disposed on the between air passageways 902 to minimize introduction of exhaust air from output airway 1520 into intake airway 1516.

Snorkel 1502 is fixed to rear endplate 122A of alternator 1500 through the use of an adapter plate 1503. In the embodiment of FIG. 15, snorkel 1502 and endplate 122A are secured by tie rods 130. Alternatively, the mouth of exterior connecting portion 1514B can be force fit over the periphery of rear endplate 122A, and if desired, secured by metal banding. In any case, suitable sealant, gaskets or o-rings (not shown) are preferably employed to establish an essentially waterproof seal. Electric fan 126 is suitably disposed on an adapter plate 1503 (suitably disk-shaped with respective air passageways there through) within the interior of interior connecting portion 1512B, with blades arranged to create a negative pressure within the interior of rotor 112.

Fan 126 circulates air along a coolant path to create a cooling airflow 1526 through the rotor and stator; air is taken in through filter 1518 and intake airway 1516, flows through transverse outer connecting portion 1514B, outer air passageways 1504 in rear endplate 122A, the space between outer casing 128 and the exterior of rotor casing 316, passageways 323 in rotor endcap 314, over end turns 332A, through aperture 406 of stator core 328, over end turns 332B, through inner air passageways 902 in rear endplate 122A, through fan 126, and through snorkel inner connecting portion 1512B, output airway 1520 and filter 1522. Alternator 1500 is thus locally sealed, and can be submerged in water up to the depth defined by snorkel 1502.

Fan 126 can be a conventional electric fan. However, it is desirable that coolant circulation by fan 126 be maximized. A permanent magnet fan design develops very high horse power for little in terms of energy input, and facilitates large diameter blades for increased air velocity and pressure while still manifesting relatively small axial dimensions.

Figure 16A:
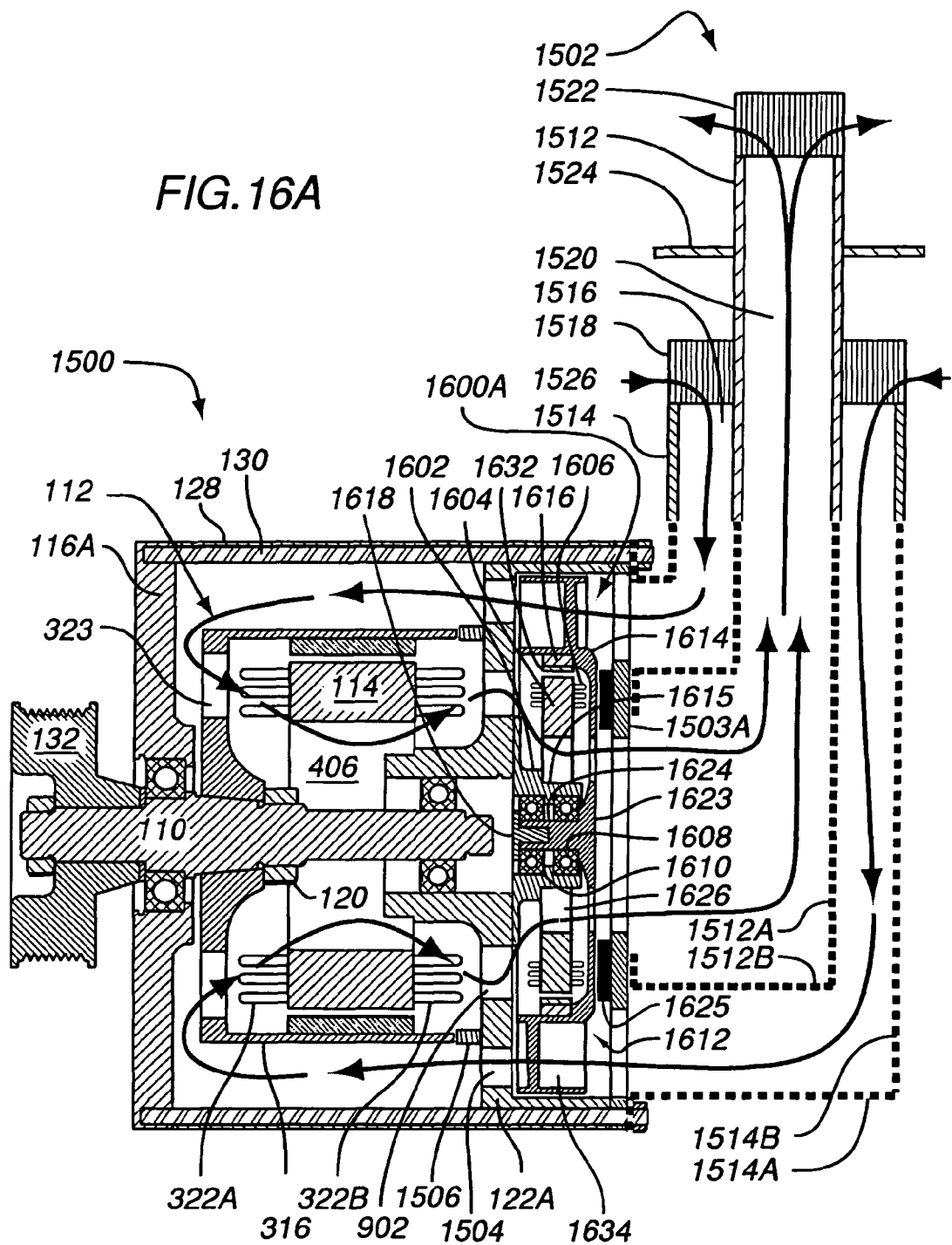
FIGS. 16A and 16B (collectively referred to as FIG. 16) are schematic sectional views of the alternator of FIG. 15 utilizing respective embodiments of an optimized fan.

Accordingly, a fan specifically optimized for the available space is desirable. Referring now to FIG. 16A, a first embodiment 1600A of such a fan comprises: a stator frame 1602; a stator core 1604 and windings 1606; front and back fan bearings 1608 and 1610; and a fan 1612. Stator frame 1602 is suitably includes a generally cylindrical body 1615 and suitably includes fan bearings 1608 and 1610 centrally disposed therein. Stator frame 1602 is suitably secured to rear endplate 122A, concentrically with shaft 110. Fan stator core 1604 is suitably generally cylindrical, and disposed about stator frame body 1615.

Fan 1612 suitably comprises a cast fan body of engineered plastic, aluminum or other suitable material 1614, a fan rotor 1616, and a retaining fastener 1618. Fan body 1614 suitably includes a central hub 1623 with a perpendicular central interior shaft 1624 (rotatably maintained by bearings 1608 and 1610), connected to body 1614 by respective crossarms forming respective passageways 1626. Passageways 1626 communicate with snorkel inner connecting portion 1512B. If desired, an air dam 1625, suitably formed of felt or low friction material, can be provided to between snorkel inner wall 1512 and fan rotor end cap 1612, to minimize movement of air between input and output passageways.

Fan rotor 1616 suitably fastened (i.e.: epoxied or other suitable fastening method) to fan body 1614, includes respective magnets 1632 disposed on the interior thereof. Magnets 1632 are disposed in close proximity to fan stator core 1604, separated only by a small air gap, to electromechanically interact with fan stator windings 1606; electrical signals applied to windings 1606 cause relative motion of magnets 1632, and hence fan 1612. Electrical power can be provided internally from the power generated by alternator 1500, or can be supplied from the external source (e.g. a vehicle battery). Fan blades 1634 are disposed to move air from snorkel exterior connecting portion 1514B through rear endplate outer passageways 1504. By disposing blades at the furthest diameter possible, maximum air movement and pressure are provided. Fan blades push air stream the 1526 through outer air passageways 1504 in rear endplate 122A. Air stream 1526 then circulates through the interior of alternator 1500 as described in connection with FIG. 15, then exits through inner air passageways 902 in rear endplate 122A, through passageway 1626 of fan 1600 and exhausts through snorkel inner connecting portion 1512B which has been suitable fixed to adapter plate 1503A, output airway 1520 and filter 1522 as described in connection with FIG. 15.

Figure 17:
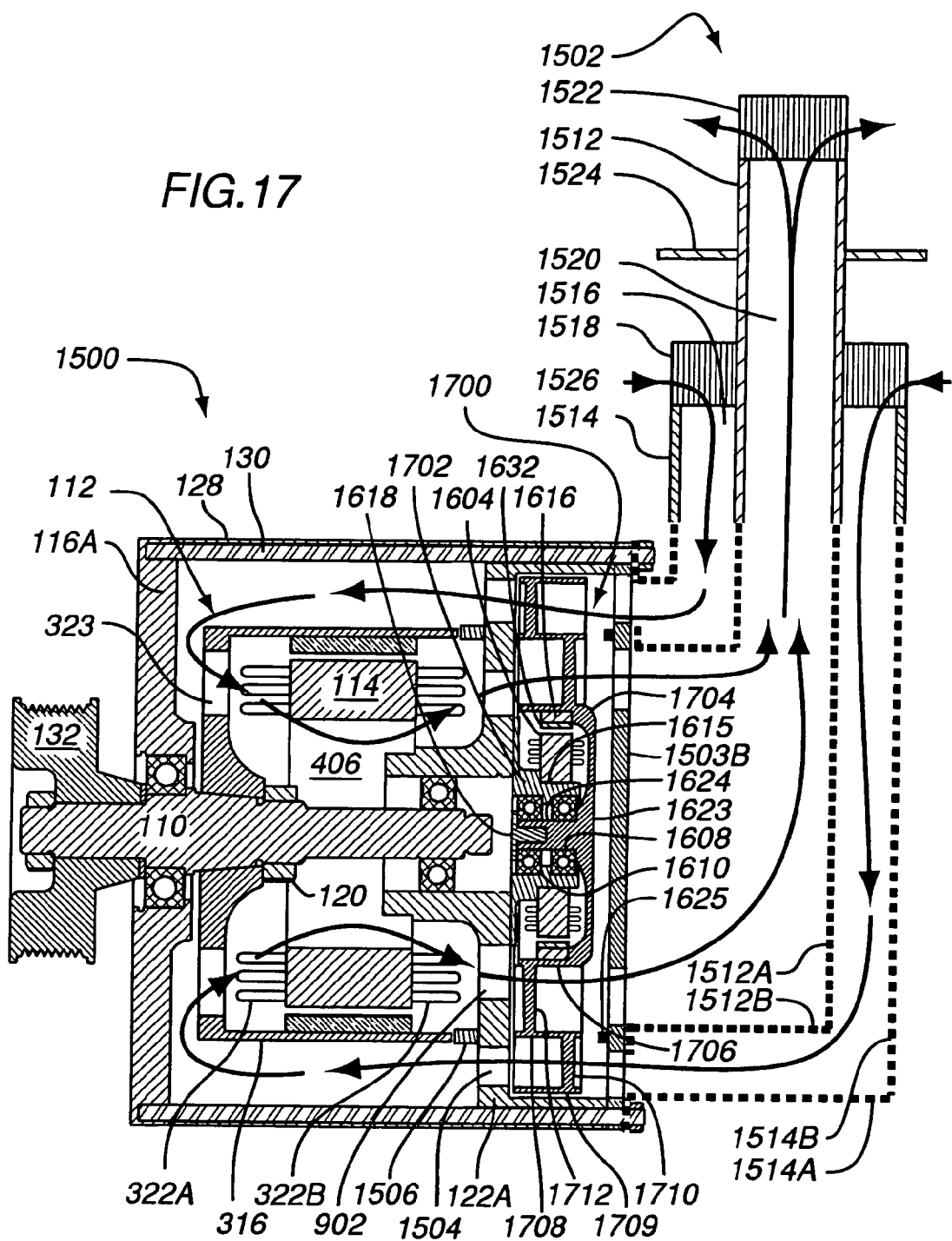
FIG. 17 is a schematic sectional view of the alternator of FIG. 15 utilizing an alternative embodiment of an optimized fan.

If desired, the fan blade can be configured to have respective differently angled sections aligned with endplate inner and outer passageways 902 and 1504 to push air into passageways 1504 and pull air out of passageways 902. Referring to FIG. 17, a fan 1700 employing such a blade is suitably generally similar to fan 1600. However, fan 1700 utilizes more compact stator frame 1702 (suitably without air passages), and a fan rotor 1704 including concentric inner and outer cylinders 1706 (analogous to cylindrical body 1630) and 1708, respectively. A first set of fan blades 1710 (generally analogous to blades 1634) are provided on the exterior of outer cylinder 1708 (connecting it to an outer cylinder 1709). A second set of fan blades 1712 connect cylinders 1706 and 1708.

Outer cylinder 1708 is suitably concentric with and has approximately the same diameter inner snorkel wall 1512. Fan blades 1710 (like blades 1634 in the embodiment of FIG. 16) are disposed to move air from snorkel exterior connecting portion 1514B through rear endplate outer passageways 1504. Cylinders 1706 and 1708 are disposed such that endplate inner passageway 902 is bracketed by the cylinders (e.g., the outer diameter of cylinder 1706 is less than or equal to the inner diameter of passageway 902, and the outer diameter of passageway 902 is less than or equal to the inner diameter of outer cylinder 1708). Fan blades 1712 manifest a reversed angle as compared to fan blades 1710, such that a negative pressure is created at passageway 902 (i.e. air is pulled out of alternator 1500 through passageway 902). The side faces of fan rotor 1614A proximate to endplate 122A are suitably maintained to close tolerances, and separated from endplate 122A only by a relatively small air gap, generally indicated as 1714, suitably in the range of 0.01 inch to 0.05 inch, and preferably 0.03 inch. Gap 1714 is small enough that any migration of air between paths is insignificant. As the fan rotates it develops pressure in opposite directions the outer ring in and the inner ring out of the alternator creating the required flow to cool the alternator.

Figure 18A:
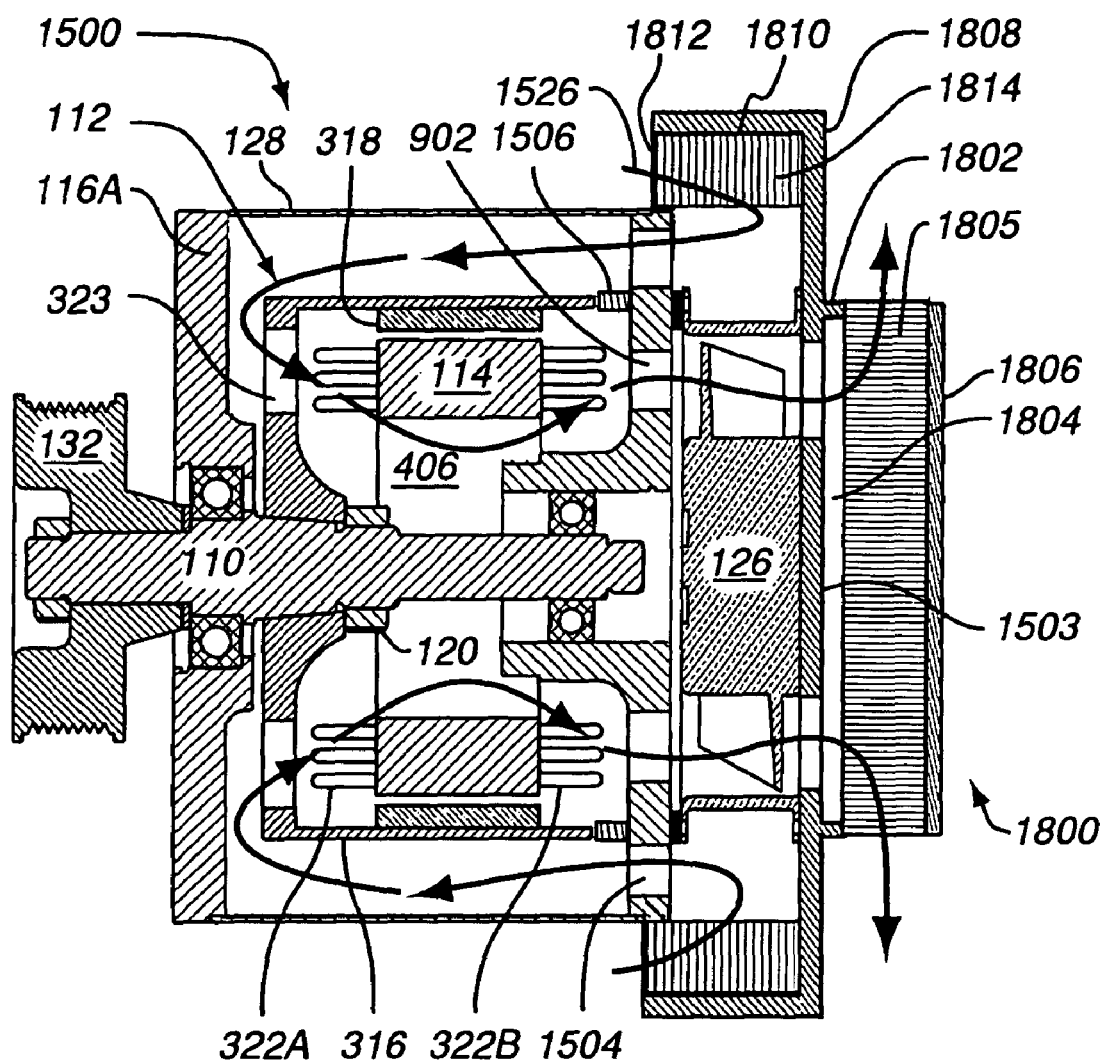
FIGS. 18A, 18B and 18C (collectively referred to as FIG. 18) are schematic diagrams of respective embodiments of airflow filtering strategies suitable for use with alternator of FIG. 15.

In sandy, dusty, wet, or otherwise harsh conditions (e.g. desert or agricultural applications) it may be desirable to filter air introduced into the alternator. Dust and air born contaminates are potentially abrasive and sand very commonly carries iron compounds which can accumulate on the permanent magnets (in the alternator and/or fan). An input filter is employed to, in effect, scrub air introduced into the alternator. An output filter is employed to prevent dust from entering the alternator through the exhaust when it is not running. Any suitable filtering strategy may be employed, preferably with provisions for minimizing introduction of exhaust air into the alternator intake. For example, in the embodiment of FIG. 18A, fan 1600B, (with blades arranged to create a negative pressure within alternator 1500) is disposed within a housing 1800 comprising a central cylindrical duct and a concentric dish shape deflector 1808. Fan 126 is suitably mounted concentrically within duct 1802 on a frame 126A (suitably with an outer periphery conforming to the interior of duct 1802 with passages there through). Frame 126A may be integral with housing 1800. Duct 1802, suitably disposed proximate to the side-wall of endplate 122A at one end, and closed at the other, is suitably concentric with and disposed between endplate inner and outer passageways 902 and 1504; the outer diameter of duct 1802 is suitably less than or equal to the inner diameter of passageway 1504, and the inner diameter of duct 1802 is greater than or equal to the outer diameter of passageways 902. Duct 1802 defines respective input and output airways 1810 and 1804. Output airway 1804, within the interior of duct 1802, communicates with inner passageways 902 in the alternator endplate 122A and exhausts radially through a mouth 1805. A ring-type air filter 1806, concentric with duct 1802, is disposed at the mouth of output airway 1804. Deflector 1808 is disposed about the exterior of duct 1802, and provides a forward facing mouth 1812. A ring-type air filter 1814, concentric with duct 1802, is disposed within input airway 1810. Deflector 1808 cooperates with duct 1802 to defining input airway 1810. Deflector 1808 with forward facing mouth 1812 tends to minimize introduction of exhaust air into alternator 1500.

Figure 18B:
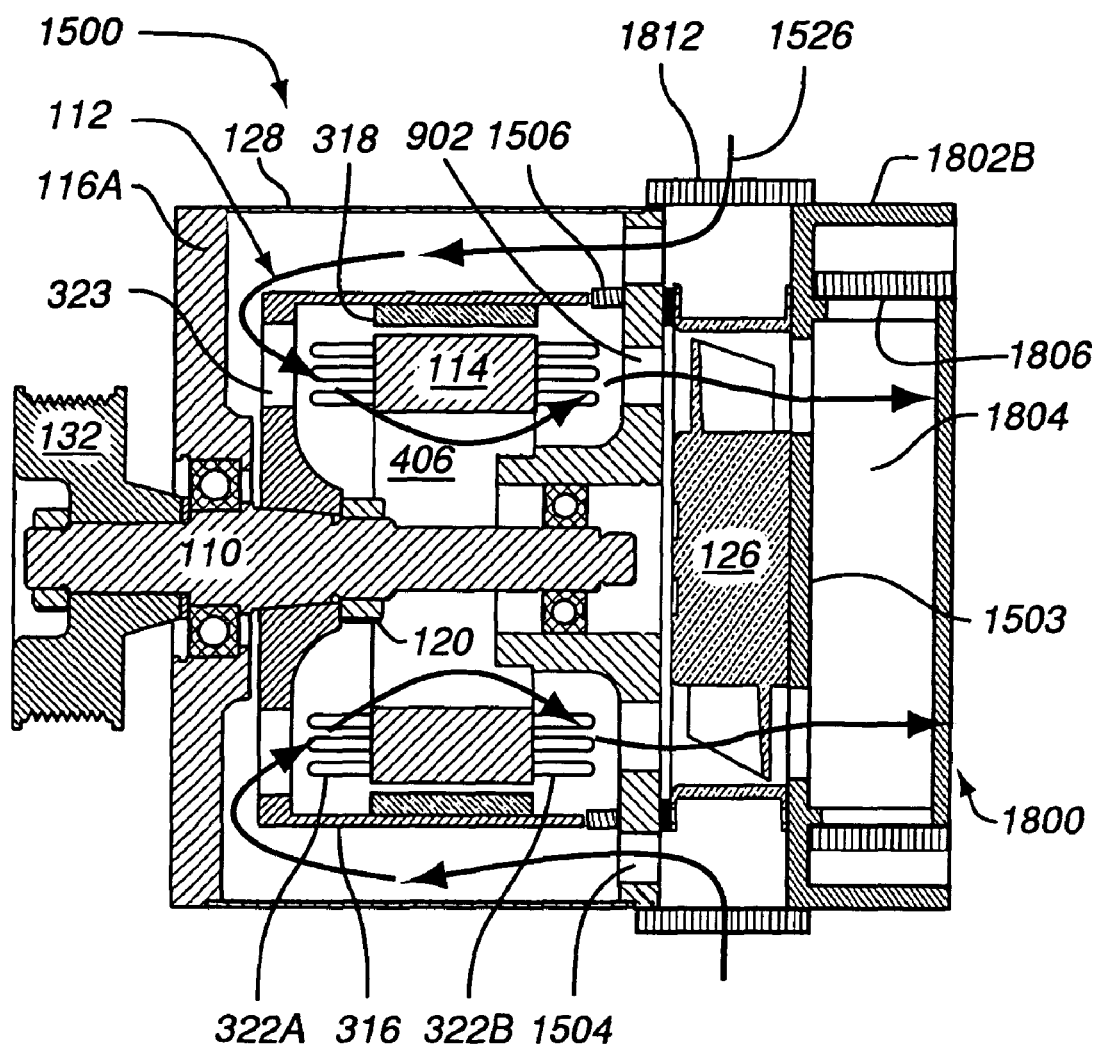
Figure 18C:
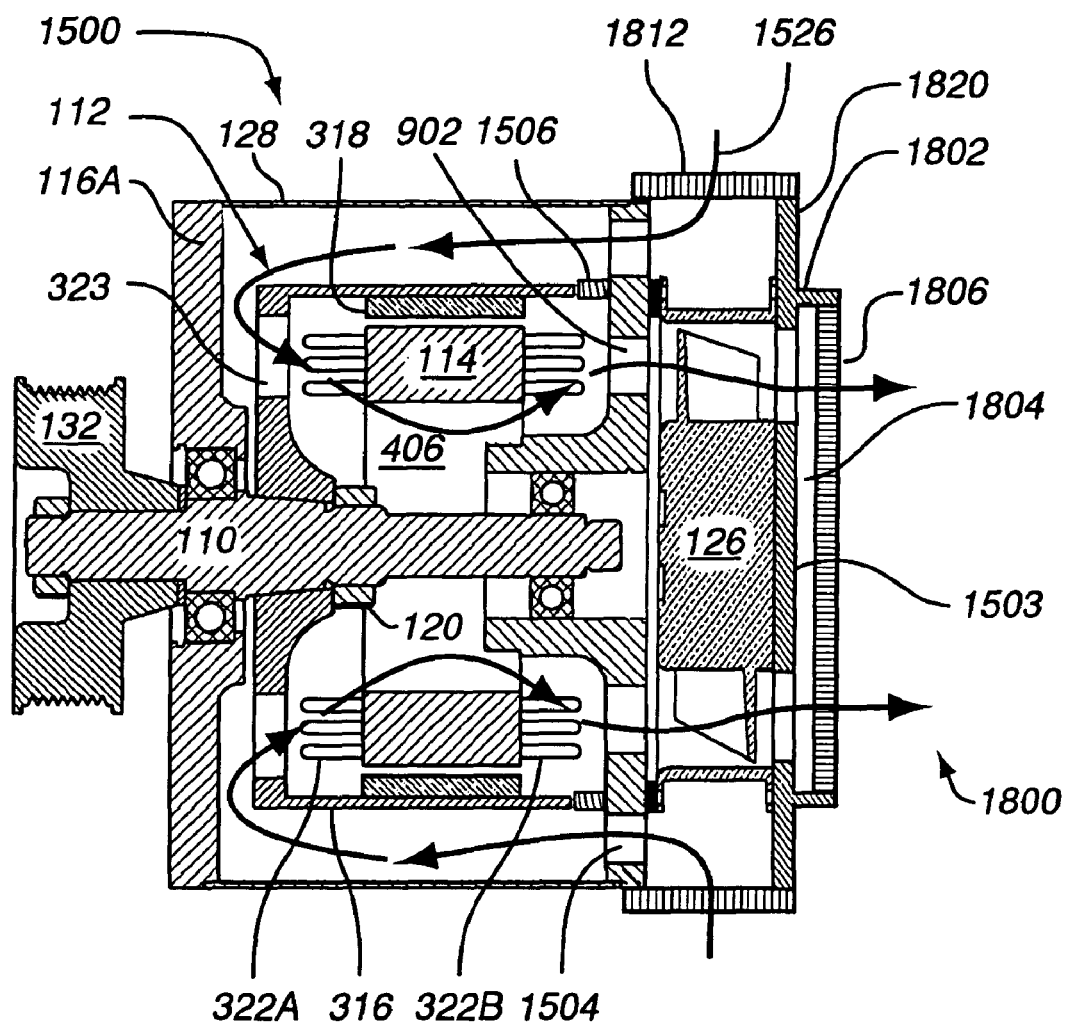

Introduction of exhaust air into alternator 1500 through the air intake can also be minimized by relative disposition of the air intake and exhaust. For example, in FIGS. 18B, and 18C, the input airway opens radially exteriorly of duct 1802, and the output airway opens axially at the rear. In the embodiment of FIG. 18B, input and output filter 1814 and 1806 are both ring-type filters. Duct 1802 includes a stepped (increased diameter) portion 1802B, the sidewall of which cooperates with endplate 122A to define the input airway. In the embodiment of FIG. 18C, input filter 1814 is a ring-type filter and output filter 1806 is a flat plate type filter. In this case, the input airway is defined by an annular plate 1820 disposed on the exterior of duct 1802, in cooperation with endplate 122A. If desired, duct 1802 and plate 1820 can be integral part of fan frame 126A.

Figure 19:
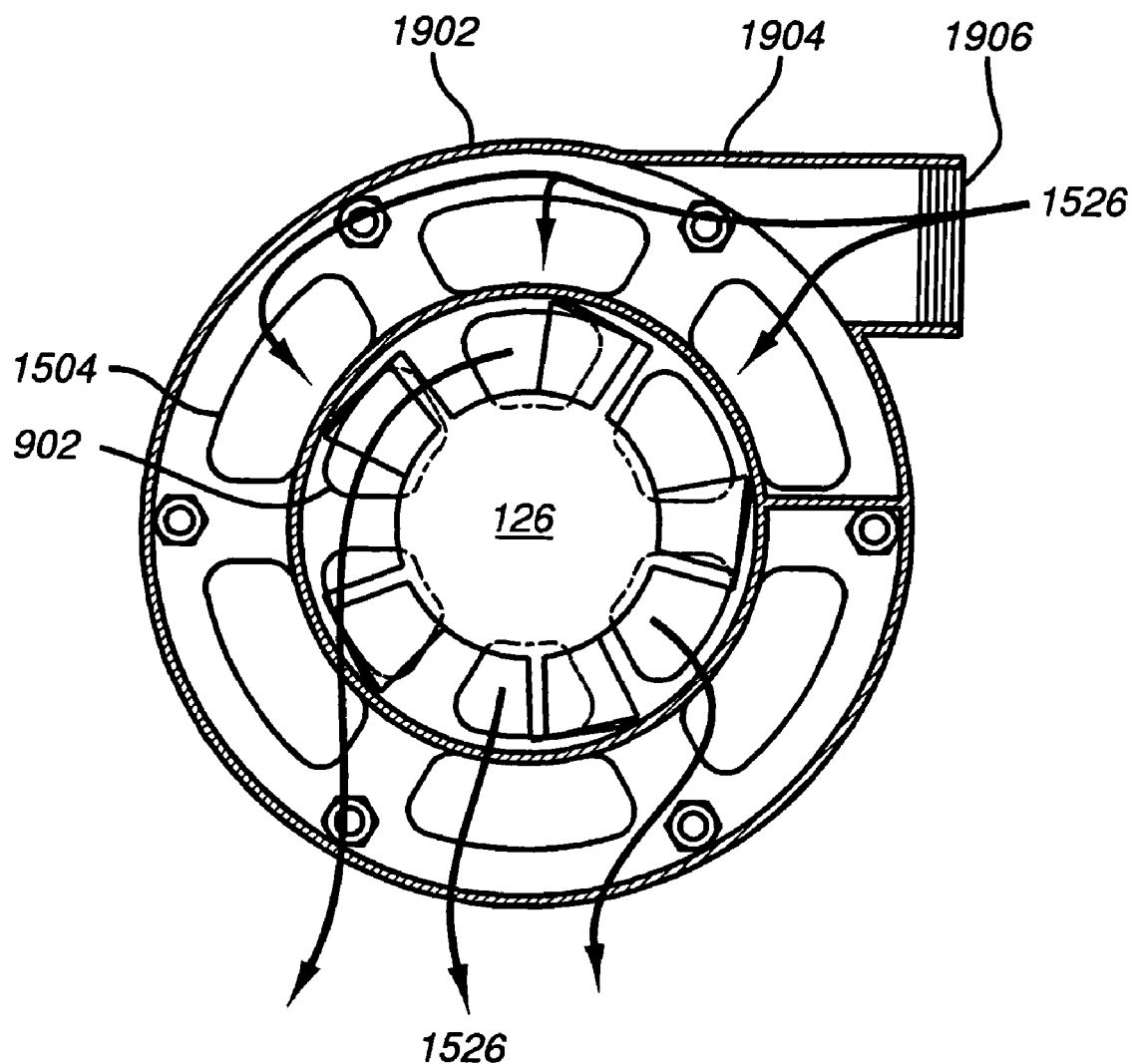
FIG. 19 is a rear view of a fan housing suitable for use with alternator of FIG. 15 employing an air conduit transverse to the axis of the alternator.

It is sometimes desirable to intake air from a location remote from the alternator, e.g. where the ambient air temperature in the vicinity of the alternator is higher than desirable. In the embodiment of FIG. 15, this is accomplished utilizing a snorkel attaching to the rear, and initially extending axially from the alternator. In some applications, the axial extent of free space is limited, and it is desirable to provide an air intake duct extending transversely relative to the axis of the alternator. Referring to FIG. 19, such a transversely ducted alternator is suitably generally similar to the embodiment of FIG. 18C, except that a conduit 1902 with a tangentially extending extension 1904, suitably capped with an air filter 1906, is employed rather than plate 1820 and ring-type filter 1812.

Figure 16B:
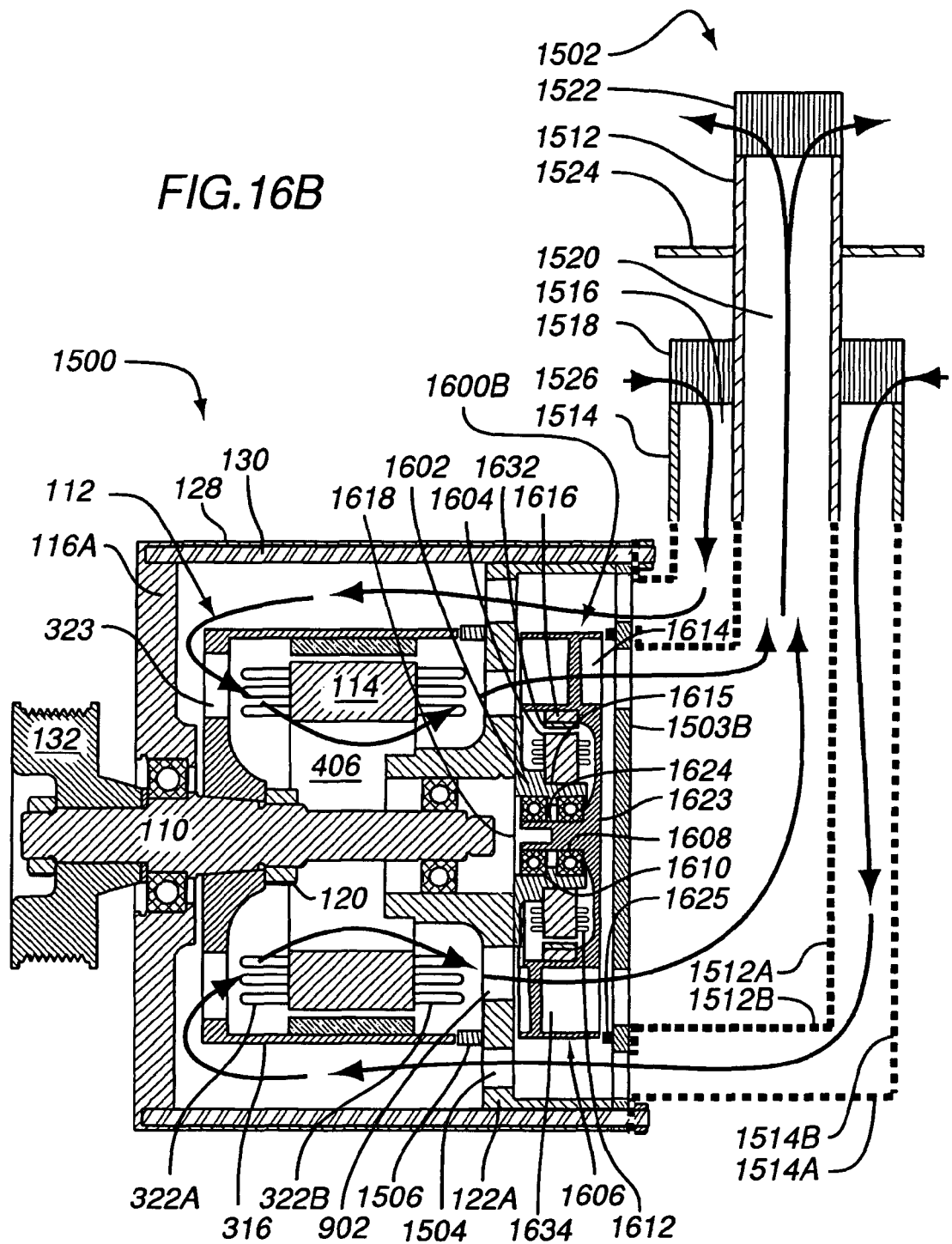
Figure 20A:
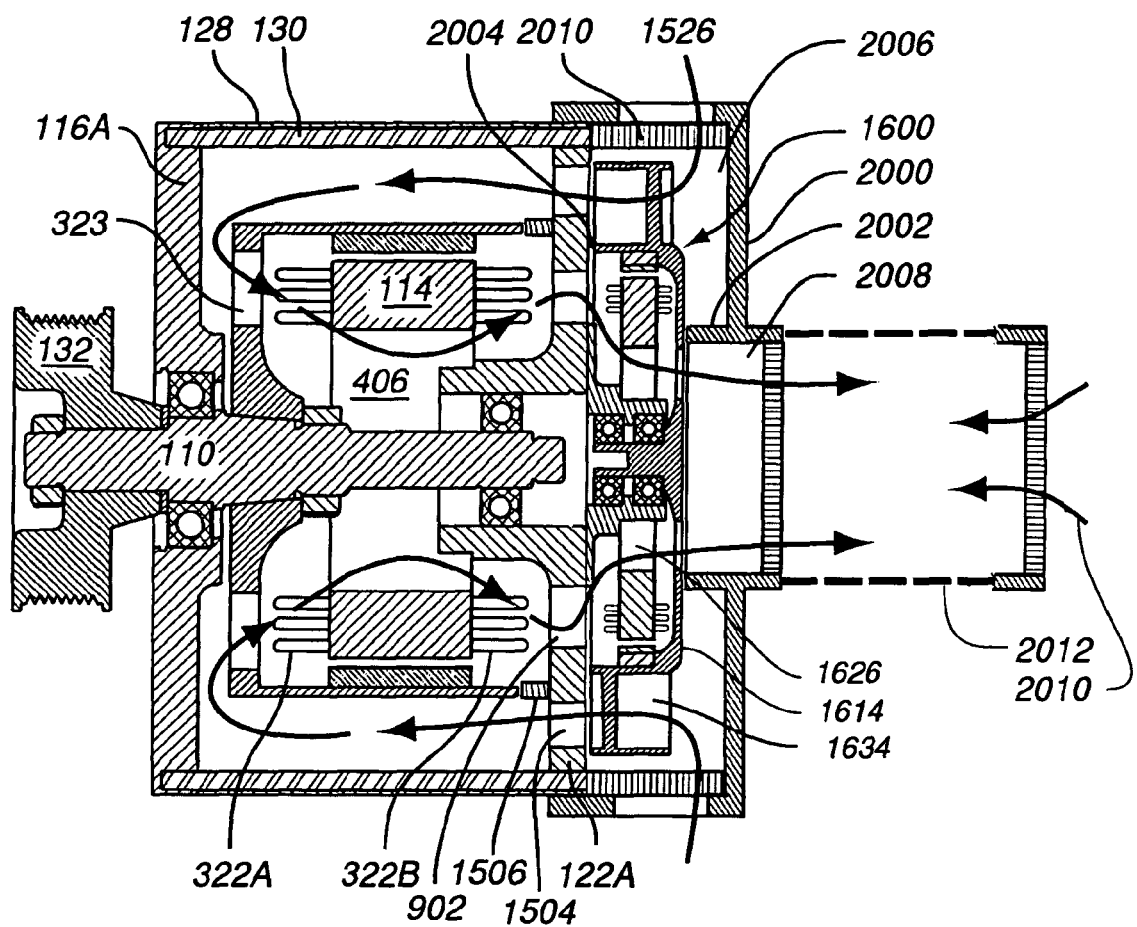
FIGS. 20A, 20B and 20C are schematic representations of filter systems suitable for use with the optimized fans of FIGS. 16 and 17, respectively.
Figure 20B:
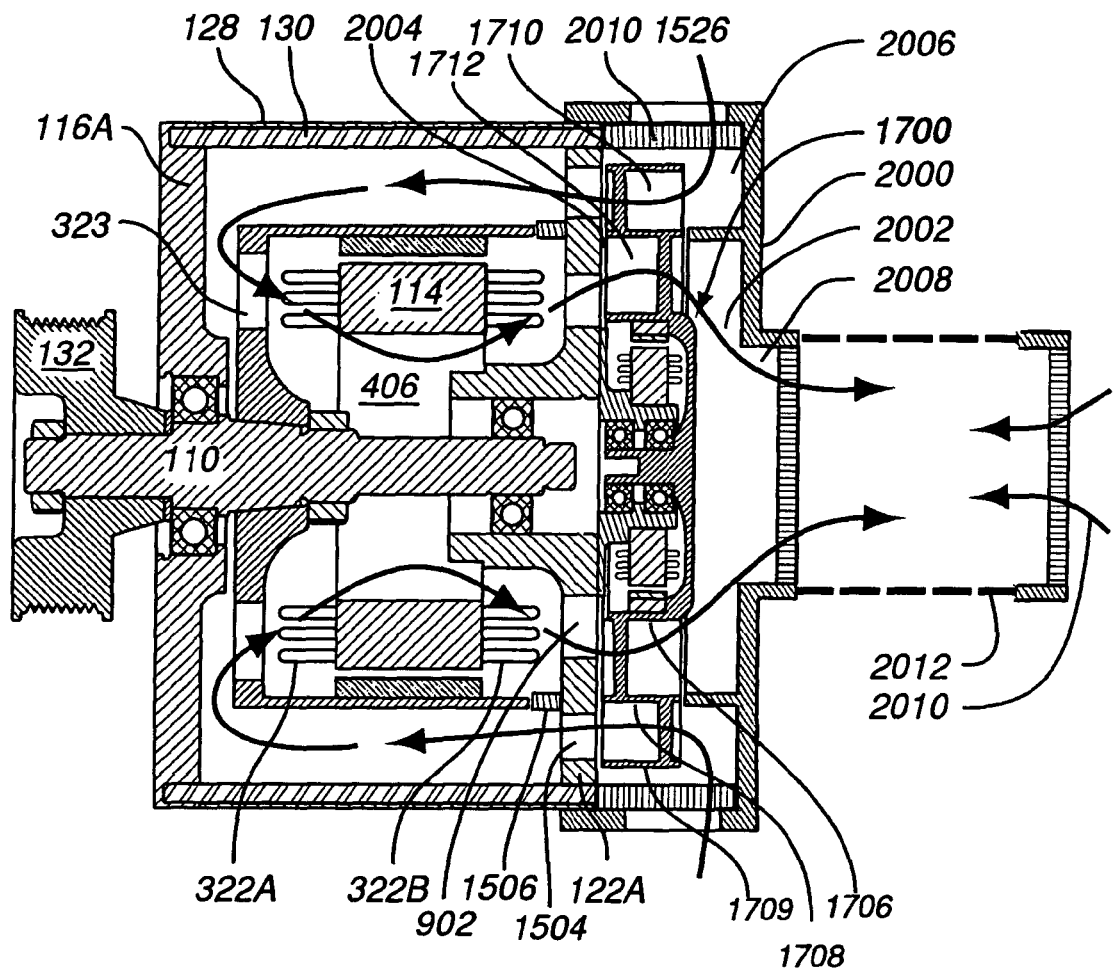
Figure 20C:
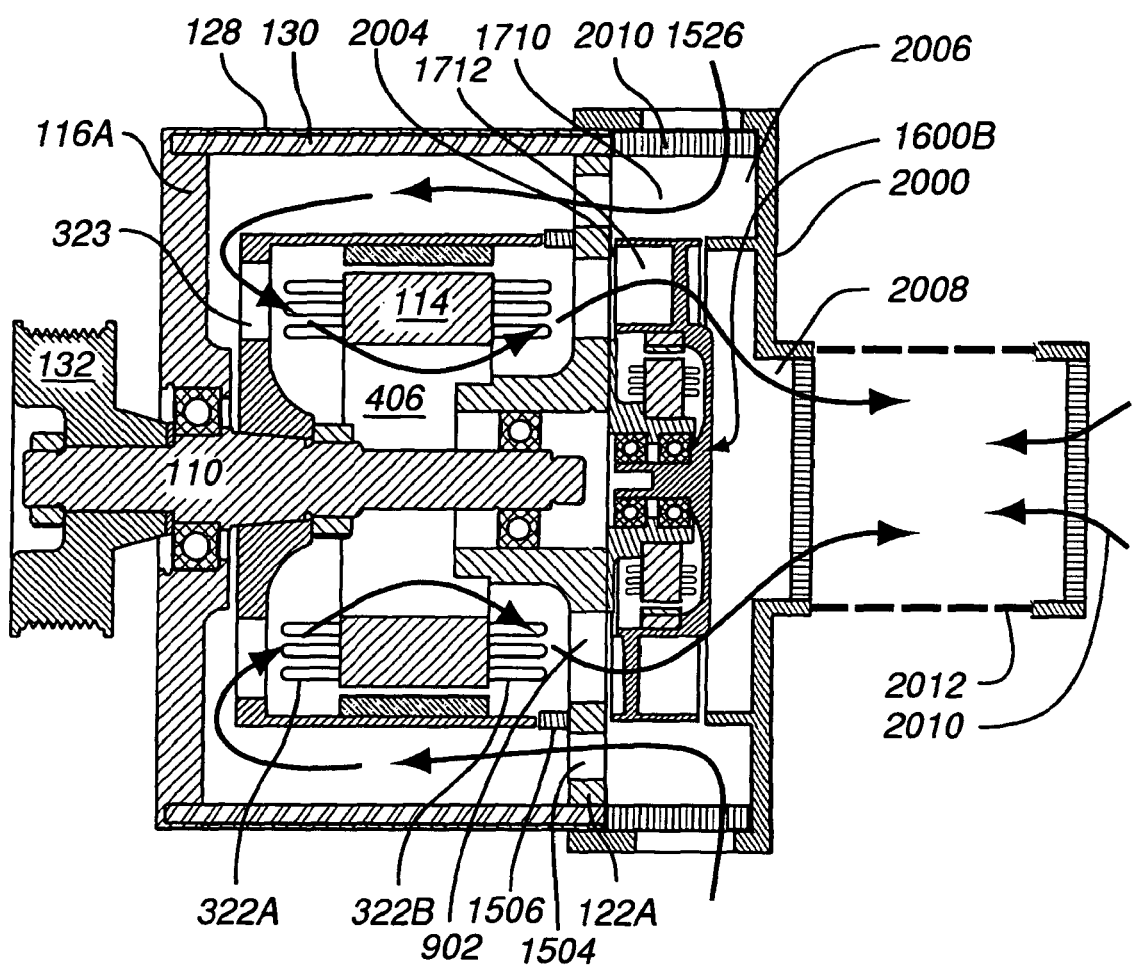

Filters can also be utilized with the optimized fans of FIGS. 16 and 17. For example, referring to FIG. 20A, fan 1600 may be concentrically disposed within a generally cylindrical fan housing 2000. Housing 2000 suitably includes a concentric inner cylindrical wall 2002 that extends inwardly and terminates proximate fan rotor end cap 1614, separated from end cap 1614 only by a small gap 2004. The diameter of wall 2002 is suitably intermediate those of rotor body 1630, and air passageway 1626, preferably with an outer diameter equal to that of body 1630. Wall 2002 defines respective input and output airways 2006 and 2008. Gap 2004 is small enough that any migration of air between airways 2006 and 2008 is insignificant. Input airway 2006, on the exterior of wall 2002, communicates with fan blade 1634, and ultimately with endplate outer passageway 1504 and includes an intake adapted to receive a ring-type air filter 2010, concentric with wall 2002. Output airway 2008, within the interior of wall 2002, communicates with passageways 1626, 1620 and 1622 of fan 1600 and ultimately inner passageways 902 in the alternator endplate 122A. Output airway 2006 exhausts through a filter 2009, suitably a flat plate type filter. The ability to reverse fan air flow 2010 allows for an extension of airway 2008 using rubber flex tubing 2012 or other suitable material to a more environmentally friendly location, feeding alternator 1500 with cooler air than would be available close to the alternator under very harsh conditions. Similarly, referring to FIG. 20B, fan 1700 may also be concentrically disposed within fan housing 2000. In such case inner cylindrical wall 2002 aligns with fans rotor outer cylinder 1708; the outer diameter of wall 2002 is suitably equal to that of cylinder 1709.

Figure 21A:
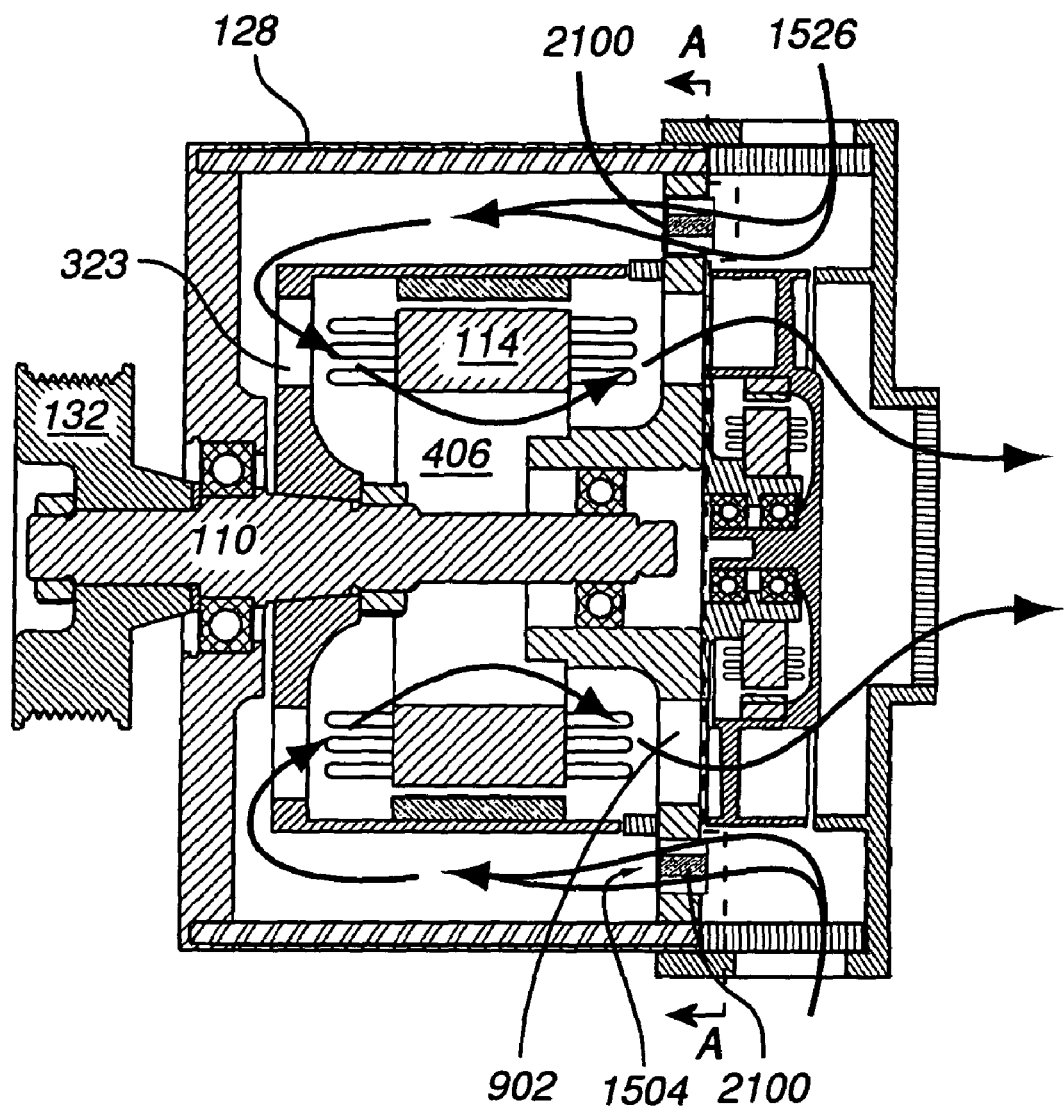
FIG. 21A is a schematic sectional side view electrical components mounted in air cooled alternator endplate.
Figure 21B:
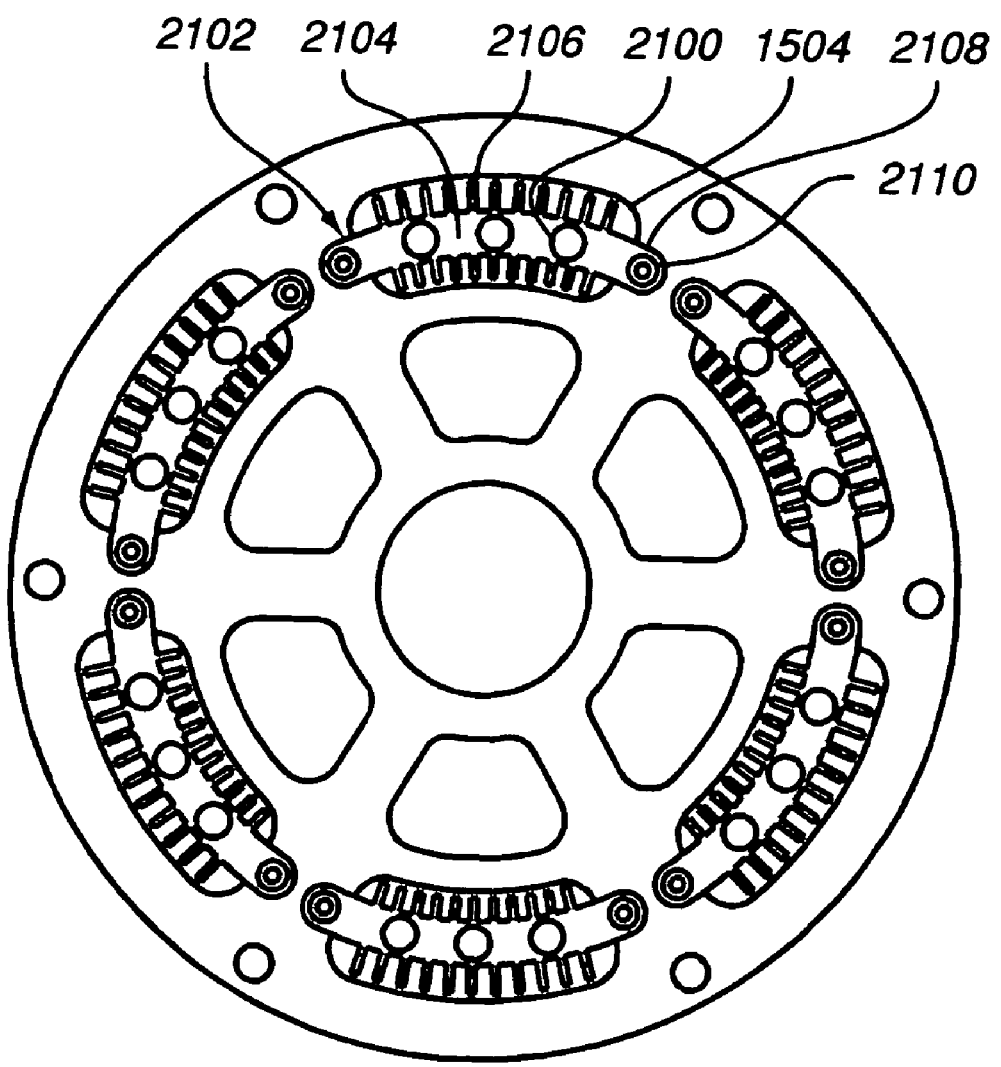
FIG. 21B is a schematic sectional rear view (from direction A-A in FIG. 21A) of the mount of FIG. 21A.
Figure 22A:
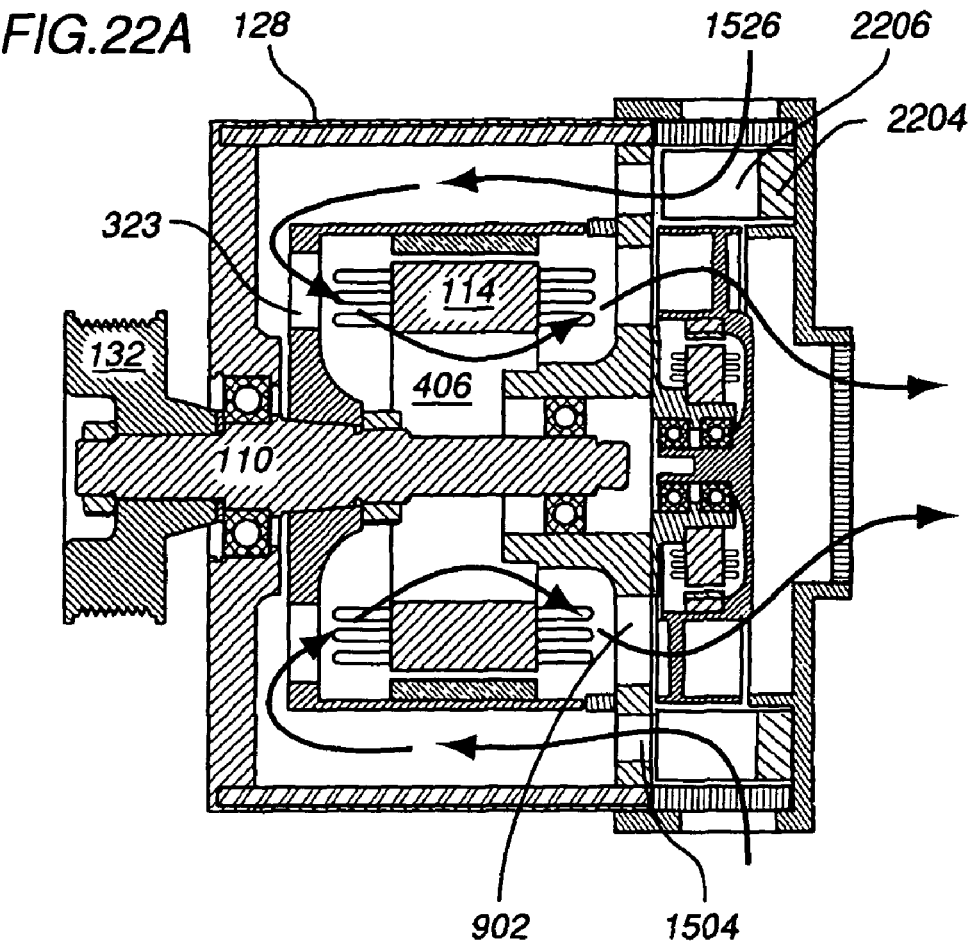
FIG. 22A is a schematic sectional side view showing electrical components mounted in the fan housing of an air cooled alternator.
Figure 22B:
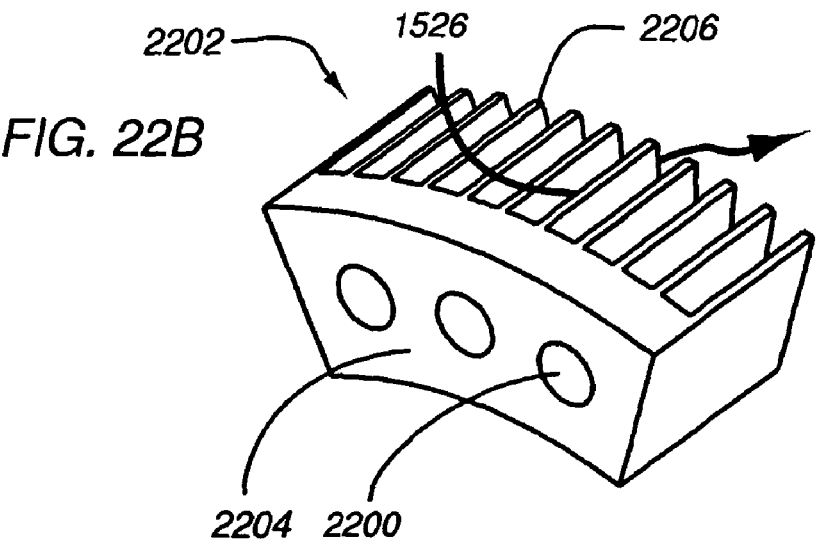
FIG. 22B is an isometric perspective view of the electrical component mount of FIG. 22A.

As previously noted, the electrical current induced in the alternator stator windings is typically applied to a bridge rectifier, sometimes regulated, and provided as an output. In some instances, the regulated output signal is applied to an inverter to provide an AC output. In addition, electronic control systems to accommodate changes in the rotor speed or changes in load characteristics may be employed. The components employed in such electronic systems tend to be susceptible to heat damage. Accordingly, it is desirable to dispose the electronic components (particularly those components that produce heat during operation) into a die cast heat sink in the path of the coolest air, e.g., in the vicinity of the air intake. For example, referring to FIGS. 21A and 21B, the heat producing electronic components 2100 are mounted on (pressed into) a heat sink 2102, which is, in turn, mounted within air passageway 1504 in alternator endplate 121A. Heat sink 2102 is formed (e.g. machined or extruded) of a light thermally conductive material, e.g. aluminum, and includes a main rib 2104, with transverse (e.g. perpendicular) cooling fins 2106 and respective fastening tabs 2108 at either end. Components 2100 are suitably mounted on main rib 2104. Heat sink 2102 is contoured to fit within endplate passageway 1504, such that the cooling air flow (generally indicated as 1526) runs over and between fins 2106. Heat sink 2102 is suitably fastened to endplate 121A by respective screws 2110 passing through tabs 2108 and threading into endplate 121A.

Alternatively, a heat sink bearing the electronic components can be disposed within the input airway of a fan housing (e.g., 1800, 2000), snorkel (e.g., 1502), plenum (e.g., 1402) or the like cooperating with the alternator. For example, components 2200 can be mounted on a heat sink 2202, which is in turn mounted in input airway 2006 of fan housing 2000. Heat sink 2202 is suitably comb-like, formed (e.g. machined or extruded) of a light thermally conductive material, e.g. aluminum, with a base 2204, and transverse (e.g. perpendicular) cooling fins 2206. Components 2200 are suitably mounted on base 2204. The cooling air flow, generally indicated as 1526, flows through filter 2010, through the respective cooling fins 2206, and into the alternator through rear endplate passageway 1504.

In a sealed unit, such as the embodiments described in connection with FIGS. 12-14, the heat generating power components are preferably disposed exteriorly of the sealed alternator, e.g., on a heat sink disposed on heat exchanger cover 222 within exterior channels 1228.

Figure 23A:
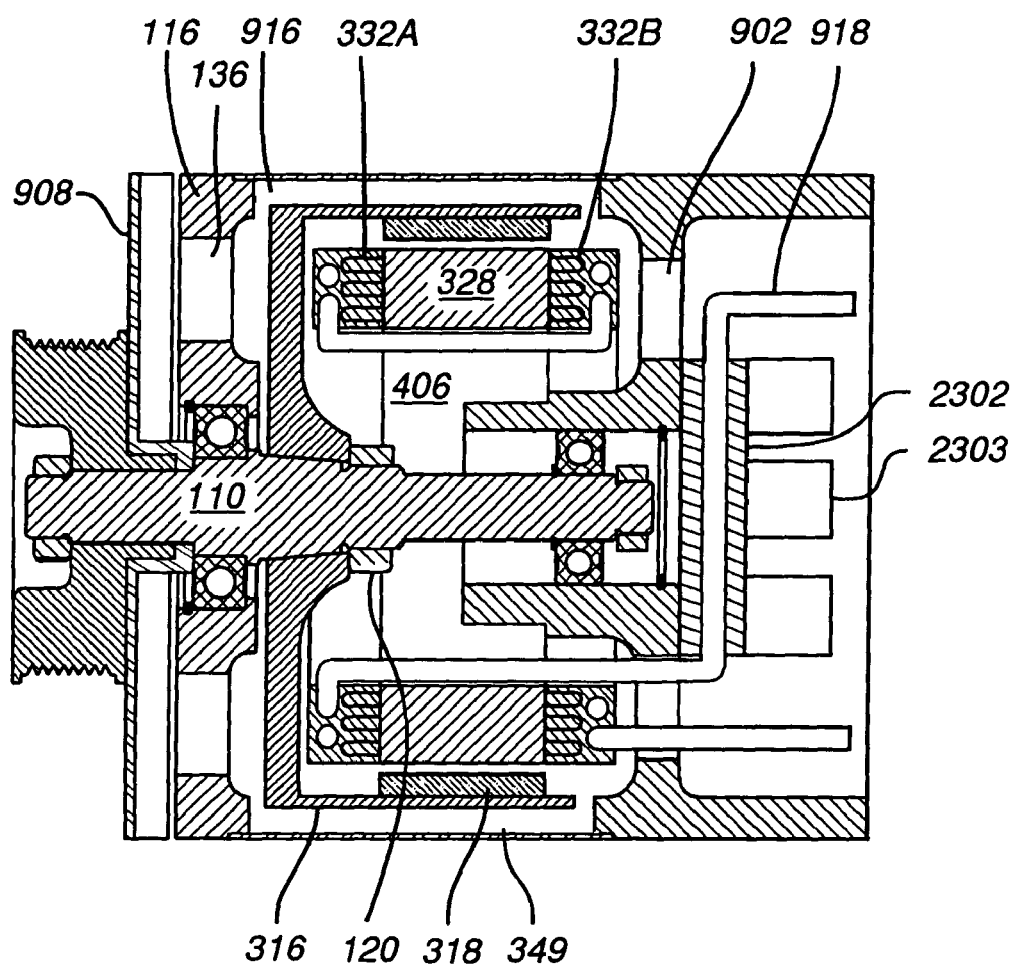
FIG. 23A is a sectional view showing electrical components mounted in an end turn fluid cooled alternator sharing alternator fluid cooling.
Figure 23B:
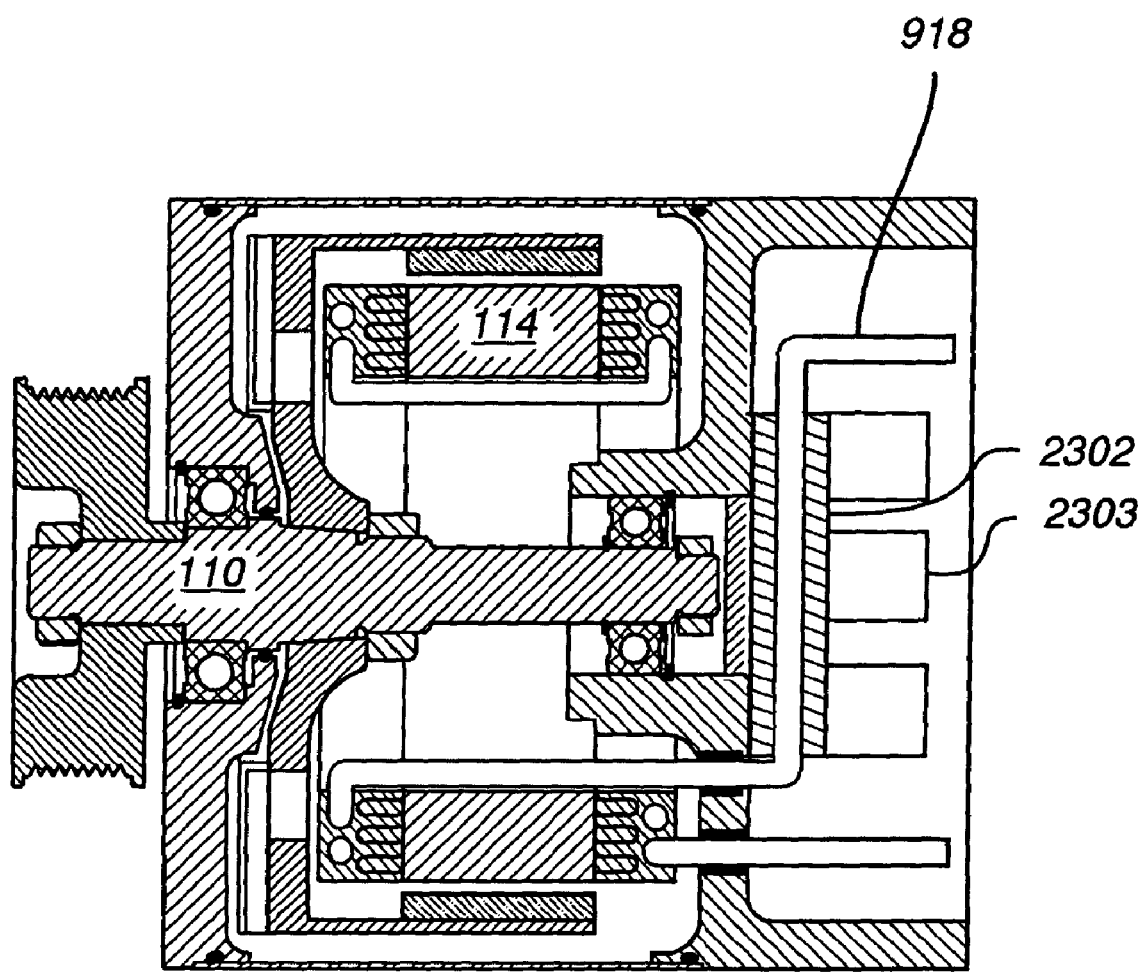
FIG. 23B is a sectional view showing electrical components mounted in an all fluid cooled alternator sharing alternator fluid cooling.

Referring to FIGS. 23A and 23B the heat producing electrical components can be mounted to a heat plate that uses the alternator coolant fluids outlined in FIGS. 9B and 9C. prior to entering the alternator cooled fluid flow through heat plate 2302. The heat producing components 2303 are suitably fastened to heat plate 2302. Note that in FIG. 23B the seal of the alternator is maintained by locating the 2302 and 2303 exterior of the alternator.

Although the present invention has been described in conjunction with various exemplary embodiments, the invention is not limited to the specific forms shown, and it is contemplated that other embodiments of the present invention may be created without departing from the spirit of the invention.

Variations in components, materials, values, structure and other aspects of the design and arrangement may be made in accordance with the present invention as expressed in the following claims.

What is claimed is:

1. Power conversion apparatus comprising a shaft, a stator, and a rotor, the shaft, stator, and rotor being coaxially disposed with the rotor mounted on the shaft, the stator including at least one winding, and the rotor including a plurality of permanent magnets disposed proximate to the stator, separated from the stator by a predetermined gap distance, such that relative motion of the rotor and stator causes magnetic flux from the magnets to magnetically interact with the stator winding, wherein:
   the shaft has a diameter and includes a tapered portion disposed between the ends of the shaft at a predetermined position relative to the stator, the diameter of the tapered portion varying in accordance with a predetermined taper from a minimum diameter greater than the diameter of the shaft to a maximum diameter greater than the diameter of the shaft;
   the rotor includes a central through-bore having a predetermined taper corresponding to that of the tapered portion of the shaft; and
   the shaft is journaled through the rotor tapered bore, such that shaft tapered portion is received in the rotor bore, cooperation of the tapered rotor bore and tapered shaft portion positioning the rotor with respect to the shaft and the stator.

2. The apparatus of claim 1 wherein the predetermined taper is in the range of 1 in. diameter per 7 inches of length to 1 in. diameter per 16 inches of length.

3. The apparatus of claim 1 wherein the predetermined taper is on the order of 1 in. per foot.

4. The apparatus of claim 1 further including first and second endplates, an outer casing and a plurality of tie rods, cooperating to maintain alignment of the shaft, rotor, and stator, wherein:
   the shaft is rotatably held by the endplates in axial alignment with the endplates;
   the stator is affixed to one of the endplates and maintained in predetermined disposition with respect thereto; and
   the outer casing is disposed between the front and rear endplates with tie rods disposed to compress the front and rear endplates against the outer casing.

5. The apparatus of claim 1 wherein:
   the rotor comprises an endcap and a cylindrical casing, the magnets being disposed on the interior of the casing; and
   the stator is disposed within the rotor casing.

6. The apparatus of claim 5 wherein the rotor endcap comprises a peripheral portion connecting to the casing, a central hub having the tapered bore and a connecting portion connecting the peripheral portion to the central hub and including at least one air passageway therethrough.

7. The apparatus of claim 5 wherein the rotor endcap is contoured such that when the shaft tapered portion is received in the rotor bore, the shaft tapered portion is within the interior of the rotor casing.

8. The apparatus of claim 5 wherein at least a portion of rotor endcap is disposed an angle other than 90° relative to the rotor casing, whereby the axial distance between the point of connection of the rotor to the shaft and the magnets is less than the axial length of the rotor casing.

9. The apparatus of claim 1 wherein:
   the stator comprises a core including front and back sidefaces and a generally cylindrical outer peripheral surface with a predetermined number of slots formed therein; and
   the stator winding is wound around the core, such that with respect to at least one end face, the winding passes through a first slot, forms an end turn extending outwardly beyond the core side face, providing a space between the end turn and end face, then passes back through another slot.

10. The apparatus of claim 9 further including a fan and respective air passageways disposed to circulate air moved by the fan over the winding end turns.

11. The apparatus of claim 10 wherein the fan is electrically driven.

12. The apparatus of claim 1 further including a front endplate, a rear endplate, an outer casing, cooperating to maintain alignment of the shaft, rotor, and stator; and
   at least one air passageway through the rear end plate, at least one air passageway through the stator core, at least one air passageway through the rotor endcap, and at least one air passageway through the front end plate.

13. The apparatus of claim 12 wherein the stator core and rotor endcap are substantially open.

14. The apparatus of claim 6 wherein the connecting portion comprises a plurality of crossarms.

15. The apparatus of claim 14 wherein the rotor includes a casing, and the plurality of crossarms are disposed at a non-perpendicular angle relative to the axis of the rotor casing such that the axial length of the rotor casing interior is greater in proximity to the casing than in proximity to the shaft.

16. The apparatus of claim 15 wherein the rotor endcap connecting portion is contoured such that the central hub is disposed within the interior of the rotor casing.

17. The apparatus of claim 1 wherein:
   the rotor is adapted to rotate over a predetermined operational range of rotational speeds;
   the rotor and stator are configured such that rotation of the rotor at and above a predetermined speed within the range of speeds causes magnetic flux from the magnets to induce a predetermined level of current in the stator windings, such current tending to generate heat that, if not dissipated, would raise the temperature of the magnets above a predetermined destructive level; and
   wherein the power conversion apparatus further includes:
   a cooling system for directing coolant along a predetermined flow path into thermal contact with at least one of the winding and magnets, the cooling system generating sufficient coolant flow through the predetermined flow path at and above the predetermined speed to dissipate heat generated and maintain the temperature of the magnets below the predetermined destructive level.

18. The apparatus of claim 1 wherein the rotor is adapted to rotate over a predetermined operational range of rotational speeds, operation at and above a predetermined speed within the range of speeds tending to generate heat that, if not dissipated, would raise the temperature of the magnets above a predetermined destructive level;
   And the apparatus further includes cooling means for dissipating heat and maintaining the temperature of the magnets below the predetermined destructive level over the predetermined operational range of rotational speeds.

* * * * *